(12) United States Patent
Neumann

(10) Patent No.: US 12,405,959 B2
(45) Date of Patent: Sep. 2, 2025

(54) METHODS AND SYSTEMS FOR ARRANGING AND DISPLAYING GUIDED RECOMMENDATIONS VIA A GRAPHICAL USER INTERFACE BASED ON BIOLOGICAL EXTRACTION

(71) Applicant: KPN INNOVATIONS LLC, Lakewood, CO (US)

(72) Inventor: Kenneth Neumann, Lakewood, CO (US)

(73) Assignee: KPN INNOVATIONS LLC, Lakewood, CO (US)

(*) Notice: Subject to any disclaimer, the term of this patent is extended or adjusted under 35 U.S.C. 154(b) by 0 days.

(21) Appl. No.: 18/743,996

(22) Filed: Jun. 14, 2024

(65) Prior Publication Data
US 2024/0346029 A1    Oct. 17, 2024

Related U.S. Application Data

(63) Continuation-in-part of application No. 17/963,573, filed on Oct. 11, 2022, now Pat. No. 12,019,635, (Continued)

(51) Int. Cl.
*G06F 17/00*    (2019.01)
*G06F 9/451*    (2018.01)
(Continued)

(52) U.S. Cl.
CPC ........ *G06F 16/24575* (2019.01); *G06F 9/451* (2018.02); *G06F 16/24578* (2019.01);
(Continued)

(58) Field of Classification Search
CPC ......... G06F 16/24575; G06F 16/24578; G06F 16/248; G06F 16/285; G06F 9/451; G06N 5/04; G06N 20/00
See application file for complete search history.

(56) References Cited

U.S. PATENT DOCUMENTS

| 7,953,613 B2 | 5/2011 | Gizewski |
| 8,766,803 B2 | 7/2014 | Bousamra et al. |

(Continued)

OTHER PUBLICATIONS https://www.mdpi.com/2079-4991/9/6/813; Evolution of Wearable Devices with Real-Time Disease Monitoring for Personalized Healthcare; by: Guk, K.; Han, G.; Lim, J.; Jeong, K.; Kang, T.; Lim, E.-K.; Jung, J., (May 2019).

(Continued)

*Primary Examiner* — Greta L Robinson
(74) *Attorney, Agent, or Firm* — Caldwell Intellectual Property Law

(57) ABSTRACT

A system for arranging and displaying guided recommendations using a graphical user interface based on biological extraction, the system comprising a computing device configured to receive, from a wearable device located at a user, biological extraction data and at least a datum of user activity data, classify the biological extraction and the at least a datum of user activity as a function of at least a datum of a user fingerprint, select at least a compatible element as a function of the training data and the user fingerprint, wherein the compatible element comprises a guided recommendation, and generate a representation using a graphical user interface of the compatible element.

20 Claims, 13 Drawing Sheets

Related U.S. Application Data which is a continuation of application No. 17/062,740, filed on Oct. 5, 2020, now Pat. No. 11,544,275.

(51) Int. Cl.
*G06F 16/2457* (2019.01)
*G06F 16/248* (2019.01)
*G06F 16/28* (2019.01)
*G06N 5/04* (2023.01)
*G06N 20/00* (2019.01)

(52) U.S. Cl.
CPC .......... *G06F 16/248* (2019.01); *G06F 16/285* (2019.01); *G06N 5/04* (2013.01); *G06N 20/00* (2019.01)

(56) References Cited

U.S. PATENT DOCUMENTS

| | | |
|---|---|---|
| 10,314,547 B2 | 6/2019 | Miller et al. |
| 10,360,343 B2 | 7/2019 | Prakash et al. |
| 10,368,810 B2 | 8/2019 | Quinn et al. |
| 10,553,319 B1 | 2/2020 | Neumann |
| 10,568,570 B1 | 2/2020 | Sherpa |
| 11,461,700 B2 | 10/2022 | Neumann |
| 11,544,275 B2 * | 1/2023 | Neumann ............... G06F 9/451 |
| 11,823,785 B2 * | 11/2023 | Neumann ............. G16H 20/60 |
| 12,033,761 B2 * | 7/2024 | Foschini ............... G06N 20/00 |
| 2003/0036683 A1 | 2/2003 | Kehr et al. |
| 2013/0218588 A1 | 8/2013 | Kehr et al. |
| 2018/0113982 A1 | 4/2018 | Asthana et al. |
| 2019/0209022 A1 * | 7/2019 | Sobol .................... A61B 5/1112 |
| 2019/0295440 A1 | 9/2019 | Hadad |
| 2020/0185100 A1 | 6/2020 | Francois |

OTHER PUBLICATIONS https://www.himss.org/resources/wearable-technology-applications-healthcare-literature-review; Wearable Technology Applications in Healthcare: A Literature Review; By: Min Wu, PhD and Jake Luo, PhD.

http://www.selectsmart.com/fitnesstracker/; Fitness Activity Tracker, (Dec. 2020).

* cited by examiner

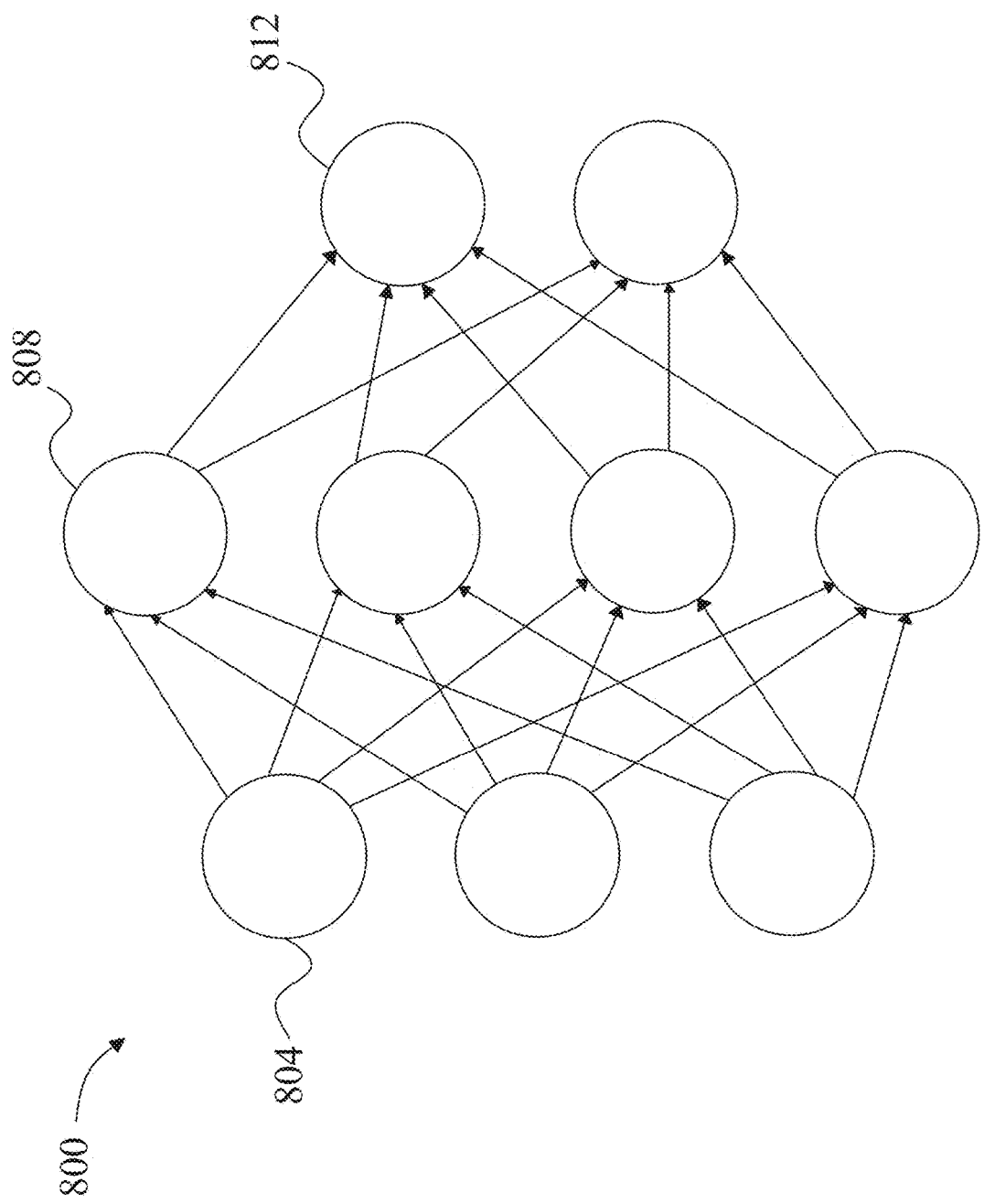

METHODS AND SYSTEMS FOR ARRANGING AND DISPLAYING GUIDED RECOMMENDATIONS VIA A GRAPHICAL USER INTERFACE BASED ON BIOLOGICAL EXTRACTION

CROSS-REFERENCE TO RELATED APPLICATIONS

This application is a continuation-in-part of Non-provisional application Ser. No. 17/963,573, filed on Oct. 11, 2022, now U.S. Pat. No. 12,019,635, issued on Jun. 25, 2024, and entitled "METHODS AND SYSTEMS FOR ARRANGING AND DISPLAYING GUIDED RECOMMENDATIONS VIA A GRAPHICAL USER INTERFACE BASED ON BIOLOGICAL EXTRACTION," which is a continuation of Non-provisional application Ser. No. 17/062,740, filed on Oct. 5, 2020, now U.S. Pat. No. 11,544,275, issued on Jan. 3, 2023, and entitled "METHODS AND SYSTEMS FOR ARRANGING AND DISPLAYING GUIDED RECOMMENDATIONS VIA A GRAPHICAL USER INTERFACE BASED ON BIOLOGICAL EXTRACTION," the entirety of each of which are incorporated herein by reference.

FIELD OF THE INVENTION

The present invention generally relates to the field of machine-learning. In particular, the present invention is directed to systems and methods for arranging and displaying guided recommendations using a graphical user interface based on biological extraction.

BACKGROUND

Physiological determinations generated are oftentimes cumbersome due to the volume of data associated with the output. Accurately and cleanly arranging and displaying the myriad of data associated with a user's physiology is a monumental task for graphical user interfaces, and especially so for guiding user recommendations as a function of the physiological data.

SUMMARY OF THE DISCLOSURE

In an aspect, a system for displaying a customized badge is disclosed. The system includes a computing device, wherein the computing device is configured to receive cohort data and alimentary array data, generate a cohort digital badge for at least an alimentary element of the alimentary array data as a function of the cohort data, receive user biological extraction data and at least a datum of user activity data, classify the user biological extraction data and the at least a datum of user activity data to at least a user fingerprint, select a plurality of compatible elements as a function of the at least a user fingerprint, generate a user digital badge as a function of the cohort digital badge and the plurality of compatible elements and display the user digital badge using a graphical user interface.

In another aspect, a method for displaying a customized badge is disclosed. The method includes receiving, using a computing device, cohort data and alimentary array data, generating, using the computing device, a cohort digital badge for at least an alimentary element of the alimentary array data as a function of the cohort data, receiving, using the computing device, at user biological extraction data and at least a datum of user activity data, classifying, using the computing device, the user biological extraction data and the at least a datum of user activity data to at least a user fingerprint, selecting, using the computing device, a plurality of compatible elements as a function of the at least a user fingerprint, generating, using the computing device, a user digital badge as a function of the cohort digital badge and the plurality of compatible elements and displaying, using the computing device, the user digital badge using a graphical user interface.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 8 illustrates a diagram of an exemplary embodiment of neural network;

DETAILED DESCRIPTION

At a high level, aspects of the present disclosure are directed to systems and methods for arranging and displaying guided recommendations using a graphical user interface based on biological extraction. In an embodiment, computing device is configured receive a biological extraction of a user from a variety of sources such as using user input such as a questionnaire and wearable device data such as a medical or fitness device. Computing device may be configured to classify biological extraction data and user activity data into a variety of subclassifications as a function of a user fingerprint. Computing device may display, using a graphical user interface, a compatible element containing a guided recommendation, wherein recommendations are guided in that they are filtered as a function of user patterns and targeted to user based on wearable device data.

At a high level, aspects of the present disclosure are directed to system and methods for arranging and displaying guided recommendations using a graphical user interface (GUI) based on biological extraction derived from wearable device data. In an embodiment, an evolving GUI may display targeted (guided) representations based on physiological data that originates from a wearable device, as defined herein. Wearable device data may be used as training data to train machine-learning models to match to the data to a category of biological extraction, as described herein, and weigh the category for relevancy in matching to a user's internet usage of computing devices (activity data). In an embodiment, a compatibility index can be calculated and use to filer (weight/rank) the targeted (guided) recommendations and generate a user-customized GUI representation.

Figure 1:
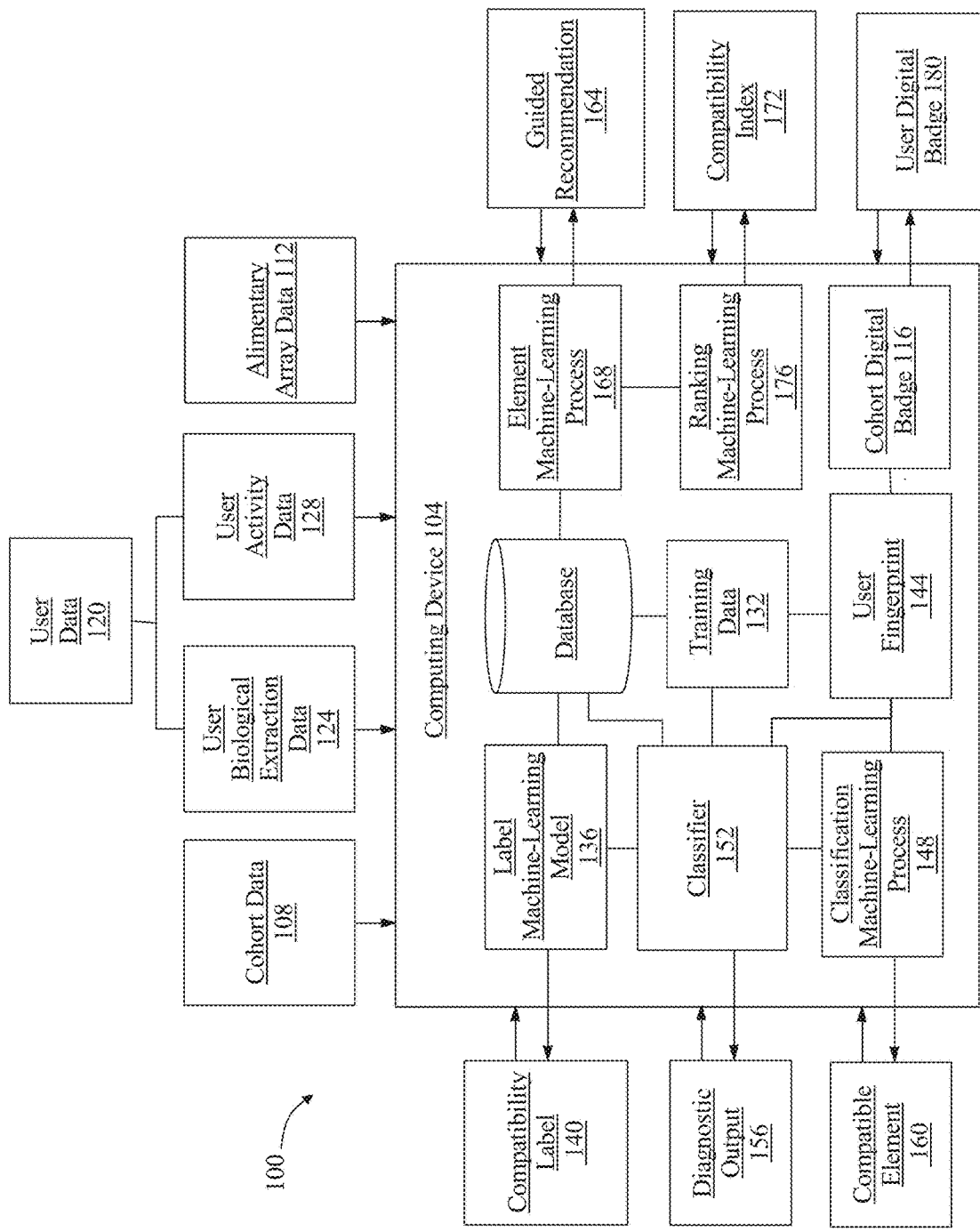
FIG. 1 illustrates a block diagram of an exemplary system for displaying a customized badge.

Referring now to FIG. 1, an exemplary embodiment of a system 100 for displaying a customized badge is illustrated. System includes a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail using a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

Continuing in reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, system 100 includes a memory communicatively connected to at least a computing device 104, the computing device 104 is configured to receive cohort data 108. As used in this disclosure, "cohort data" is a collection of information that characterizes and represents a specific group of entities based on shared information. In some embodiments, badges may be specialized for user cohorts. For example, users may be grouped based on phenotype, including factors such as age, sex, nutritional needs, or chronic health conditions. System 100 may employ a classifier, which may include clustering algorithms, to classify users into distinct groups based on their shared characteristics or needs. By categorizing users into cohorts, system 100 may tailor digital badges to reflect the specific requirements or preferences of each group. As a nonlimiting example, this may include attributes, behaviors, or characteristics. The cohort data 108 may include but is not limited to demographic details, behavioral patterns, preferences, health indicators, environmental impacts, or any other measurable criteria that can be used to group entities together. In some embodiments, collecting and analyzing of cohort data 108 may identify commonalities or trends within the group that can inform decisions, predictions, or customizations of services and products, such as the generation of a customized badge (described further below). In the context of the system, in some embodiments, cohort data 108 may serve as a foundational element for tailoring digital badges to reflect the collective attributes or achievements of the group. Menu data may include nutritional information, name, and meal contents identified in a specific meal. In some embodiments, computing device 104 may be configured to receive cohort data 108 by capturing comprehensive nutritional information, names, and meal contents from specific meals. In a non-limiting example, user may use system 100 to scan physical menu by employing optical character recognition (OCR). As used in this disclosure, "OCR" is a process that converts an image of text into a machine-readable text format. In some embodiments, certain alimentary provider may provide a digital menu. As used in this disclosure, "alimentary provider" is a person or entity that prepares alimentary products such as meals, food items, and/or drinks, including without limitation a restaurant, a food delivery service, or the like. In a non-limiting example, cohort data 108 may enable system 100 to automatically receive up-to-date menu data, may include detailed nutritional information and meal contents. In some embodiments, computing device 104 may utilize image recognition and analysis technologies, system 100 may process photographs or scans of product labels. Captured nutritional information and ingredient lists directly from packaged food items, contributing to the menu data and received as cohort data 108.

Still referring to FIG. 1, in some embodiments, optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases. a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 2-4. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 2-4.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, in some embodiments, system 100 may receive cohort data 108 as the function of recipes and nutrition fact panels available online or submitted by users. In a non-limiting example, natural language processing (NLP) technique may be used to enable system 100 to parse and extract relevant data from textual recipes and standardized nutrition labels, cohort data 108 may also be translated into structured data points for meal content and nutritional profiles. In some embodiments, system 100 may facilitate a digital platform for users to manually input or submit menu data, including personal insights or unofficial nutritional information.

Still referring to FIG. 1, system 100 for generating a customized badge may further include at least a computing device 104 configured to receive alimentary array data 112. As used in this disclosure, "alimentary array data" is a collection of data related to an items, ingredients, consumable, non-consumable and/or any products provided by an alimentary provider. In a non-limiting example, items may include, but are not limited to, food, beverages, and/or any ingredient consumed at any eating occasion by a human being and/or animal. For instance and without limitation, the badge concept extends to a wide variety of products such as cosmetics (e.g., makeup, skincare products, hair care products), prescription drugs (e.g., medications prescribed by healthcare professionals for various conditions), supplements (e.g., dietary supplements, vitamins, minerals, herbal products), and electronic devices (e.g., smartphones, laptops, tablets, smartwatches, home appliances), among others. Alimentary array data 112 may encompass various attributes of alimentary items, including nutritional information, source of ingredients, preparation methods, and any certifications or validations regarding health, sustainability, or quality standards. In a non-limiting example, alimentary array data 112 may also incorporate sensory attributes of alimentary items such as taste profiles, texture descriptions, and aroma notes. These sensory attributes may provide insights into the palatability and consumer preference aspects of food items, enabling system 100 to customize digital badges not just based on nutritional or health considerations but also considering the culinary experience. Additionally, alimentary array data 112 may include consumer feedback and ratings.

Still referring to FIG. 1, computing device 104 is configured to generate a cohort digital badge 116 for alimentary array data 112 of at least alimentary array data as a function of the cohort data. As described in this disclosure, a "badge" refers to an indicator denoting the quality of ingredients or components of at least an item. Initially, the badge may serve as a general certification of the item's quality based on predefined criteria. For example, in cosmetics, the badge may apply to makeup products such as foundation, lipstick, eyeshadow, and mascara, as well as skincare items such as moisturizers, cleansers, serums, and sunscreen. Hair care products such as shampoos, conditioners, styling gels, and hair oils could also feature the badge. In a further embodiment, data may be collected on an individual user, and the badge may evolve embodiments through a digital interface, incorporating personalized scoring mechanisms. Furthermore, the badge may be relevant to prescription drugs, including medications prescribed for various medical conditions such as hypertension, diabetes, asthma, and depression. Supplements like multivitamins, omega-3 fatty acids, probiotics, and herbal extracts could also be subject to the badge concept. In an additional embodiment, the badge may identify and communicate what is and isn't beneficial for the user's dietary requirements and preferences. The badge thus transforms from a generic quality indicator to a personalized guide tailored to the user's unique nutritional needs and goals. In some embodiments, the badge may include but not limited to cosmetics, prescription drugs, supplements, electronic device, and more. The badge may serve as a visual indicator certifying the quality of the product's ingredients or components based on predefined criteria. Over time, the badge may be personalized based on needs customized to a phenotype and/or N of 1 application. As used in this disclosure, a "cohort digital badge" is a visual representation indicating the alimentary item is certified for a specific group of individuals, referred to as the "cohort." The cohort may consist of individuals sharing common characteristics, such as age group, dietary preferences, or health conditions. For instance, badge may indicate that alimentary item may be certified for individuals within the same age group as the user. By associating the badge with the cohort, users may quickly identify which alimentary items align with specific needs or preferences common to their cohort. In some embodiments, cohort digital badge 116 may be a digital symbol or recognition awarded to a defined group or category of entities (the cohort) that have achieved or demonstrated a particular standard, accomplishment, or characteristic identified through data analysis or assessment. To generate cohort digital badge, computing device 104 may compare the nutritional information of alimentary item to the nutritional requirements of cohort. Nutritional requirements of cohort may also be referred to as cohort nutrient data. As used in this disclosure, "nutritional requirements" are estimated amounts of nutrients required or suggested for consumption by members of a cohort. Nutritional requirements may be focused on certain diets such as low sodium, gluten free, diabetic meal, liquid diet, low carb, low fat, low sodium, or the like. Types of cuisine may also include foods associated with a particular dieting method such as, but not limited to, Paleo Diet, the Atkins Nutritional Approach™, and the like. Comparison may be facilitated by analyzing the nutritional data associated with alimentary array data 112, including factors such as macronutrient content, caloric value, and micronutrient composition. The nutritional requirements of cohort may be determined based on various factors, such as age, gender, dietary preferences, and health conditions. In a non-limiting example, computing device 104 may utilize machine learning algorithms to analyze the nutritional information of at least one alimentary item in relation to the specific nutritional needs of cohort. Machine learning algorithms may involve statistical modeling techniques to assess the adequacy of the at least one alimentary item in meeting the dietary requirements of the target group. For example, if a dish contains an appropriate balance of macronutrients and micronutrients within the specified ranges for the cohort, cohort digital badge 116 may be generated to indicate compliance with the nutritional standards.

With continued reference to FIG. 1, in some embodiments, cohort digital badge 116 may be adapted across various fields and applications, may extend beyond alimentary providers. In some embodiments, cohort digital badge 116 may apply to educational achievements (e.g., completing a course or program), professional certifications (e.g., skills or competency levels), community engagement (e.g., participation in community service), or any other context where entities are grouped based on shared criteria or accomplishments. In a non-limiting example, computing device 104 may enable software algorithms to interpret complex datasets associated with alimentary array data 112, such as nutritional information, source of ingredients, preparation methods, and various certifications or validations. In some embodiments, computing device 104 may be configured to aggregate and organize alimentary array data 112 into a format conducive to analysis. In some embodiments, classifying the user into user cohorts may include allocating the user to the user cohort using a clustering algorithm. As used in this disclosure, a "clustering algorithm" is a computational data analysis used to group a set of objects into clusters. Objects within the same cluster may be more similar to each other than to those in other clusters. In some embodiments, similarity may be determined based on certain attributes or characteristics of the objects, which may include various types of data points or matrices. In a non-limiting example, clustering algorithm may analyze user data 120 (e.g., preference, behavior, demographic information, and the like) to detect patterns and group users with similar profiles together. As a non-limiting example, user data 120 may include user biological extraction data 124 and user activity data 128. In some embodiments, clustering algorithm may be unsupervised. In some embodiments, clustering algorithm may be supervised. In some embodiments, clustering algorithm may be trained using clustering training data; clustering training data may include sets of user data each correlated to one or more user cohorts. In some embodiments a user may be assigned to multiple cohorts. In some embodiments, user data 120/user may be manually assigned to user cohorts using a variety of rules based on data ranges. For example, for user cohorts based on age, users 20 and under may be assigned to a first user cohort, users 20 to 35 may be assigned to a second user cohort, users 35-55 may be assigned to a third user cohort, and users 55+ may be assigned to a fourth user cohort. Similar methods could be used to manually assign user cohorts based on, as non-limiting examples, weight, blood pressure, caloric intake, body fat, and the like. In some embodiments, users may be assigned to user cohorts based on phenotype.

With continued reference to FIG. 1, in some embodiment, computing device 104 may be further configured to use a web crawler to collect validation data as a function of at least alimentary array data 112. As used in this disclosure, a "web crawler" is a software program that navigates the World Wide Web in a methodical, automated manner. For example, web crawler may index the content of websites across the internet by visiting specific website or online databases containing information about food items, ingredients, nutritional facts, or related data. Web crawler may be programmed to extract relevant information aligning with system 100. Data may be collected from a plurality of official sources such as nutritional databases or manufacturer websites. Web crawler may gather information from customer reviews and food critic reports available on various online platforms. By accessing user-generated content and professional critiques, web crawler may retrieve insights into the quality, taste, and overall satisfaction of consumers regarding specific food items. In a non-limiting example, web crawler may be programmed to visit specific websites, such as YELP or GOOGLE, or online databases that contain information about food items, ingredients, nutritional facts, or any other related data. In some embodiment, web crawler may search for and extract relevant information that aligns with system 100 for validation purposes. Information may include verifying the accuracy of nutritional information, sourcing methods, health certifications, or sustainability practices associated with alimentary items.

With continued reference to FIG. 1, as used in this disclosure, a "validation data" is data that is used to determine whether an alimentary item meets certain requirements. Validation data may take various forms depending on the context and requirements of the validation task. Validation data may include factual data points, measurements, test results, certifications, expert opinions, or other forms of evidence that provide assurance or confirmation of the validity or integrity of the subject under consideration. In a non-limiting example, system 100 for generating customized badges may utilize web crawler to collect validation data as a function of alimentary array data 112. For instance, system 100 may aim to verify the organic certification status of alimentary items listed in its database. Web crawler may be programmed to traverse relevant websites of certification agencies or regulatory bodies, systematically scanning for information related to organic certifications. Upon locating pertinent data, such as certification numbers, expiration dates, or product listings, web crawler extracts and compiles validation data into a structured format. Additionally, system 100 may employ data processing algorithms to cross-reference the collected validation data with the corresponding alimentary array data 112, ensuring alignment and accuracy. The validation process may serve to authenticate the organic certification status of the listed alimentary items, may provide assurance to users regarding the quality and compliance of the products. In an additional embodiment, system 100 may be configured to use web crawler to generate cohort badge as a function of validation data. For instance, user may utilize a mobile application to scan a product barcode or menu while shopping at a grocery store. The application, integrated with the system, initiates web crawling process in real-time to retrieve validation data related to the scanned product or food. Web crawler may navigate through reputable online sources, such as official product websites, certification databases, or consumer advocacy platforms, to gather information pertinent to the product's attributes, certifications, and quality standards.

With continued reference to FIG. 1, validation data may be classified into validation categories. A "validation category," for the purposes of this disclosure, is a group for validation data concerning the effect of the validation data on an item's validation status. Classifying validation data into a plurality of categories may involve the systematic categorization of validation information based on specific criteria or attributes. Process may be accomplished through data processing techniques and algorithms that analyze validation data and assign it to predefined categories or classes. These categories may be defined based on various factors such as the type of validation, the nature of the attribute being validated, or the relevance to the system's objectives. For example, system may aim to classify validation data related to food products into categories such as organic certification, fair trade certification, gluten-free certification, and non-GMO certification. As another example, validation categories may include positive feedback, neutral feedback, negative feedback, and the like. For example, a positive review left by a critic or customer may be classified to the positive feedback category. System may employ algorithms to analyze validation data and identify key attributes or indicators associated with each certification type. It may then assign validation data to the corresponding category based on the presence or absence of these attributes. In some embodiments, a clustering algorithm, such as any clustering algorithm described in this disclosure may be used to sort validation data into validation categories. In some embodiments, clustering algorithm may be unsupervised.

With continued reference to FIG. 1, validation data may be classified into validation categories using a validation classifier. In some embodiments, validation classifier may be trained using unsupervised training. In some embodiments, validation classifier may be trained using supervised training. Validation classifier may be trained using validation classification training data. Validation classification training data may include sets of validation data correlated to validation categories. In some embodiments, validation classification training data may be retrieved from a database such as a training data database.

Still referring to FIG. 1, system 100 for generating a customized badge may include using computing device 104 to receive user data 120, wherein user data 120 may include user biological extraction data 124. As used in this disclosure, a "customized badge" is a visual representation tailored to an individual user based on specific attributes, preferences, achievements, or characteristics. In some embodiments, the customized badges may be dynamically generated and personalized to reflect the unique profile or status of each user. In some embodiments, customized badges may incorporate various elements such as icons, text labels, colors, and graphical symbols to communicate information about the user's accomplishments, affiliations, or traits. In additional embodiments, customized badges may serve as a means of recognition, identification, or validation within a particular context or community, providing users with a visual representation of their individuality, achievements, or affiliations. As used in this disclosure, "user data" is data describing a user or the health of a user. User data 120 may include any files, documents, images, profile pictures, messages, recordings, chat logs, transcripts, etc. As used in this disclosure, "biological extraction data" refers to any element and/or elements of data relating to or describing a biological extraction. A biological extraction may include a physically extracted sample, where a "physically extracted sample" as used in this disclosure is a sample obtained by removing and analyzing tissue and/or fluid. As used in this disclosure, "biological extraction," may refer to an element of user data 120 corresponding to a category, including without limitation, microbiome analysis, blood test results, gut wall and food sensitivity analysis, toxicity report, medical history, biomarker, genetic or epigenetic indication, or any chemical, biological, or physiological markers of data of a user. Physically extracted sample may include without limitation a blood sample, a tissue sample, a buccal swab, a mucous sample, a stool sample, a hair sample, a fingernail sample, or the like. Physically extracted sample may include, as a non-limiting example, at least a blood sample. As a further non-limiting example, a biological extraction may include at least a genetic sample. At least a genetic sample may include a complete genome of a person or any portion thereof. At least a genetic sample may include a DNA sample and/or an RNA sample. At least a biological extraction may include an epigenetic sample, a proteomic sample, a tissue sample, a biopsy, and/or any other physically extracted sample. At least a biological extraction may include an endocrinal sample.

With continued reference to FIG. 1, user data 120 may be received from a monitoring device. As used in this disclosure "monitoring device" is an electronic device that is worn on the person of a user, such as without limitation close to and/or on the surface of the skin, wherein the device can detect, analyze, and transmit information concerning a body signal such as a vital sign, and/or ambient datum, wherein allowing immediate biofeedback to be sent to the user wearing the device. Monitoring device may include, without limitation, any device that further collects, stores, and analyzes data associated with user datums. Monitoring device may consist of, without limitation, near-body electronics, on-body electronics, in-body electronics, electronic textiles, smart watches, smart glasses, smart clothing, fitness trackers, body sensors, wearable cameras, head-mounted displays, body worn cameras, Bluetooth headsets, wristbands, smart garments, chest straps, sports watches, fitness monitors, and the like thereof. Monitoring device may include, without limitation, earphones, earbuds, headsets, bras, suits, jackets, trousers, shirts, pants, socks, bracelets, necklaces, brooches, rings, jewelry, AR HMDs, VR HMDs, exoskeletons, location trackers, and gesture control wearables. Monitoring device may include blood glucose sensors. Monitoring device may include devices such as APPLE WATCH, PIXEL WATCH, FITBIT, and the like.

Continuing in reference to FIG. 1, computing device 104 is configured to receive at least a biological extraction of a user. User biological extraction data 124 may include medical histories, diseases, surgeries, injuries, symptoms, exercise frequency, sleep patterns, lifestyle habits, and the like, which may be used to inform a user's lifestyle, including diet, and the like. User biological extraction data 124 may include diet information such as nutrition deficiencies, food intolerances, allergies, and the like. In some embodiments, user biological extraction data 124 may be received from a wearable device located at a user, User biological extraction data 124 may be provided by a second individual on behalf of a user, for instance and without limitation a physician, medical professional, nurse, hospice care worker, mental health professional, and the like. User biological extraction data 124 may alternatively or additionally include a plurality of dimensions of user biological extraction data 124 any data used as a biological extraction as described in U.S. Nonprovisional application Ser. No. 16/886,647, filed on May 28, 2020, and entitled "METHODS AND SYSTEMS FOR DETERMINING A PLURALITY OF BIOLOGICAL OUTCOMES USING A PLURALITY OF DIMENSIONS OF BIOLOGICAL EXTRACTION USER DATA AND ARTIFICIAL INTELLIGENCE," the entirety of which is incorporated herein by reference.

Continuing in reference to FIG. 1, a "wearable device," as used in this disclosure, is a device on the person of a user that collects biological extraction data about the user, where "on the person" indicates that the device is portable and is either worn on the user, inside the user, in contact with user, or in close proximity to the user. User biological extraction data 124 may include data generated, collected, and/or transmitted by a wearable device and may include wearables worn by the by user such as an accelerometer, pedometer, gyroscope, fitness trackers, force monitors, motion sensors; wearables in contact with a user's skin such as in electrocardiogramlectrooculography (EOG), bioimpedance, blood pressure and heart rate monitoring, oxygenation data, biosensors; wearables that may be placed inside and/or within a user, for instance, beneath the skin, such as pacemakers, capsule cameras, biosensors, endoscopes, and the like; and/or devices that may be adapted to be placed outside of the user but aimed at collecting data pertaining to the user, such as audio-visual capture, social media platform data, magnetic resonance imaging (MRI), X-ray imaging, facial recognition, and the like. Wearable devices may be any devices capably and useful in acquiring, measuring, and/or transmitting biometrics—body measurements and may calculate related to human characteristics. Biometric data may include any data that is useful in biometrically identifying a user, including fingerprints, retina scans, genetic material data, physical appearance, voice recognition, or any other data useful in identifying an individual.

Continuing in reference to FIG. 1, computing device 104 is configured to receive at least a datum of user activity data, wherein user activity data may include data collected via user input through a graphical user interface. As used in this disclosure, "user activity data," is data that relates to user activity while using a computing device 104, including any user input. As used in this disclosure, a "user input," is an element of user-derived information that is intended to communicate with computing device 104 via an interface. User activity data 128 may include user input regarding online shopping, web browser data, social media use, recent purchases, and the like, which may be useful in curating and/or improving a graphical user interface display. A "graphical user interface," as used in this disclosure, is any form of a user interface that allows a user to interface with an electronic device through graphical icons and displays, audio indicators, text-based interface, typed command labels, text navigation, and the like, wherein the interface is configured to provide information to the user and accept input from the user.

Continuing in reference to FIG. 1, receiving, from a wearable device located at a user, at least a biological extraction and at least a datum of user activity data may include generating, using the wearable device data, a first training set including a plurality of first data entries including at least an element of wearable device data correlated to at least an element of biological extraction. "Training data," as used herein, is data containing correlations that a machine-learning process may use to model relationships between two or more categories of data elements, as described in further detail below. For instance, and without limitation, training data 132 may include a plurality of data entries, each entry representing a set of data elements that were recorded, received, and/or generated together; data elements may be correlated by shared existence in a given data entry, by proximity in a given data entry, or the like. Multiple data entries in training data 132 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories.

Multiple categories of data elements may be related in training data 132 according to various correlations; correlations may indicate causative and/or predictive links between categories of data elements, which may be modeled as relationships such as mathematical relationships by machine-learning processes as described in further detail below. Training data 132 may be formatted and/or organized by categories of data elements, for instance by associating data elements with one or more descriptors corresponding to categories of data elements. As a non-limiting example, training data 132 may include data entered in standardized forms by persons or processes, such that entry of a given data element in a given field in a form may be mapped to one or more descriptors of categories. Elements in training data 132 may be linked to descriptors of categories by tags, tokens, or other data elements; for instance, and without limitation, training data 132 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 1, training data 132 may include one or more elements that are not categorized; that is, training data 132 may not be formatted or contain descriptors for some elements of data. Machine-learning algorithms and/or other processes may sort training data 132 according to one or more categorizations using, for instance, natural language processing algorithms, tokenization, detection of correlated values in raw data and the like; categories may be generated using correlation and/or other processing algorithms, as described in further detail below. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 180 to be made applicable for two or more distinct machine-learning algorithms as described in further detail herein. Training data 132 used by machine-learning module may correlate any input data as described in this disclosure to any output data as described in this disclosure, as described in further detail below.

Further referring to FIG. 1, training data 132 may be filtered, sorted, and/or selected using one or more supervised and/or unsupervised machine-learning processes and/or models as described in further detail below; such models may include without limitation a training data classifier, as described in further detail below. In non-limiting exemplary embodiments, wearable device data may include organization into training data 132 sets for determinations described herein, wherein wearable device data may be a set of signals, for instance from a biosensor, wherein the signals may be correlated to at least an element of biological extraction such as blood pressure during exercise. Alternatively or additionally, wearable device data may include biometrics that may be useful in generating training data 132 that may train a machine-learning model for an outputting a biometric identification of a user. User activity data 112 may include organization into training data 132 sets for determinations described herein.

Continuing in reference to FIG. 1, receiving at least a user biological extraction data 124 may include training a label machine-learning model using training data, wherein training data includes a plurality of data entries, each data entry of the plurality of data entries including at least an element of user biological extraction data 124 correlated to a user function, and generating, using the label machine-learning model, a compatibility label. A label machine-learning model 136 may be generated by a computing device 104 performing a machine-learning algorithm and/or process by using a machine-learning module, as described in further detail below. Training data 132 may originate from the wearable device data present in a user's user biological extraction data 124, as described above, for instance user ECG/EKG signals as a function of time wherein the training data 132 may relate to user functions such as deep sleep, light sleep, rapid eye movement (REM) sleep, and states of being awake.

Continuing in reference to FIG. 1, a "compatibility label," as used in this disclosure, is an identifier that relates user biological extraction data 124 to a user function such as exercise, sleep, and the like, wherein the compatibility label contains qualitative and/or quantitative data that relates how accurate the biological extraction relate to the user function, the nature of the user function, among other data. A compatibility label 140 may include, for instance and without limitation, a variety of leisure activities such as biking, swimming, hiking, and the like, mapped to wearable device data such as a pedometer, gyroscope, accelerometer, bioimpedance, and the like, wherein the compatibility label 140 may also include a quantitative metrics that relates how well the wearable device data maps to the activity. For instance, and without limitation, a compatibility label 140 may qualitative data that indicates a category of user function as 'running' and may further include quantitative data depicting a 75% certainty that the wearable device data illustrates a user is running. In such an example, compatibility label 140 may also include additional quantitative data that relates the amount of running in distance, time, the frequency of engaging in running, the level of mastery of running, and the like.

Continuing in reference to FIG. 1, computing device 104 is configured to classify the user biological extraction data 124 and the at least a datum of user activity data 128 to at least a datum of a user fingerprint 144. A "user fingerprint," is a file generated by system 100 that encompasses all user biological extraction data 124 and user activity data 128. For instance, and without limitation, a user fingerprint 144 may include data concerning wearable device data and user biological extraction data 124 determined from the wearable device data. In non-limiting illustrative examples, user fingerprint 144 may include user activity data 128 such as a user's propensity to run and may include a recent purchase of running shoes and/or running apparel; user fingerprint 144 may be referred to by computing device 104 to generate 'guide recommendations' directed toward something other than running shoes and/or apparel, but that still matches the interests of a person who enjoys running. A user fingerprint 144 may be used by system 100 to identify redundancies in what is displayed using a GUI so that those redundancies can be filtered, as described in further detail below. A user fingerprint 144 may be used by system 100 to identify gaps, or GUI-displayable elements that have not been presented to a user before, as described in further detail below. User biological extraction data 124 and user activity data 128 may be classified into subsets of data to generate a user fingerprint 144, for instance and without limitation, as described in U.S. Nonprovisional application Ser. No. 16/532,283, filed on Aug. 5, 2019, and entitled "METHODS AND SYSTEMS FOR USING ARTIFICIAL INTELLIGENCE TO ANALYZE USER ACTIVITY DATA," the entirety of which is incorporated herein by reference.

Continuing in reference to FIG. 1, classifying the user biological extraction data 124 and the at least a datum of user activity data 128 may include using a classification machine-learning process to generate a classifier. A classification machine-learning process 148 may include any machine-learning algorithm and/or process performed by using a machine-learning module, as described in further detail below. A "classifier," as used in this disclosure, is configured to output at least a datum that labels or otherwise identifies a set of data that are clustered together, as described in further detail below. A classifier 152 may represent a body of data that is a series of compatibility labels 140 from a plurality of users associated with diagnostic outputs. In non-limiting illustrative examples, a classifier 152 may relate to activity data, web-browsing patterns, purchasing patterns, interests, wearable device data, biological extraction, or the like, which may be a packet of data used to search or otherwise identify a user fingerprint 144, diagnostic output, guided recommendation, or any other determination output by system 100 as described herein.

Continuing in reference to FIG. 1, a classifier 152 may describe a subset of diagnostic outputs. A "diagnostic output," as used in this disclosure, is a subset of user biological extraction data 124 and/or user activity data 128 as a function of past user data contained in the user fingerprint 144. In non-limiting illustrative examples, diagnostic output 156 may include, for instance, a cache of user browsing history that relates to shopping for objects associated with a compatibility label 140. In such an example, a classifier 152 may contain diagnostic outputs 156 describing a plurality of compatibility labels 140 from a plurality of alike users, wherein such a classifier 152 may help improve the full spectrum and accuracy of 'guided recommendations as it relates to, for instance, purchasing. In further non-limiting illustrative examples, a diagnostic output 156 may concern how compatibility labels 140 corresponds to user activity data 128—i.e. how do compatible labels 124 relate to how a user spends their time, money, internet usage, and the like. In this way, a diagnostic output 156 may be used by system 100 to more accurately match how "willing" a user may be to spend money on an object based on how often they engage in an activity relating to the object. Furthermore, using a classification machine-learning process 148 to generate classifiers 152 may increase the robustness of any one diagnostic output 156. Classification machine-learning process 148 may accept user biological extraction data 124 and user activity data 128 and generate a classifier 152 that assigns categorical class labels to subsets of the user biological extraction data 124 as it may relate, match, or otherwise be categorized with user activity data 128. Such classifications and classifiers, along with the associated categorized data may be stored in the user fingerprint 144.

Continuing in reference to FIG. 1, computing device 104 is configured to select at least a compatible element 160 as a function of user fingerprint 144. In some embodiments, compatible element 160 may include a guided recommendation 164. A "compatible element," as used in this disclosure, is a packet of data the GUI will receive to 'know' what should be displayed, including the order, what the elements are, and how they are connected to wearable BE, past user experience, and/or any other data contained in the user fingerprint 144, user biological extraction data 124, training data, and the like. A "guided recommendation," as used in this disclosure is an output that directs a GUI to retrieve and display a recommended internet-based activity relating to the classifier 152. For instance and without limitation, a classifier 152 may describe a subset of diagnostic outputs 156 concerning "running," wherein the guided recommendation instructs a GUI to point user toward shopping for running apparel, running shoes, locating and signing up for a local running club, a running blog, the Boston marathon, purchasing a stationary bike, engaging in other aerobic exercises, using other wearables, etc. In such an instance, guided recommendation 164 may include a packet of data concerning the content to be display by the GUI, the chronology (including the time to display, how it should change over time, what to display each time a user leaves and returns to GUI, etc.), etc. Guided recommendation may include hyperlinked sources, for instance and without limitation, to websites via the internet, documents, mobile applications, games, messaging conversations, emailing, and the like. Guided recommendation 164 may instruct a GUI to display, connect with, or otherwise support any application or function available to a computing device 104 such as a "smartphone," laptop, tablet, internet-of-things (IoT) device, vehicle display, and the like.

Continuing in reference to FIG. 1, selecting a compatible element 160 may include using an element machine-learning process to select the compatible element as a function of the classifier 152. An element machine-learning process 168 may include any machine-learning algorithm and/or process performed by using a machine-learning module, as described in further detail below. Selecting at least a compatible element 160 may refer to selecting from at least a data record with a particular association, as described above, within the training data. For instance, such an association may be described by a classifier 152, as described herein. In non-limiting illustrative examples, an element machine-learning process 168 may accept an input that is a plurality of compatible elements 160, and may select at least a compatible element 160 from the plurality as a function of a classifier 152, wherein the compatible element 160 most supported by a classifier 152 may be selected. Element machine-learning process 168 may select compatible element 160 based on a criterion contained in a particular classifier 152, for instance and without limitation, a describing biological data that directly relates to recent shopping as it relates to the user.

Continuing in reference to FIG. 1, selecting a compatible element 160 using the element machine-learning process 168 may include generating the guided recommendation. Element machine-learning process 168 may accept an input that is a compatible element 160 and then generate an output that is a guided recommendation based on the data contained in the compatible element 160. In non-limiting illustrative examples, a compatible element 160 may include a guided recommendation concerning a customizable element of data to be displayed to a user using the GUI, wherein a guided recommendation may be a user-input-compatible image to a specific purchasable object a user has a high expectation to buy based on wearable device data and biometrics.

Continuing in reference to FIG. 1, selecting the compatible element 160 may include using the element machine-learning process 168 to filter the guided recommendation as a function the user fingerprint 144. Element machine-learning process 168 may accept an input that is a plurality of generated guided recommendations 164 and filter the guided recommendations 164 as a function of the user data contained in the user fingerprint 144, and generate a single, targeted guided recommendation. For instance, and without recommendation, element machine-learning process 168 may filter corresponding to the guided recommendation which is most supported by wearable device data contained in the user fingerprint 144. Alternatively or additionally, element machine-learning process 168 may filter guided recommendations 164 based on recent purchases as logged in the user activity data 112 in the user fingerprint 144. In such an example, a user may have recently purchased a first object, which may guide element machine-learning process 168 to 'filter out' guided recommendations 164 in a GUI that guide a user to purchasing a first object, and instead element machine-learning process 168 may output a guided recommendation that is most closely associated with the 'filtered out' guided recommendations 164. Element machine-learning process 168 may accomplish that by selecting based off of training data sets, classifiers 152, or the like, as described above, which may describe data contained in user fingerprint 144.

Continuing in reference to FIG. 1, selecting the compatible element 160 as a function of filtering the guided recommendation may include ranking, using a ranking machine learning process, guided recommendations 164 as a function of a compatibility index. Determining which guided recommendations 164 to filter may be determined by using a compatibility index. Compatibility index 172 may include qualitative data such as a determination of 'include' and/or 'not include.' Compatibility index 172 may include quantitative data such as a numerical value that measures the 'compatibility with the user,' 'likeliness to respond,' and the like. Compatibility index 172 may include a score and/or ranking, as determined by a ranking machine-learning process 176. Ranking machine-learning process 176 may include any machine-learning algorithm and/or process performed by using a machine-learning module, as described in further detail below. Ranking machine-learning process 176 may rank each guided recommendation as a function of data contained in user fingerprint 144. For instance, and without limitation, ranking machine-learning process 176 may highly rank the guided recommendation that most closely resembles activities corresponding to user wearable device data.

Continuing in reference to FIG. 1, ranking machine-learning process 176 may assist element machine-learning process 168 in filtering out guided recommendations 164 based on compatibility index 172. A "compatibility index," as used in this disclosure is a qualitative and/or quantitative metric relating to the compatibility a GUI-displayable element may have for the GUI. In non-limiting illustrative examples, compatibility index 172 may represent an index about a 'threshold value' that element machine-learning process 168 may accept as an input value for "making the decision" to send elements to the GUI for presentation, what order the elements should be in, the chronology of elements, etc. Elements may be for instance guided recommendations 164, including text, images, audio-visual elements, hyperlinked elements, and the like. For instance and without limitation, each time a user opens the GUI, and reopens later, different elements may be displayed, the order of elements may change, etc., based on the ranking of elements based on the compatibility index 172. Compatibility index 172 may represent a ranking in a list, such as a queue, so that once a user has selected an element and/or acted upon an element, the queue may dictate what is to be displayed next based on compatibility index 172.

With continued reference to FIG. 1, in some embodiments, computing device 104 may be configured to determine an engagement hazard as a function of ordered compatible elements 160. For the purposes of this disclosure, an "engagement hazard" is an adverse outcome resulting from the consumption of food that is substandard in terms of safety, nutrition, taste, or overall quality. As a non-limiting example, engagement hazard may include health risk, nutritional risk, or the like. For example, and without limitation, engagement hazard may include lack of essential nutrients leading to deficiencies and associated health issues, high levels of sugar, salt, or unhealthy fats can contribute to chronic diseases such as obesity, diabetes, and cardiovascular conditions, exposure to harmful chemicals, contamination, or the like. In some embodiments, computing device 104 may determine engagement hazard for compatible elements 160 that have a low ranking in ordered compatible elements 160. In some embodiments, computing device 104 may be configured to generate hazard training data. In a non-limiting example, hazard training data may include correlations between exemplary compatible elements and exemplary engagement hazards. In some embodiments, hazard training data may be stored in database. In some embodiments, hazard training data may be received from one or more users, database, external computing devices, and/or previous iterations of processing. As a non-limiting example, hazard training data may include instructions from a user, who may be an expert user, a past user in embodiments disclosed herein, or the like, which may be stored in memory and/or stored in database, where the instructions may include labeling of training examples. In some embodiments, hazard training data may be updated iteratively using a feedback loop. As a non-limiting example, computing device 104 may update hazard training data iteratively through a feedback loop as a function of compatible elements 160, user data 140, or the like. In some embodiments, computing device 104 may be configured to generate hazard machine-learning model. In a non-limiting example, generating hazard machine-learning model may include training, retraining, or fine-tuning hazard machine-learning model using hazard training data or updated hazard training data. In some embodiments, computing device 104 may be configured to determine engagement hazard using hazard machine-learning model (i.e. trained or updated hazard machine-learning model). In some embodiments, a user may be classified to a user cohort and computing device 104 may determine engagement hazard based on the user cohort using a machine-learning module and the resulting output may be used to update hazard training data. As a non-limiting example, computing device 104 may determine engagement hazard that is specific to a user that has medical or health conditions using cohort classifier and hazard machine-learning model.

With continued reference to FIG. 1, in some embodiments, computing device 104 may generate an element modification suggestion as a function of ordered compatible elements 160. For the purposes of this disclosure, an "element modification suggestion" is a suggestion given to change specific ingredients, cooking methods, or portions in compatible elements. As a non-limiting example, element modification suggestion may include ingredient substitution, portion adjustments, cooking technique changes, flavor enhancement, or the like. For example, and without limitation, element modification suggestion may include adding or altering spices modifying quantity of ingredients, altering specific ingredients to others, or the like. In some embodiments, computing device 104 may generate element modification suggestion as a function of ordered compatible elements 160. As a non-limiting example, computing device 104 may generate element modification suggestion for compatible elements 160 that has a low ranking. In some embodiments, computing device 104 may be configured to generate suggestion training data. In a non-limiting example, suggestion training data may include correlations between exemplary compatible elements and exemplary element modification suggestions. In some embodiments, suggestion training data may be stored in database. In some embodiments, suggestion training data may be received from one or more users, database, external computing devices, and/or previous iterations of processing. As a non-limiting example, suggestion training data may include instructions from a user, who may be an expert user, a past user in embodiments disclosed herein, or the like, which may be stored in memory and/or stored in database, where the instructions may include labeling of training examples. In some embodiments, suggestion training data may be updated iteratively using a feedback loop. As a non-limiting example, computing device 104 may update suggestion training data iteratively through a feedback loop as a function of compatible elements 160, user data 140, or the like. In some embodiments, computing device 104 may be configured to generate suggestion machine-learning model. In a non-limiting example, generating suggestion machine-learning model may include training, retraining, or fine-tuning suggestion machine-learning model using suggestion training data or updated suggestion training data. In some embodiments, computing device 104 may be configured to determine element modification suggestion using suggestion machine-learning model (i.e. trained or updated suggestion machine-learning model). In some embodiments, a user may be classified to a user cohort and computing device 104 may determine engagement hazard based on the user cohort using a machine-learning module and the resulting output may be used to update suggestion training data. As a non-limiting example, computing device 104 may determine element modification suggestion that is specific to a user that has medical or health conditions using cohort classifier and suggestion machine-learning model.

With continued reference to FIG. 1, in some embodiment, system 100 may be further configured to track a user interaction. As used in this disclosure, a "user interaction" is an engagement or activity performed by a user related to the alimentary provider or alimentary array data 112 within the system. User interaction may include a range of actions, such as selecting, viewing, or reviewing specific alimentary items provided by the alimentary provider, inputting dietary preferences or restrictions, responding to recommendations, participating in surveys or feedback mechanisms about the alimentary items, or any other form of engagement that involves direct interaction between the user and the digital platform's features or content concerning the alimentary provider. In some embodiment, system 100 may be further configured to analyze user interaction with alimentary array data 112. For example, a user may access a mobile application or website associated with system 100 and begins browsing through a list of alimentary items offered by various alimentary providers. As the user navigates through the platform, clicks on specific items, adds items to their cart, views product details, or applies filters to refine their search, each of these actions is tracked and recorded by system. For instance, system 100 may identify which types of alimentary items are most frequently viewed or purchased by users, which features or functionalities attract higher engagement rates, or how user behavior may vary across different demographic segments.

With continued reference to FIG. 1, in some embodiments, computing device 104 may be configured to generate an engagement return as a function of user interaction related to compatible elements 160. For the purposes of this disclosure, an "engagement return" is a benefit, prize, or recognition given to users who demonstrate high levels of engagements with compatible elements. As a non-limiting example, engagement may include credits, points, exclusive access, physical prize, recognition, digital badges, or the like. In a non-limiting example, computing device 104 may generate engagement return for users that engages or uses compatible elements 160 that are generated for the users above a return threshold. For the purposes of this disclosure, a "return threshold" is a predefined level of activity or achievement that users must reach to qualify for an engagement return. As a non-limiting example, return threshold may include a level of user interaction that qualifies to receive engagement return. In some embodiments, computing device 104 may generate customized badges as a function of engagement return. As a non-limiting example, customized badges or user digital badges may reflect a level of user interaction.

Still referring to FIG. 1, in some embodiments, computing device 104 may be configured to order a plurality of compatible elements 160 as a function of user interaction. In some embodiments, user interaction may include a flavor feedback. For the purposes of this disclosure, a "flavor feedback" is information collected from users about their favorite flavors or types of food, which reflects their individual tastes and preferences. As a non-limiting example, flavor feedback may include specific ingredients, specific spices, or the like. In some embodiments, computing device 104 may generate flavor feedback by analyzing user interaction. As a non-limiting example, computing device 104 may analyze user interaction by analyzing which compatible elements 160 the user have clicked or consumed the most. In some embodiments, computing device 104 may be configured to generate flavor feedback training data. In a non-limiting example, flavor feedback training data may include correlations between exemplary user interaction and exemplary flavor feedback. In some embodiments, flavor feedback training data may be stored in database. In some embodiments, flavor feedback training data may be received from one or more users, database, external computing devices, and/or previous iterations of processing. As a non-limiting example, flavor feedback training data may include instructions from a user, who may be an expert user, a past user in embodiments disclosed herein, or the like, which may be stored in memory and/or stored in database, where the instructions may include labeling of training examples. In some embodiments, flavor feedback training data may be updated iteratively using a feedback loop. As a non-limiting example, computing device 104 may update flavor feedback training data iteratively through a feedback loop as a function of user interaction, user data 140, or the like. In some embodiments, computing device 104 may be configured to generate flavor feedback machine-learning model. In a non-limiting example, generating flavor feedback machine-learning model may include training, retraining, or fine-tuning flavor feedback machine-learning model using flavor feedback training data or updated flavor feedback training data. In some embodiments, computing device 104 may be configured to generate flavor feedback using flavor feedback machine-learning model (i.e. trained or updated flavor feedback machine-learning model). In some embodiments, user may be classified to a user cohort using a cohort classifier. Cohort classifier may be consistent with any classifier discussed in this disclosure. Cohort classifier may be trained on cohort training data, wherein the cohort training data may include user data or user correlated to user cohorts. In some embodiments, a user may be classified to a user cohort and computing device 104 may determine flavor feedback based on the user cohort using a machine-learning module and the resulting output may be used to update flavor feedback training data.

Still referring to FIG. 1, system 100 for generating customized badge may include at least a computing device 104 to update cohort digital badge 116 to user digital badge 180 as a function of plurality of compatible elements 160. In a non-limiting example, cohort digital badge 116 may be labeled as a user digital badge 180, copied to an empty or previously generated instance of a user digital batch, and/or combined with and/or added to an existing user digital badge. As used in this disclosure, a "user digital badge" is a digital representation or symbol generated for an individual user, personalized based on the analysis of user data. In some embodiments, user digital badges 180 may include a family digital badge. For the purposes of this disclosure, a "family digital badge" is a digital representation or symbol generated for a family member of a user, personalized based on information of the family member. As a non-limiting example, family digital badge may include compatible elements 160 that are related to family member of user. In a non-limiting example, user data 140 may include information related to user's family and computing device 104 may generate compatible element 160 as a function of the information of the family, then this may be used to generate family digital badge. In a non-limiting example, user may manipulate graphical user interface to get family digital interface. In some embodiments, the user digital badge 180 may serve as a unique identifier or credential that reflects the user's specific health-related characteristics, achievements, or statuses derived from their biological data. The process of updating a cohort digital badge 116 to user digital badge 180 may involve tailoring the recognition or certification initially applied to a group (cohort) based on general criteria, to one that is specifically customized for an individual. In some embodiments, computing device 104 may be configured to generate user digital badges 180 by selecting cohort digital badge that corresponds to compatible elements 160. The customization of digital badge may use user biological extraction data 124, which may include information derived from genetic analysis, biomarker assessments, physiological measurements, or any other biological data points relevant to the user's health and well-being. In a non-limiting example, user biological extraction data 124, using computing device 104, may be classified to user fingerprint 144 as a function of user activity data 128, and the resulting output may be used to select compatible elements 160, which can be used to generate user digital badge; this flow can indicate that computing device 104 may use user biological extraction data 124 to generate user digital badges 180. In a non-limiting example, a user may regularly track their physical activity, dietary habits, and health metrics using a wearable fitness device and a mobile health app. System 100 may be equipped with algorithms and analysis tools, monitors and analyzes user biological extraction data 124 derived from these sources. In some embodiments, user biological extraction data 124 may include information such as heart rate variability, blood glucose levels, sleep patterns, and genetic predispositions to certain health conditions. As user continues to engage with system 100 and accumulate more user biological extraction data 124 over time, system 100 may dynamically update their cohort digital badge 116 to reflect their evolving health profile and achievements. For instance, user may consistently maintain a healthy weight, may achieve fitness milestones, and demonstrate favorable biomarker trends indicative of good cardiovascular health, system 100 may adjust cohort digital badge 116 to recognize certain accomplishments. In some embodiments, system 100 may utilize machine learning algorithms to analyze user biological extraction data 124 in relation to established health benchmarks, personalized health goals, and demographic factors. Based on analysis, system 100 may customize user's digital badge to provide personalized recommendations, insights, or certifications tailored to their unique health needs and objectives. For example, user may have a genetic predisposition to gluten sensitivity, system 100 may recommend gluten-free food options and certify them with user digital badge 180 indicating suitability for individuals with gluten intolerance. Users may also use the system to scan the menu to have a quick view of products.

With continued reference to FIG. 1, additional disclosure related to user digital badge may be found 180 in U.S. Nonprovisional application Ser. No. 17/062,740, filed on Oct. 5, 2020, and entitled "METHODS AND SYSTEMS FOR ARRANGING AND DISPLAYING GUIDED RECOMMENDATIONS VIA A GRAPHICAL USER INTERFACE BASED ON BIOLOGICAL EXTRACTION,", the entirety of which is incorporated herein by reference.

With continued reference to FIG. 1, in some embodiments, generating user digital badge 180 may include performing an N-of-1 analysis 156 to user data 120 compared to cohort data 108. As used in this disclosure, "N-of-1 analysis" is an analysis that is tailored to a particular user using user-specific data. In another embodiment, system 100 may be further configured to integrate environmental data into user digital badge 180. In some embodiments, integrating the environmental data into the user digital badge may include training an environmental score machine-learning model using environmental score training data, wherein the environmental score training data comprises a plurality of environmental data correlated to environmental score. In some embodiments, training of the environmental score machine-learning model may involve exposing it to labeled environmental data, where each data point may be associated with a known environmental score. During the training process, environmental score machine-learning model may learn to recognize patterns and relationships within environmental data that contribute to higher or lower environmental score. Environmental score machine-learning model may be able to infer the environmental impact of different food items based on their ingredients, sourcing methods, production processes, and other relevant factors. Environmental score machine-learning model may be trained to deployed within system 100 to generate environmental score for alimentary array data 112. Environmental scores may be incorporated into user digital badge 180, providing users with information about the environmental sustainability of the food items they consume. As used in this disclosure, an "environmental score" is a quantitative or qualitative measure that assesses the environmental impact or sustainability performance of alimentary array data 112, such as food products or ingredients, based on their manufacturing processes, sourcing practices, and other relevant factors. The environmental score may be derived from an analysis of various environmental indicators, such as carbon emissions, water usage, land use, energy consumption, waste generation, and chemical usage, associated with the production lifecycle of alimentary items. After evaluating these factors, system 100 may quantify or rate the overall sustainability performance of alimentary array data 112, assigning alimentary array data 112 a score that reflects environmental impact relative to established benchmarks or standards. For example, a food product with a lower environmental score may be considered more sustainable or environmentally friendly, indicating that its production processes have minimal negative impacts on the ecosystem and natural resources. Conversely, a product with a higher environmental score may signify greater environmental harm or resource depletion associated with its production methods. In another embodiment, system 100 may include incorporating environmental score into cohort digital badge 116. In some embodiments, incorporating environmental score into cohort digital badge 116 may enhance the badge's utility by providing users with information about the collective environmental impact of alimentary items associated with a specific group or category. This integration of environmental scores into the cohort digital badge 116 allows users to gain insights into the overall sustainability performance of alimentary array data 112 within the cohort, facilitating informed decision-making and promoting environmentally conscious consumption behaviors. For example, cohort digital badge 116 may be generated for a group of organic food products sourced from local farms, or it may be generated for a user as he or she scans restaurant menu. In addition to displaying traditional criteria such as nutritional value and health benefits, cohort digital badge 116 may also incorporate environmental score that reflects the sustainability practices employed by the participating alimentary providers. Environmental score may be calculated based on factors such as organic farming practices, use of renewable energy sources, reduction of greenhouse gas emissions, and conservation of natural resources.

With continued reference to FIG. 1, in some embodiments, integrating environmental data into user digital badge 180 may include receiving environmental data for the alimentary item. This environmental data may include information related to the environmental impact of the food item, such as its carbon footprint, water usage, energy consumption during production, sourcing methods, packaging materials, and any relevant certifications or eco-labels. By receiving and incorporating environmental data into user digital badge 180, users may gain insights into the environmental sustainability of the food items they consume, may allow users to make informed choices that align with user values and preferences. In some embodiments, environmental data may be collected using a data crawler, such as an environmental data crawler. Data crawler may be trained to crawl websites such as blogs, newspaper articles, governmental body websites, industry standard websites, industry watchdog websites, and the like. In some embodiments, environmental data may be processed using language processing algorithms. In some embodiments, this may include the use of a language processing module. Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module may operate to produce a language processing model. Language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Alternatively or additionally, and with continued reference to FIG. 1, language processing module may be produced using one or more large language models (LLMs).

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or computing device 104 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into computing device 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

With continued reference to FIG. 1, language processing module may be configured to identify words that are relevant to the environmental impact of an alimentary item. For example, words that appear in close proximity to phrases such as "environmentally friendly," "CO2 Neutral," "green," and the like may cause the alimentary item to be assigned a higher environmental score.

With continued reference to FIG. 1, in some embodiments, integrating environmental data into user digital badge 180 may include generating environmental score using environmental data and environmental score machine-learning model. System 100 may collect environmental data for the alimentary item, which may include factors such as carbon footprint, water usage, energy consumption, sourcing methods, and packaging materials. System 100 may then employ environmental score machine-learning model, trained to analyze environmental data and generate environmental score. Environmental score machine-learning model may be trained using environmental score training data. Environmental score training data may include environmental data correlated to environmental scores. In some embodiments, environmental score training data may include alimentary array data 112 and environmental data correlated to environmental scores. In some embodiments, system 100 may periodically update environmental machine-learning model 180. System 100 may calculate environmental score for the alimentary item. Environmental score may quantify the environmental impact of the item based on the factors analyzed. Environmental score may then be incorporated into user digital badge 180, providing users with a clear indication of the environmental sustainability of the alimentary item.

With continued reference to FIG. 1, in some embodiments, generating user digital badge 180 may further include selecting a preferred alimentary data as a function of user score data, wherein the preferred alimentary data may include a higher user score than an evaluated alimentary array data. As used in this disclosure, a "preferred alimentary data" refers to alimentary items or products that are prioritized or recommended to the user based on their individual preferences, health goals, or previous interactions with the system. The preferred alimentary data may be selected as a function of user score data, may encompass various metrics, assessments, or ratings assigned to alimentary items based on their alignment with the user's preferences, dietary requirements, nutritional needs, or other relevant criteria. For example, a user may be specified dietary preferences such as vegan, gluten-free, or low-sodium, and provide feedback indicating their preference for organic and locally sourced ingredients. System may utilize machine learning algorithms and personalized scoring mechanisms to evaluate and rank alimentary array data 112 according to their compatibility with user preferences and goals. In another embodiment, generating user digital badge 180 may include using a user score machine-learning model to generate the user score data. User score machine-learning model may be trained using score training data. Score training data may include user data 120 and alimentary items correlated to user score data.

Still referring to FIG. 1, system 100 for generating a customized badge comprises at least a computing device 104 to adjust user digital badge 180, wherein adjusting user digital badge 180 includes comparing received user data 120 with previous user data. In an embodiment, adjusting user digital badge 180 may further include comparing received user data with previous user data 120. In a further embodiment, at least a computing device 104 to compare user data 120 with previous user data 120 to identify changes in the user scores. In some embodiment, user digital badge 180 may include identifying changes within the user data 120. In some embodiments, memory may include instructions further configuring at least a computing device 104 to adjust user digital badge 180, wherein adjusting user digital badge 180 may include receiving a digital badge machine-learning model. Digital badge machine-learning model may be designed to analyze data inputs and update user digital badge 180 accordingly. Digital badge machine-learning model may learn continuously from user interactions, feedback, and changing environmental factors to optimize the information presented in user digital badge 180. By incorporating the digital badge machine-learning model, system 100 may adapt user digital badge 180 in real-time, providing users with personalized and up-to-date information according to user needs and preferences. In another embodiments, adjusting user digital badge 180 further includes training the digital badge machine-learning model using user-specific training data. Training data for digital badge machine-learning model may include digital badge training data. Digital badge training data may include alimentary array data and user data 120 correlated to cohort digital badges. Digital badge training data may include alimentary array data and user cohorts correlated to cohort digital badges. Digital badge training data may include alimentary array data and user data 120 correlated to user digital badges. User-specific training data may be tailored to the individual user, capturing user unique preferences, dietary habits, health metrics, and other relevant information. User-specific training data may be drawn from monitoring device, or user specific training data could be drawn from user inputs. For example, user specific training data may include blood glucose data from a monitoring device (or from user input) and meal data from user input. For example, this can be used to train the digital badge machine-learning model to only assign user digital badges 180 to items that beneficially impact a particular users glucose levels. By analyzing this user-specific training data, the digital badge machine-learning model may learn and adapt to the user's behavior and needs over time. Digital badge machine-learning model may be configured to identify patterns, correlations, and trends within user data 120 to make predictions for updating user digital badge 180. Through training cycles, digital badge machine-learning model may continuously refine predictions and enhances its ability to personalize user digital badge 180 based on the specific requirements of each user. In additional embodiments, adjusting user digital badge 180 further includes generating the updated user digital badge using the trained digital badge machine-learning model. In a non-limiting example, a wellness app may help users make informed dietary choices based on their individual health goals and preferences. User digital badge 180 may serve as a personalized guide, recommending suitable food options and providing nutritional insights tailored to each user's specific needs. To enhance the effectiveness of user digital badge, the app may incorporate a machine-learning model dedicated to optimizing dietary recommendations. Adjusting user digital badge 180 may involve receiving digital badge machine-learning model. In some embodiments, digital badge machine-learning model may be pre-trained using user biological extraction data 124 or cohort data 108, providing a foundation for personalized recommendations. However, to tailor the recommendations more closely to the individual user's preferences and health profile, computing device 104 may be further configured to train digital badge machine-learning model using user-specific training data. User-specific data may include information such as the user's dietary habits, health goals, allergies, and any other relevant factors. By adjusting the machine-learning model with data specific to the individual user, system 100 may perform an N-of-1 analysis, enabling the generation of a user digital badge that aligns more closely with the user's needs and preferences.

With continued reference to FIG. 1, cohort digital badge may be determined using cohort nutrient data. As a non-limiting example, cohort nutrient data for a user cohort may be determined. Nutrient data for each alimentary item in alimentary array data 112 may be compared against cohort nutrient data. In some embodiments, alimentary items that satisfy the nutrients of cohort nutrient data may be assigned cohort digital badge. In some embodiments, alimentary items that satisfy a percentage of nutrients of cohort nutrient data may be assigned cohort digital badge. This percentage may range from 5% to 95%. This percentage may range from 15% to 80%. This percentage may include 10%. This percentage may include 20%. This percentage may include 30%. This percentage may include 40%. This percentage may include 50%. This percentage may include 60%. This percentage may include 70%. This percentage may include 80%. This percentage may include 90%.

With continued reference to FIG. 1, user digital badge may be determined using user nutrient data. As a non-limiting example, user nutrient data for a particular user may be determined. Nutrient data for each alimentary item in alimentary array data 112 may be compared against user nutrient data. In some embodiments, alimentary items that satisfy the nutrients of user nutrient data may be assigned cohort digital badge. In some embodiments, alimentary items that satisfy a percentage of nutrients of user nutrient data may be assigned cohort digital badge. This percentage may range from 5% to 95%. This percentage may range from 15% to 80%. This percentage may include 10%. This percentage may include 20%. This percentage may include 30%. This percentage may include 40%. This percentage may include 50%. This percentage may include 60%. This percentage may include 70%. This percentage may include 80%. This percentage may include 90%.

With continued reference to FIG. 1, preferred alimentary data may include user nutrient data. For the purposes of this disclosure, "user nutrient data" is data regarding recommended nutrients for a user. In some embodiments, user nutrient data may be determined as a function of a user cohort, such as an age group or phenotype. In some embodiments, user nutrient data may be calculated using a user's user biological extraction data 124. In some embodiments, preferred alimentary data may include cohort nutrient data. For the purposes of this disclosure, "cohort nutrient data" is data regarding recommended nutrients for users in a certain cohort. In some embodiments, cohort nutrient data may be determined as a function of user cohort.

Figure 10:
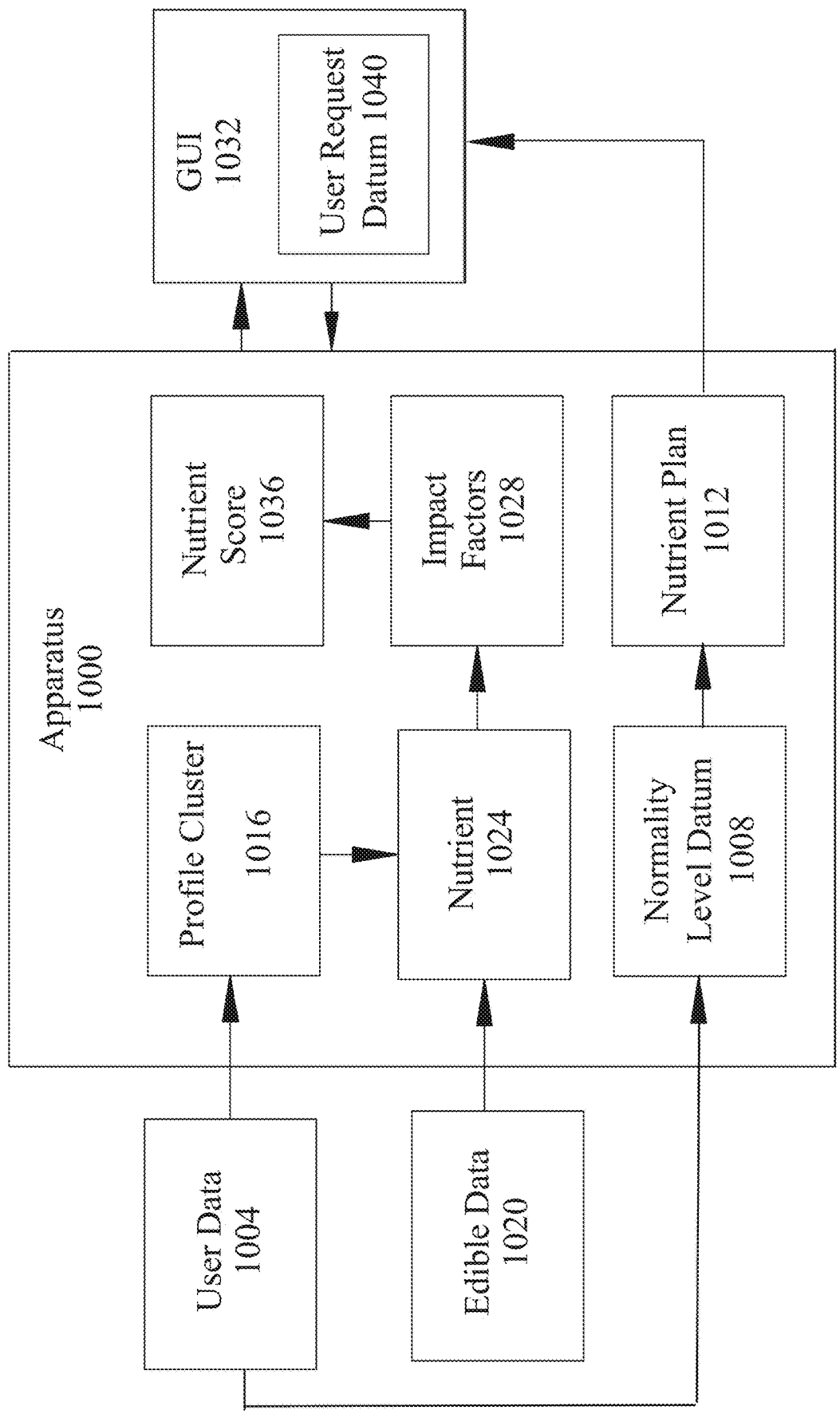
FIG. 10 illustrates a block diagram of an exemplary embodiment of an apparatus for scoring a nutrient.

With continued reference to FIG. 1, in some embodiments, user nutrient data/cohort nutrient data may be determined using apparatus 1000, disclosed further with reference to FIG. 10. As a non-limiting example, apparatus 1000 may determine a set of nutrients for a user optimize said set of nutrients for a maximum nutrient score. Nutrient score may be a function of user data or the user cohort. In some embodiments, determination of user nutrient data and/or cohort nutrient data may be conducted as disclosed in U.S. Non-provisional application Ser. No. 18/090,411, filed on Dec. 28, 2022, and entitled "APPARATUS AND METHOD FOR SCORING A NUTRIENT," the entirety of which is incorporated by reference herein. In some embodiments, determination of user nutrient data and/or cohort nutrient data may include any of the methods for recipe scoring and/or generating an ingredient chain, disclosed in U.S. Non-provisional application Ser. No. 17/976,329, filed on Oct. 28, 2022, and entitled "APPARATUS AND METHOD FOR GENERATING AN INGREDIENT CHAIN," the entirety of which is incorporated by reference herein. In some embodiments, determination of user nutrient data and/or cohort nutrient data may include any of the methods for selecting compatible elements disclosed in U.S. Non-provisional application Ser. No. 16/589,082, filed on Sep. 30, 2019, and entitled "METHODS AND SYSTEMS FOR USING ARTIFICIAL INTELLIGENCE TO SELECT A COMPATIBLE ELEMENT," the entirety of which is incorporated by reference herein. In some embodiments, determination of user nutrient data and/or cohort nutrient data may include any of the methods for identifying nutrient imbalances (particularly, based on biological extraction) and/or predicting alimentary elements disclosed in U.S. Non-provisional application Ser. No. 18/099,346, filed on Jan. 20, 2023, and entitled "METHOD AND SYSTEM FOR PREDICTING ALIMENTARY ELEMENT ORDERING BASED ON BIOLOGICAL EXTRACTION," the entirety of which is incorporated by reference herein.

With continued reference to FIG. 1, user nutrient data may be determined using user data from a monitoring device. In some embodiments, a portion size may be determined as a function of user data from the monitoring device. As a non-limiting example, if user data indicates that a user has undertaken strenuous exercise, then a larger portion size may be recommended. In some embodiments, system 100 may determine or update user nutrient data using data from monitoring device as disclosed in U.S. Non-provisional application Ser. No. 17/833,742, filed on Jul. 6, 2022, and entitled "SYSTEM AND METHOD FOR MODIFYING A NUTRITION REQUIREMENT," the entirety of which is incorporated herein by reference.

Continuing in reference to FIG. 1, computing device 104 may be configured to generate a representation (e.g., cohort digital badge 116) using a graphical user interface of compatible element 160. Computing device 104 may generate a representation of the compatible element 160 using a graphical user interface, as described herein. Computing device 104 may generate a display using a user device, such as a "smartphone," laptop, tablet, internet-of-things (IoT) device, vehicle display, and the like.

Continuing in reference to FIG. 1, generating a representation using a graphical user interface of the compatible label may include updating the graphical user interface display as a function of the compatibility index 172. Computing device 104 may update generated representations using the graphical user interface; for instance, generating user digital badges 180. As used herein, "update," may refer to any alteration, modification, and/or change in GUI appearance, display, generated representations, related to compatible element 160, guided recommendations 164, of generating representations of any of the outputs described herein. In non-limiting illustrative examples, computing device 104 may alter, change, or otherwise update GUI as a function of the compatibility index 172. Computing device 104 may alter, change, or otherwise update GUI as a function of user activity data 128, wearable device data, and/or user fingerprint 144.

Still referring to FIG. 1, computing device 104 is configured to display user digital badges 180 using a graphical user interface. In an embodiment, displaying user digital badge 180 may include generating an alimentary display data structure comprising the at least alimentary array data 112 and an alimentary array event handler, wherein alimentary display data structure may be configured to cause a display device to display the alimentary array and user digital badge 180, and alimentary array event handler may be configured to detect user interaction on an item of the at least an alimentary array and, as a function of the detection, display a user score associated with the item. As used in this disclosure, a "display data structure" is data structure that is configured to cause a display device to display certain data. Alimentary display data structure may include, without limitation, a button, a link, a checkbox, a text entry box and/or window, a drop-down list, a slider, a camera, or any other alimentary display data structure that may occur to a user alimentary item upon reviewing the entirety of this disclosure. An "event handler," as used in this disclosure, is a software function that executes an action in response to a particular event. For instance, and without limitation, an event handler may record data corresponding to user selections of previously populated fields such as drop-down lists and/or text auto-complete and/or default entries, data corresponding to user selections of checkboxes, radial buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements. Event handler may convert data into expected and/or desired formats, for instance such as date formats, currency entry formats, name formats, or the like. Event handler may transmit data from display device to computing device 104. As used in this disclosure, a "display device" is a hardware component responsible for presenting visual information to the user. This encompasses a wide range of electronic displays, including but not limited to monitors, screens found in laptops and smartphones, projection systems, wearable devices like smartwatches, and augmented reality glasses. Display device may utilize various display technologies such as LCD, OLED, and projection systems to present images, text, and graphical elements to users. Display devices may feature touchscreens for user interaction, allowing users to navigate through digital content and interact with applications. In a non-limiting example, user may navigate through an ordering app's interface to browse different food options available from various restaurants. As the user scrolls through the list of food items, display device may present alimentary display data structure includes images and descriptions of the food items along with their respective user digital badges. For instance, the user may select a particular dish from a list, alimentary array event handler may detect user interaction and validation data, may then display a user score associated with the selected alimentary item. The user score may reflect the item's nutritional value, sustainability impact, or any other relevant criteria based on the user's preferences and dietary requirements. Alimentary display data structure may be transmitted to display device. As a result, the user may view the nutritional information, user scores, and other relevant details for each alimentary item directly on their smartphone screen, helping them make informed decisions about their meal choices. In some embodiments, event handler may monitor for updated user data 120. As a function of this updated user data 120, event handler may trigger the retraining of user score machine-learning model and/or badge machine-learning model using the updated user data 120.

With continued reference to FIG. 1, system 100 for generating a customized badge comprises at least a computing device 104 to display an updated user digital badge. As used in this disclosure, an "updated user digital badge" is a revised or modified version of user digital badge that incorporates the latest information, assessments, or insights relevant to the user's dietary preferences, health status, or other pertinent factors. The updated user digital badge may serve as a visual representation or symbol displayed to the user, providing user with real-time feedback, guidance, or recognition related to their alimentary choices and health-related achievements. The process of displaying updated user digital badge may involve presenting the revised badge on a digital platform or interface accessible to the user, such as a mobile application, website, or wearable device. Updated user digital badge may allow users to conveniently view and interact with their personalized digital badge, gaining insights into their dietary habits, nutritional intake, and overall health profile. The content and user interface of updated user digital badge may vary depending on the specific features and functionalities of system 100. In some embodiments, updated user digital badge may include graphical elements, textual information, or interactive features that convey relevant data and insights to user in a clear and comprehensible manner. For example, updated user digital badge may display nutritional information, dietary recommendations, achievement milestones, or progress towards health goals. Updated user digital badge may also incorporate visual cues or color-coded indicators to highlight key aspects of the user's alimentary choices, such as adherence to dietary guidelines, consumption of specific nutrients, or alignment with personalized health objectives.

With continued reference to FIG. 1, in some embodiments, displaying the updated user digital badge may include generating a digital menu as a function of the alimentary array and displaying the updated user digital badge on the digital menu at a display corresponding to the alimentary item. As used in this disclosure, a "digital menu" is a digital representation of a menu displayed on a screen or device, such as a smartphone, tablet, or interactive kiosk. Digital menu may include a representation of a paper menu, such as an image imitating or simulating an appearance of a digital menu. Digital menu may include information about various food or dish items available for selection, including their names, descriptions, prices, and nutritional details. Digital menu may also include images or illustrations of the items to enhance the user experience. In an embodiment, digital menu may be enhanced with the capability to display updated user digital badges alongside the alimentary items. When a user interacts with digital menu to select a specific food item, the corresponding updated user digital badge may be dynamically displayed alongside the item's information. This may allow users to quickly assess the healthiness or suitability of the selected item based on their individual dietary preferences, nutritional needs, or health goals. In a non-limiting example, the user may be dining at a restaurant equipped with the digital menu. Digital menu may provide detailed information about the available dishes and offer personalized recommendations based on users' dietary preferences and health goals. Users may decide to explore the menu and come across an option for a salad, which is part of the alimentary array presented on the digital menu. As the user taps on the salad item to view more details, digital menu may expand to reveal more information, including the updated user digital badge associated with the dish. In this example, the alimentary array refers to the collection of food items listed on the digital menu, with each item accompanied by relevant details such as ingredients, nutritional content, and user ratings. The salad is one of the alimentary items available for selection. The updated user digital badge may be displayed alongside the salad provides valuable insights into its healthfulness based on individual dietary preferences and nutritional needs. For instance, user may indicate a preference for plant-based meals and a desire to limit sodium intake, the updated user digital badge may indicate that the salad is rich in plant-based proteins and low in sodium, making it a suitable choice for the user. Furthermore, the updated user digital badge may highlight the salad's nutrient-dense ingredients, such as fresh vegetables, hearty *quinoa*, and a flavorful vinaigrette made with heart-healthy olive oil. This information is continuously updated in real-time, ensuring that the badge reflects the latest nutritional analysis of the dish.

Still referring to FIG. 1, in an embodiment, wherein displaying the updated user digital badge may further include scanning a physical menu. As used in this disclosure, a "physical menu" is a traditional menu printed on paper or displayed in a physical format within a restaurant or dining establishment. Unlike digital menus, which are electronic and interactive, physical menus are tangible objects that patrons can hold and peruse to view the available food and beverage options offered by the establishment. To display updated user digital badge, scanning a physical menu may be scanned using a mobile device equipped with a scanning or imaging capability, such as a smartphone or tablet, to capture images or text from the physical menu. The scanned data may be processed by the device to identify and extract information about the menu items, including names, descriptions, and possibly nutritional details. Once the physical menu is scanned, the device may utilize image recognition or optical character recognition (OCR) technology to interpret the menu content and identify specific alimentary items listed. After identifying the items, the device may cross-reference the information with the user's dietary preferences, health goals, and any other relevant data to generate or update the user digital badge. For example, if a user scans a physical menu and selects a dish that aligns with their preferences for low-sugar and high-fiber options, the updated user digital badge displayed on user device may indicate the nutritional attributes of the selected item, such as its fiber content and absence of added sugars. This allows the user to make informed choices based on their individual dietary requirements, even when presented with a traditional physical menu.

With continued reference to FIG. 1, in an additional embodiment, displaying the updated user digital badge may further include identifying an element list on the physical menu corresponding to the alimentary item. This process may ensure that the information presented on updated user digital badge accurately reflects the chosen menu item, allowing users to make informed decisions about their food choices based on their individual preferences and dietary requirements. In a non-limiting example, user may select the salad option from the physical menu, user may use a mobile device equipped with scanning capabilities to capture an image of the menu element list or manually input the name of the salad into a digital interface. System 100 may then identify the corresponding element list on the physical menu, which may include details such as the salad's name, description, and price. Once the element list is identified, system 100 may cross-references this information with the user's dietary preferences and health goals to generate updated user digital badge for the selected salad. Updated user digital badge may display relevant nutritional information, for example, the salad's calorie count, macronutrient composition, and any special dietary attributes (e.g., gluten-free, vegan). The salad may be the element list on the physical menu corresponds to the specific alimentary item chosen by the user. By identifying the menu element list, system 100 may ensure the information displayed on updated user digital badge aligns with the user's selection, enabling them to make informed decisions about their meal based on their individual dietary needs and preferences.

With continued reference to FIG. 1, in some embodiments, displaying the updated user digital badge may further include generating a combined display of the physical menu and the updated user digital badge, wherein the combined display displays the updated user digital badge at the element list and displaying the combined display. The combined display may enhance the user experience by providing comprehensive information about the selected menu item directly alongside its element list on the physical menu. For example, user may be browsing the physical menu at a restaurant and select a particular dish. Upon selecting the item, the digital system may overlay updated user digital badge onto the element list of the chosen item, creating a combined display. This overlay may be achieved using augmented reality (AR) technology, where updated user digital badge appears as a digital layer superimposed onto the physical menu. The combined display may integrate updated user digital badge with the physical menu, may allow users to view essential information about the selected item without having to navigate away from the menu itself. Updated user digital badge may provide details such as the dish's nutritional content, ingredient list, allergen information, and any special dietary attributes.

Figure 2:
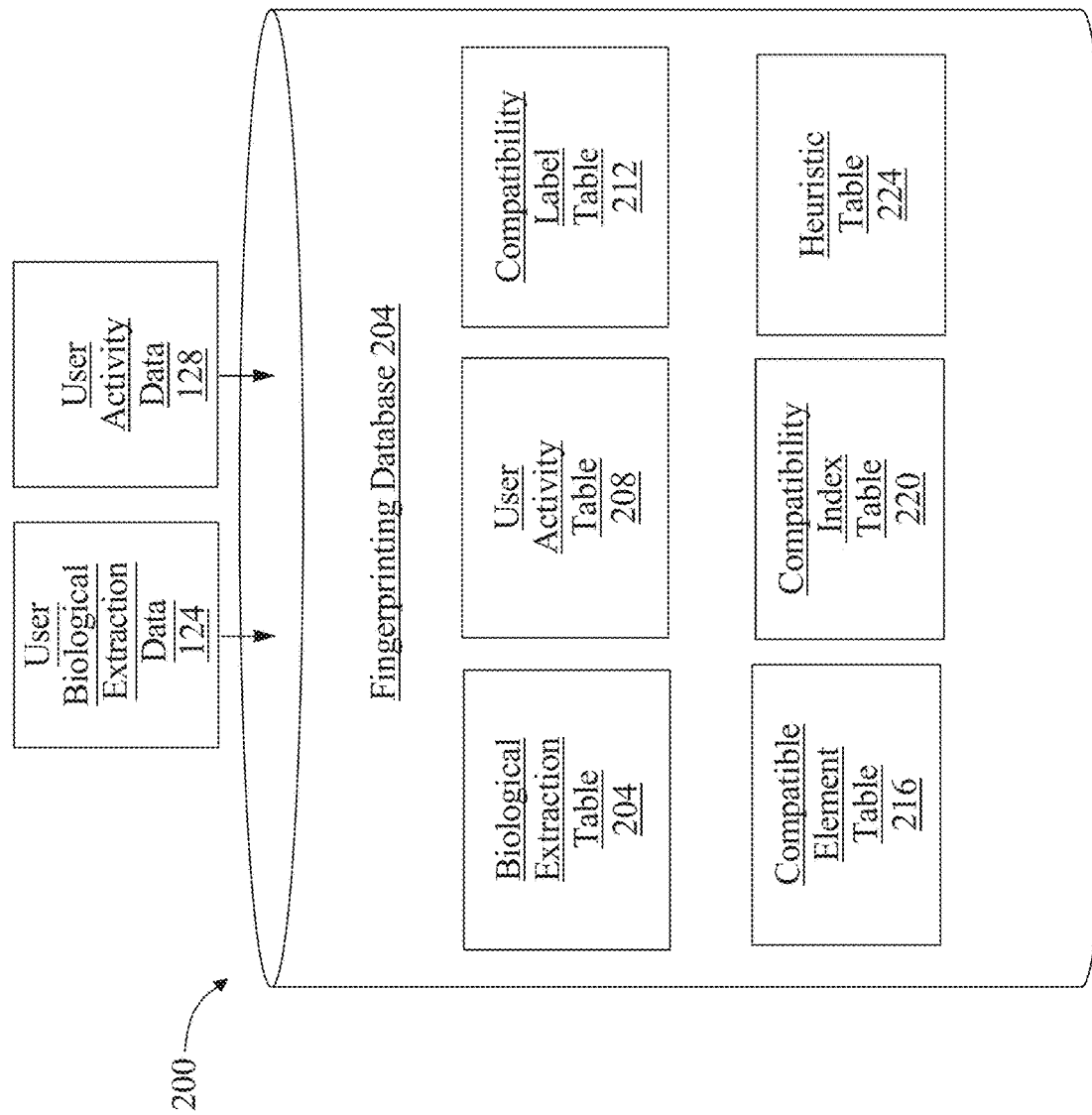
FIG. 2 illustrates a block diagram of a non-limiting exemplary embodiment of a fingerprint database.

Referring now to FIG. 2, a non-limiting exemplary embodiment 200 of a fingerprint database 204 is illustrated. A fingerprint database 204 may be used by computing device 104 to store and/or retrieve inputs and outputs as described herein, user-specific data such as biological extraction 208 data, wearable device data, user activity data 128, and/or any determinations made by a machine-learning process, model, and/or algorithm, as described herein. Fingerprint database 204 may be implemented, without limitation, as a relational database, a key-value retrieval database such as a NOSQL database, or any other format or structure for use as a database that a person skilled in the art would recognize as suitable upon review of the entirety of this disclosure. Fingerprint database 204 may alternatively or additionally be implemented using a distributed data storage protocol and/or data structure, such as a distributed hash table and the like. Fingerprint database 204 may include a plurality of data entries and/or records, as described herein. Data entries in a Fingerprint database 204 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 3:
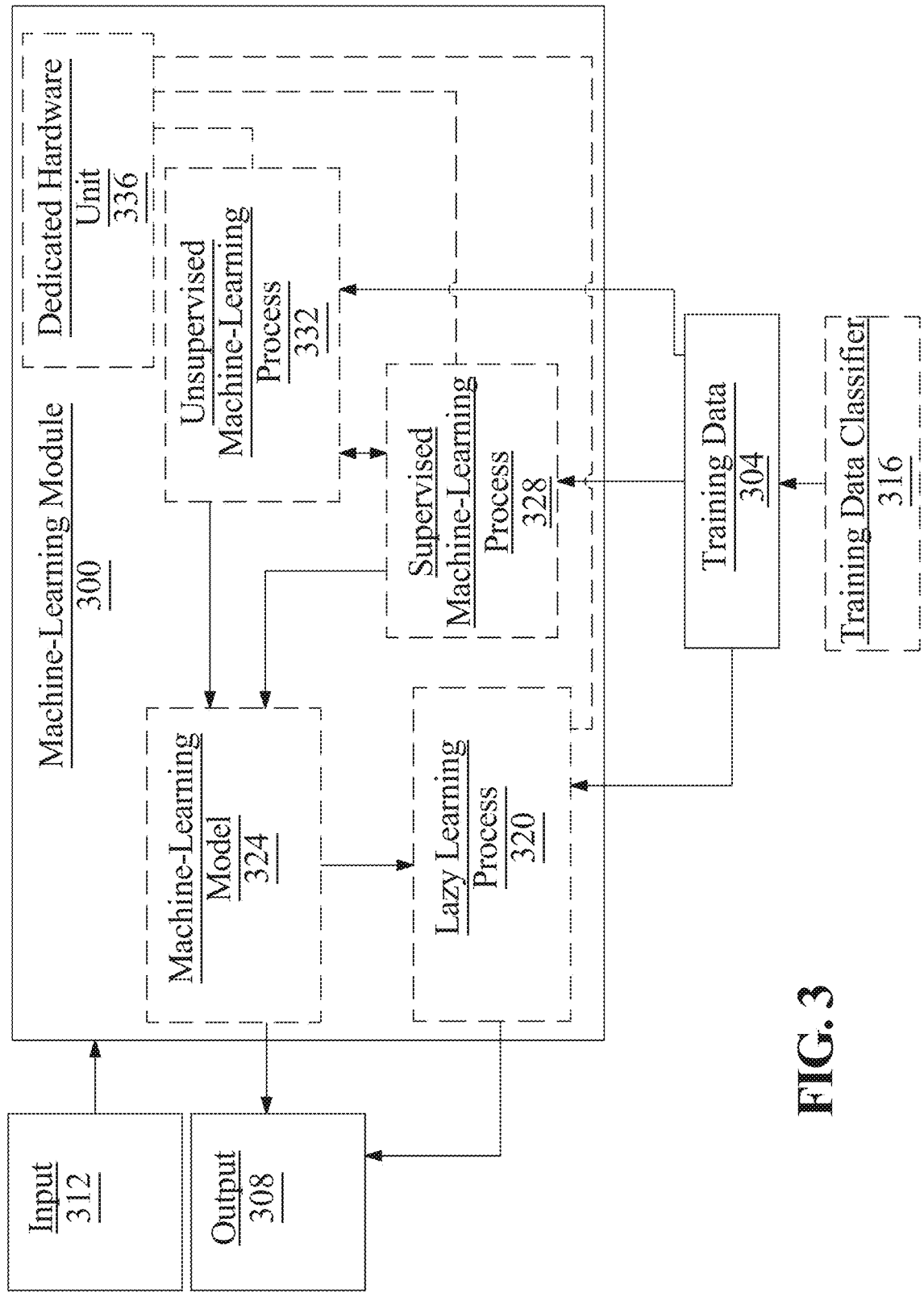
FIG. 3 illustrates a block diagram of a non-limiting exemplary embodiment of a machine-learning module.

Further referring to FIG. 3, Fingerprint database 204 may include, without limitation, a biological extraction table 204, user activity table 208, compatibility label table 212, compatible element table 216, compatibility index table 220, and/or heuristic table 224. Determinations by a machine-learning process, machine-learning model, ranking function, and the like, may also be stored and/or retrieved from the Fingerprint database 204, for instance in non-limiting examples a classifier 152 describing a plurality of user biological extraction data 124 as it relates to a plurality guided recommendations 164, wherein a classifier 152 is an identifier that denotes a subset of data that contains a heuristic and/or relationship, as may be useful to system 100 described herein. As a non-limiting example, Fingerprint database 204 may organize data according to one or more instruction tables. One or more Fingerprint database 204 tables may be linked to one another by, for instance in a non-limiting example, common column values. For instance, a common column between two tables of Fingerprint database 204 may include an identifier of a submission, such as a form entry, textual submission, global position system (GPS) coordinates, addresses, metrics, and the like, for instance as defined herein; as a result, a search by a computing device 104 may be able to retrieve all rows from any table pertaining to a given submission or set thereof. Other columns may include any other category usable for organization or subdivision of data, including types of data, names and/or identifiers of individuals submitting the data, times of submission, and the like; persons skilled in the art, upon reviewing the entirety of this disclosure, will be aware of various ways in which data from one or more tables may be linked and/or related to data in one or more other tables.

Still referring to FIG. 3, in a non-limiting embodiment, one or more tables of a fingerprint database 204 may include, as a non-limiting example, a biological extraction table 204, which may include categorized user biological extraction data 124, as described above, including biological, physiological, chemical, genetic, medical histories, diseases, etc., originating from, for instance, a wearable device. One or more tables may include user activity table 208, which may include a user activity data 128 that a system 100 may use to generate compatibility labels 140, diagnostic output 156, compatible elements 160, guided recommendations 164, and the like, for instance and without limitation. One or more tables may include compatibility label table 212, which may include classifiers, data, and the like, for instance and without limitation, that system 100 may use to retrieve and/or generate compatibility labels 212, associated with user. One or more tables may include compatible element table 216, which may include compatibility elements 144, including, generated recommendations 148, classifiers, data, and the like, for instance and without limitation, that system 100 may use to retrieve and/or store compatibility elements 144, associated with user. One of more tables may include a compatibility index table 220, which may include a plurality of compatibility elements 144, guided recommendations 164, and the like, in a queue, list, or ranking, according to compatibility index 172; compatible element table 216 may include ranking machine-learning process 176 outputs, determinations, variables, and the like, organized into subsets of data. One or more tables may include, without limitation, a heuristic table 328, which may organize rankings, indexes, models, outcomes, functions, numerical values, vectors, matrices, and the like, which represent determinations, optimizations, iterations, limitations, rankings, variables, and the like, including one or more inputs describing potential mathematical relationships, as described herein. For instance, and without limitation, heuristic table 328 may contain classifiers 152 related to subsets of training data 132 and associated models, such as label machine-learning model 136.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting example, illustrative inputs may consist of nutritional data obtained from menu items, such as calorie content, macronutrient composition, and presence of allergens. Outputs may then correspond to the generation of digital badges indicating the healthiness level of each menu item, ranging from "healthy" to "less healthy," based on predefined thresholds or criteria established by the machine-learning model. Similarly, inputs related to ingredient sourcing and environmental impact may lead to outputs in the form of sustainability scores integrated into the digital badges, guiding consumers toward environmentally-friendly food choices. As another non-limiting example, illustrative inputs may include user activity data 128, user biological extraction data 124, user fingerprint 144, compatible element 160, compatibility label 140, diagnostic output 156, compatibility index 172, or the like. As another non-limiting example, illustrative outputs may include user fingerprint 144, compatible element 160, compatibility label 140, diagnostic output 156, compatibility index 172, guided recommendation, or the like.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to characterize sub-populations such as cohorts of persons or other analyzed items or phenomena. Classifications may allow for the selection of specific subsets of training data tailored to the characteristics of each cohort. Dietary preference cohorts could group users based on their dietary choices, ensuring that recommendations and badges align with individual preferences, whether vegetarian, vegan, gluten-free, or otherwise. As another non-limiting example, training data classifier 316 may classify elements of training data to different age, gender, occupation, or the like of cohorts of users.

Still referring to FIG. 3, computing device 304 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 304 may then calculate a likelihood table by calculating probabilities of different data entries and classification labels. Computing device 304 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device 304 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$:

$$X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set of subset $X_{median}$ and/or interquartile range (IQR), which represents the difference between the 25$^{th}$ percentile value and the 50$^{th}$ percentile value (or closest values thereto by a rounding protocol), such as:

$$X_{new} = \frac{X - X_{median}}{IQR}.$$

Persons skilled in the at, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may input user data 140, cohort data 108, user nutrient data, alimentary array data 112, user activity data 128, user biological extraction data 124, user fingerprint 144, compatible element 160, compatibility label 140, diagnostic output 156, compatibility index 172, or the like as described above as inputs, may output user fingerprint 144, compatible element 160, compatibility label 140, diagnostic output 156, compatibility index 172, guided recommendation 164, environmental score, cohort digital badge 116, user digital badge 180, or the like as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0"

voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
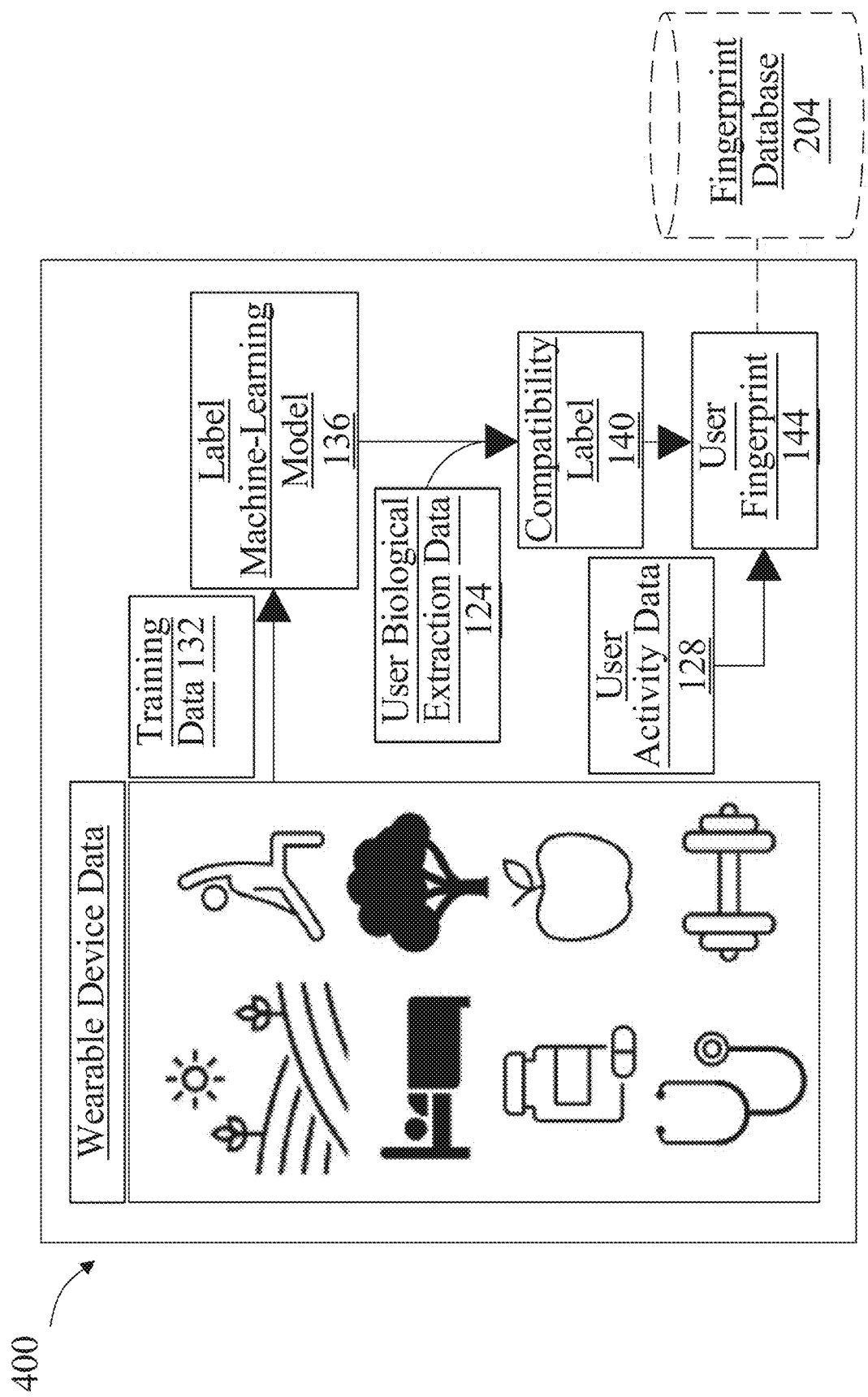
FIG. 4 illustrates a block diagram of a non-limiting exemplary embodiment of a user fingerprint.

Referring now to FIG. 4, a non-limiting exemplary embodiment 400 of a user fingerprint 144 is illustrated. System 100 may accept wearable device data originating from a variety of categories, such as health, fitness, sleep, nutrition, exercise, medical history, current supplementation and medications, mental health, and the like, and generate training data 132 from the wearable device data. Computing device 104 may train label machine-learning model 136 with training data 132 to generate an output of compatibility label 140. User fingerprint 144 may include compatibility label 140 and user activity data 128 for generating a diagnostic output 156. User fingerprint 144 data may be stored and/or retrieved from a fingerprint database 304, as described above.

Figure 5:
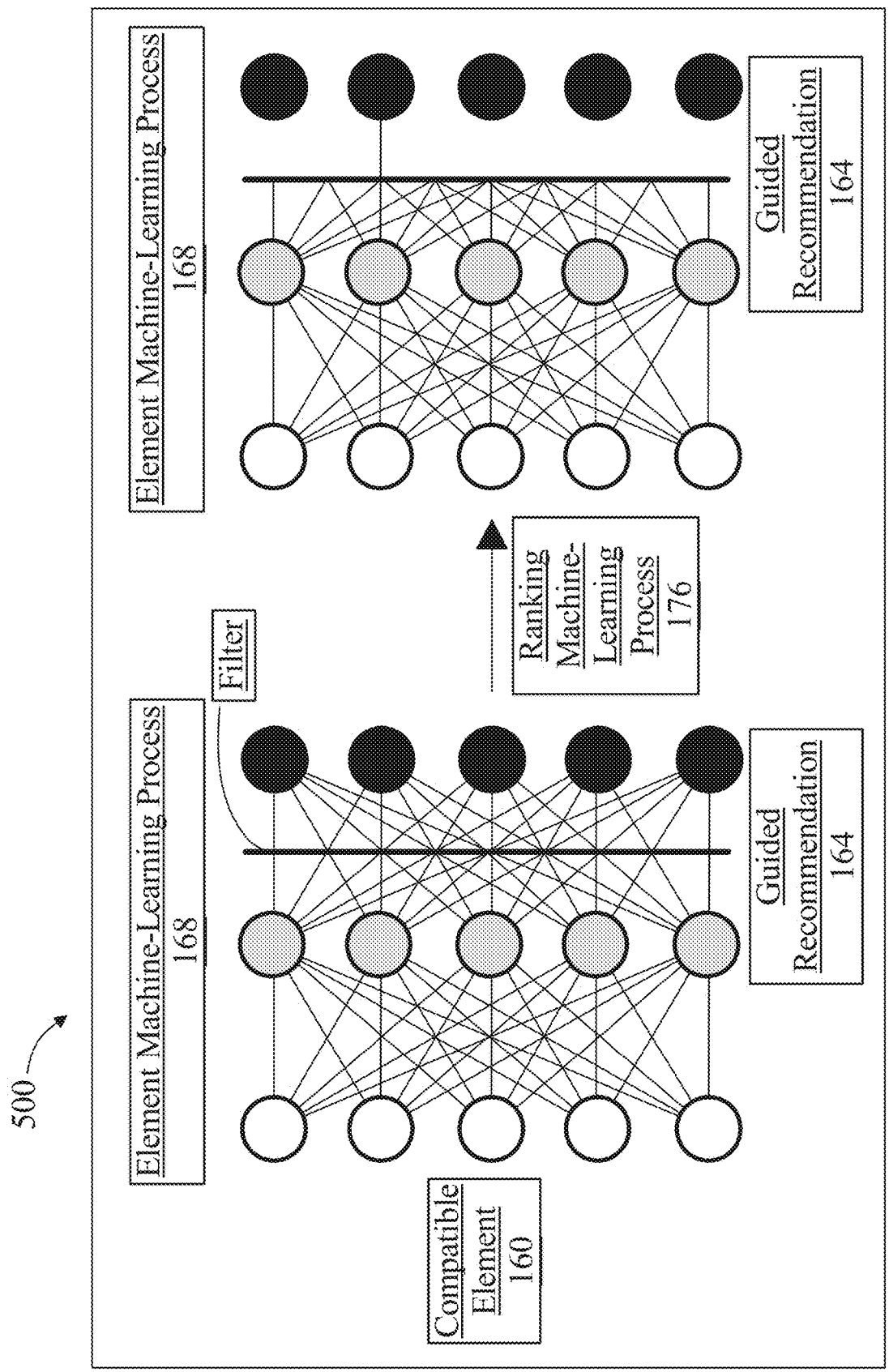
FIG. 5 illustrates a diagrammatic representation of a non-limiting exemplary embodiment of an element machine-learning learning process.

Referring now to FIG. 5, a non-limiting exemplary embodiment of an element machine-learning learning process 168 is illustrated. Element machine-learning process 168 may accept an input of a plurality of compatible elements 160 (denoted as white circles) and generate an output that is a plurality of guided recommendations 164 (denoted as grey circles). Element machine-learning process 168 may generate the same guided recommendation for one or more compatible elements 160; likewise, element machine-learning process 168 may generate more than one guided recommendation for a single compatible element 160. Element machine-learning process 168 may filter guided recommendations 164 using a variety of criteria. For instance and without limitation, ranking machine-learning process 176 may accept an input of a plurality of guided recommendations 164, and associated data, and generate an output that is a ranking of the plurality of guided recommendations 164, wherein the ranking comprises a compatibility index 172. Element machine-learning process 168 may retrieve a plurality of compatibility indexes 156 associated with a plurality of guided recommendations 164 and filter based on the compatibility indexes 156 (as depicted on the right of FIG. 5).

Figure 6:
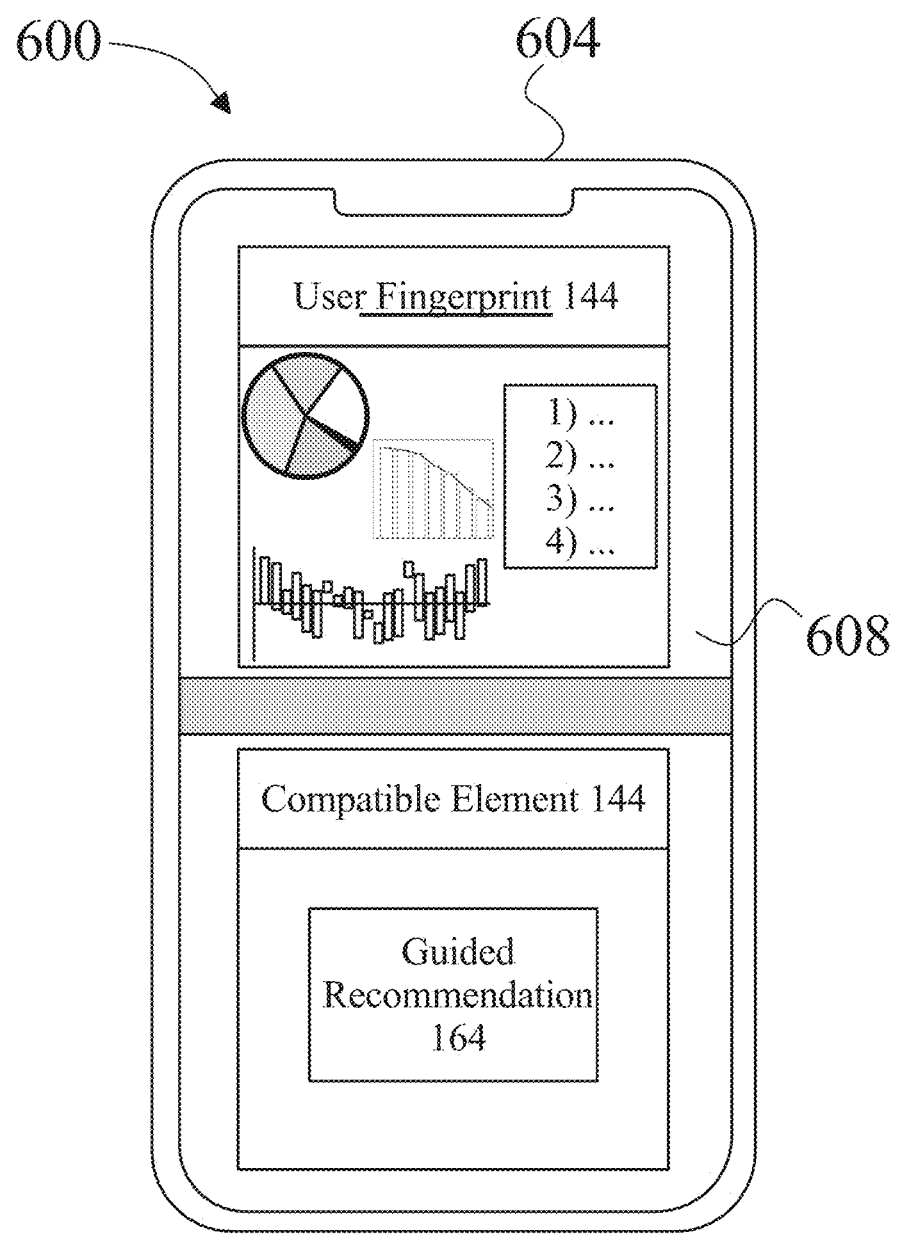
FIG. 6 illustrates a diagrammatic representation of a non-limiting exemplary embodiment of a user device.

Referring now to FIG. 6, a non-limiting exemplary embodiment 600 of a user device 604 is illustrated. Computing device 104 may include user device 604. User device 604 may include representation of the graphical user interface 608, as described herein. Graphical user interface 608 may include a representation of any determination by system 100, for instance and without limitation, data present in user fingerprint 144, include graphics, metrics, and the like. User device 604 may generate a representation of compatible element 160, including a guided recommendation using the graphical user interface 608.

Figures 7A, 7B:
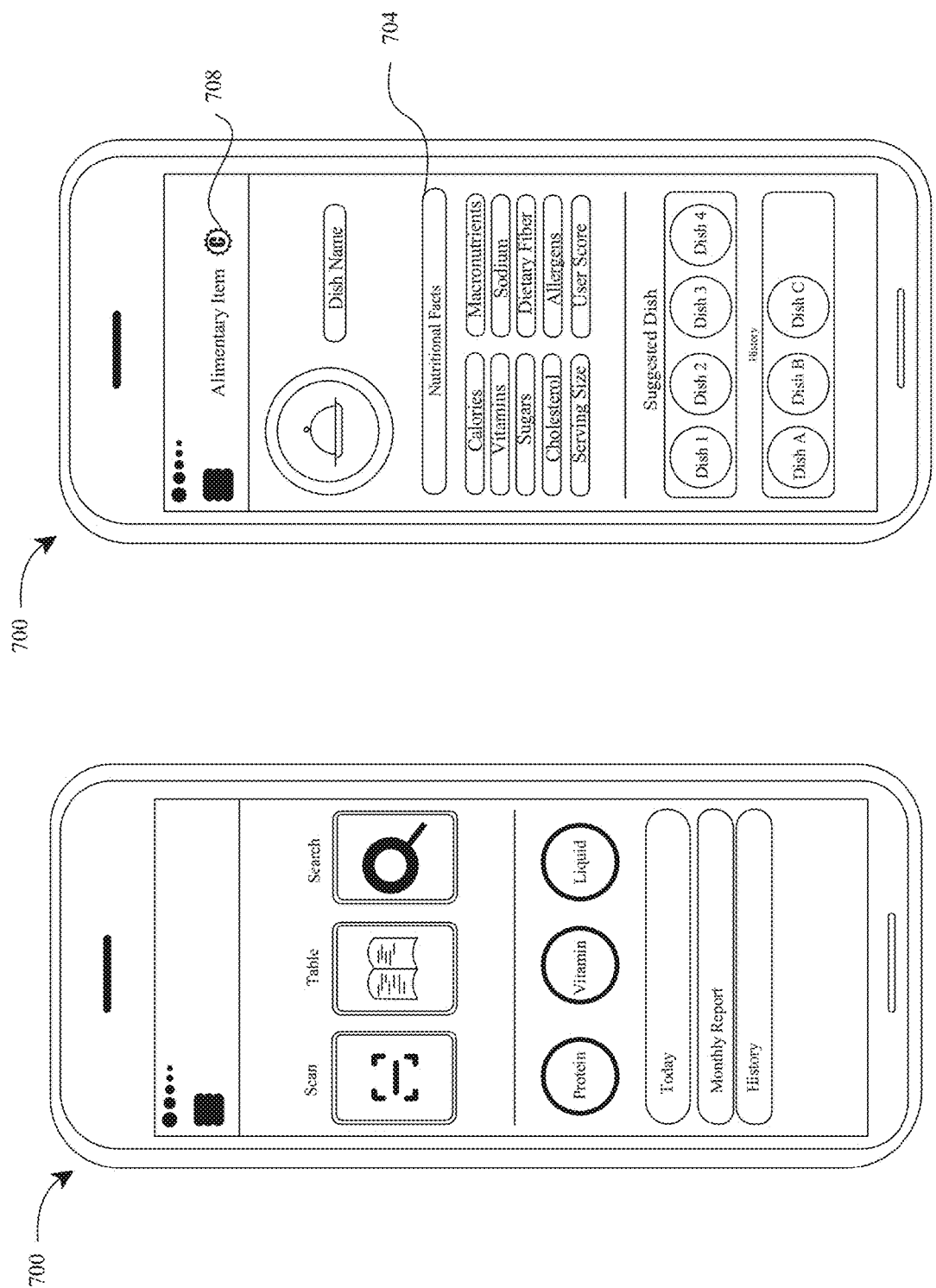
FIG. 7A illustrates a diagram of an exemplary embodiment of a first embodiment of a user interface.
FIG. 7B illustrates a diagram of an exemplary embodiment of a second embodiment of a user interface.

Referring now to FIG. 7A, a first embodiment of user interface 700 is shown. User interface 700 may show the user digital badge within an alimentary array, enhancing personal dietary tracking. User interface 700 may feature a lookup table that supports functionalities such as search, QR code scanning, and menu navigation. It is designed to display comprehensive dietary information, including historical and current restaurant visits, daily, weekly, or monthly consumption metrics for proteins, vitamins, and liquids, as well as integrating a detailed monthly report and consumption history. User interface setup facilitates dietary choices and aids in long-term nutritional planning and monitoring.

Referring now to FIG. 7B, a second embodiment of user interface 700 is shown. User interface 700 may display detailed information about a selected alimentary item. In some embodiments, nutrient information 704 for a selected alimentary item may be shown. This may include nutritional facts such as calories, vitamins, sugars, cholesterol, serving size, macronutrients, sodium, dietary fiber, allergens and the like. Additionally, a user score may be displayed. User score may rate the dish based on the user's health profile, suggested alternative dishes for consideration, and a history section listing previously selected dishes.

With continued reference to FIGS. 7A and 7B, user interface 700 may include a badge 708. Digital badge 708 may include a user digital badge and/or a cohort digital badge. Digital badge 708 may include any digital badge disclosed throughout this disclosure. Digital badge 708 may include an image. Image may include any suitable image such as, but not limited to, checkmarks, thumbs up, logos, ribbons, medals, and the like. Digital badge 708 may be interactive. A user may select digital badge 708 to view further nutritional information about an alimentary item or to view user score data. In some embodiments, digital badge 708 may include an event handler, as discussed above with reference to FIG. 1. In some embodiments, digital badge 708 may include a link, such as a hyperlink. In some embodiments, alimentary array data 112 may be received by system 100 in an initial alimentary array data structure. In some embodiments, digital badge 708 may be inserted into alimentary array data structure. In some embodiments, system 100 may locate the relevant alimentary item in alimentary array data structure and insert digital badge 708 into alimentary array data structure at that location. In some embodiments, this may include the use of a code injector. A code injector, for the purposes of this disclosure, is software configured to inject data into an application. Code injector may inject, as non-limiting examples. HTML, CSS, or Javascript code.

Referring now to FIG. 8, an exemplary embodiment of neural network 800 is illustrated. A neural network 800 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 804, one or more intermediate layers 808, and an output layer of nodes 812. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 9:
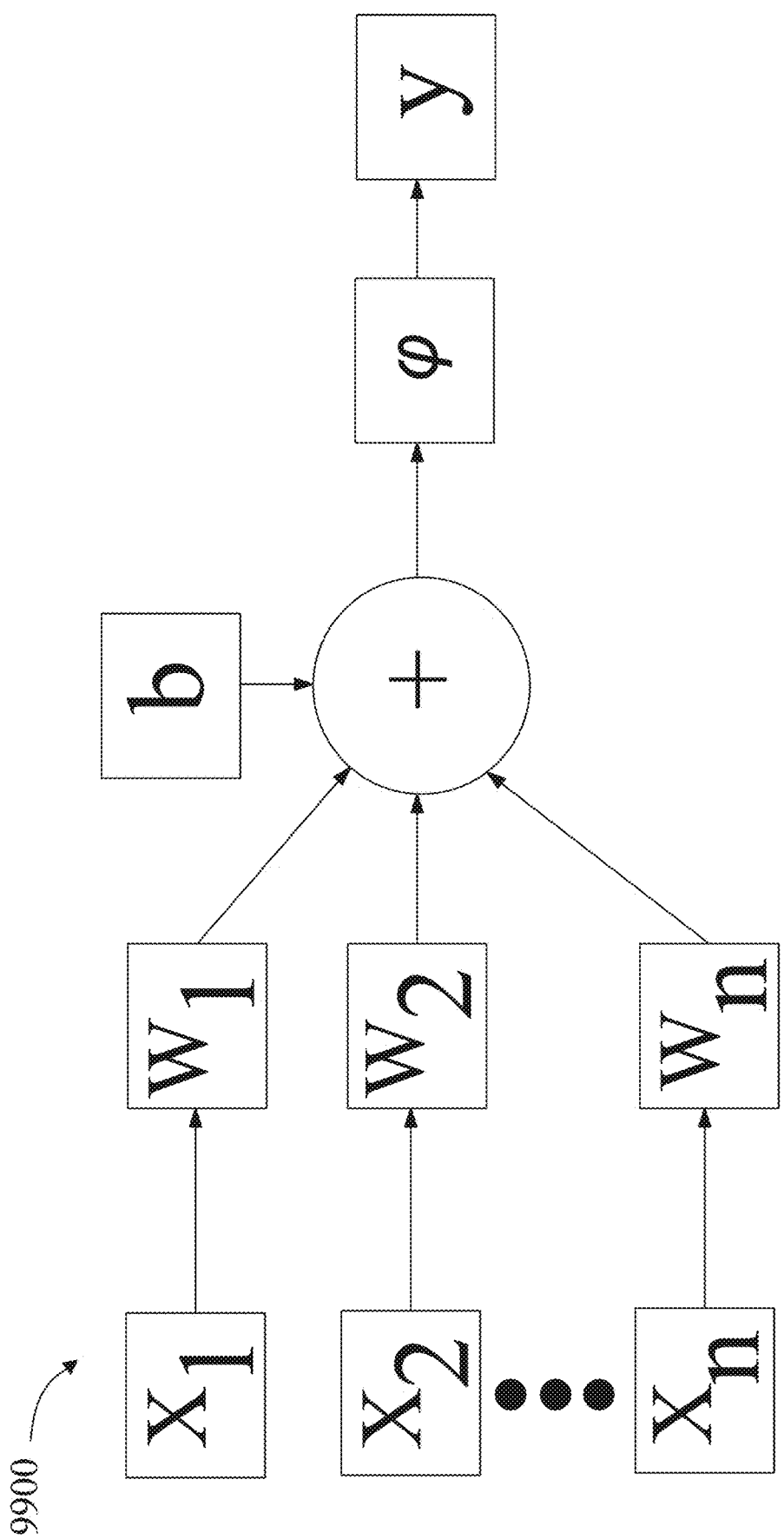
FIG. 9 illustrates a diagram of an exemplary embodiment of a node of a neural network.

Referring now to FIG. 9, an exemplary embodiment of a node 900 of a neural network is illustrated. A node may include, without limitation, a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tan h (hyperbolic tangent) function, of the form $$\frac{e^x - e^{-x}}{e^x + e^{-x}},$$

a tan h derivative function such as $f(x)=\tan h^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tan h(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function q, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Referring now to FIG. 10, an exemplary embodiment of an apparatus 1000 for scoring a nutrient is illustrated. Apparatus 1000 may include a computing device as disclosed above.

With continued reference to FIG. 10, apparatus 1000 may be designed and/or configured to perform any method, method step, or sequence of method steps in any embodiment described in this disclosure, in any order and with any degree of repetition. For instance, apparatus 1000 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 1000 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 10, in some embodiments, apparatus 1000 may be configured to receive user data 1004. A "user," as used in this disclosure, is an individual. User data 1004 may include a biological extraction (e.g., physiological state data). As a non-limiting example, and without limitation, physiological data describing red blood cells, such as red blood cell count, hemoglobin levels, hematocrit, mean corpuscular volume, mean corpuscular hemoglobin, and/or mean corpuscular hemoglobin concentration may be recognized as useful for identifying various conditions such as dehydration, high testosterone, nutrient deficiencies, kidney dysfunction, chronic inflammation, anemia, and/or blood loss. In some embodiments, user data may include physiological data.

With continued reference to FIG. 10, physiological state data may include, without limitation, hematological data, such as red blood cell count, which may include a total number of red blood cells in a person's blood and/or in a blood sample, hemoglobin levels, hematocrit representing a percentage of blood in a person and/or sample that is composed of red blood cells, mean corpuscular volume, which may be an estimate of the average red blood cell size, mean corpuscular hemoglobin, which may measure average weight of hemoglobin per red blood cell, mean corpuscular hemoglobin concentration, which may measure an average concentration of hemoglobin in red blood cells, platelet count, mean platelet volume which may measure the average size of platelets, red blood cell distribution width, which measures variation in red blood cell size, absolute neutrophils, which measures the number of neutrophil white blood cells, absolute quantities of lymphocytes such as B-cells, T-cells, Natural Killer Cells, and the like, absolute numbers of monocytes including macrophage precursors, absolute numbers of eosinophils, and/or absolute counts of basophils. Physiological state data may include, without limitation, immune function data such as Interleukine-10 (IL-10), TNF-alpha, systemic inflammatory cytokines, and the like.

Continuing to refer to FIG. 10, physiological state data may include, without limitation, data describing blood-born lipids, including total cholesterol levels, high-density lipoprotein (HDL) cholesterol levels, low-density lipoprotein (LDL) cholesterol levels, very low-density lipoprotein (VLDL) cholesterol levels, levels of triglycerides, and/or any other quantity of any blood-born lipid or lipid-containing substance. Physiological state data may include measures of glucose metabolism such as fasting glucose levels and/or hemoglobin A1-C (HbA1c) levels. Physiological state data may include, without limitation, one or more measures associated with endocrine function, such as without limitation, quantities of dehydroepiandrosterone (DHEAS), DHEA-Sulfate, quantities of cortisol, ratio of DHEAS to cortisol, quantities of testosterone quantities of estrogen, quantities of growth hormone (GH), insulin-like growth factor 1 (IGF-1), quantities of adipokines such as adiponectin, leptin, and/or ghrelin, quantities of somatostatin, progesterone, or the like. Physiological state data may include measures of estimated glomerular filtration rate (eGFR). Physiological state data may include quantities of C-reactive protein, estradiol, ferritin, folate, homocysteine, prostate-specific Ag, thyroid-stimulating hormone, vitamin D, 25 hydroxy, blood urea nitrogen, creatinine, sodium, potassium, chloride, carbon dioxide, uric acid, albumin, globulin, calcium, phosphorus, alkaline phosphatase, alanine amino transferase, aspartate amino transferase, lactate dehydrogenase (LDH), bilirubin, gamma-glutamyl transferase (GGT), iron, and/or total iron binding capacity (TIBC), or the like. Physiological state data may include antinuclear antibody levels. Physiological state data may include aluminum levels. Physiological state data may include arsenic levels. Physiological state data may include levels of fibrinogen, plasma cystatin C, and/or brain natriuretic peptide.

Continuing to refer to FIG. 10, physiological state data may include measures of lung function such as forced expiratory volume, one second (FEV-1) which measures how much air can be exhaled in one second following a deep inhalation, forced vital capacity (FVC), which measures the volume of air that may be contained in the lungs. Physiological state data may include a measurement of blood pressure, including without limitation systolic and diastolic blood pressure. Physiological state data may include a measure of waist circumference. Physiological state data may include body mass index (BMI). Physiological state data may include one or more measures of bone mass and/or density such as dual-energy x-ray absorptiometry. Physiological state data may include one or more measures of muscle mass. Physiological state data may include one or more measures of physical capability such as without limitation measures of grip strength, evaluations of standing balance, evaluations of gait speed, pegboard tests, timed up and go tests, and/or chair rising tests.

Still viewing FIG. 10, physiological state data may include one or more measures of cognitive function, including without limitation Rey auditory verbal learning test results, California verbal learning test results, NIH toolbox picture sequence memory test, Digital symbol coding evaluations, and/or Verbal fluency evaluations. Physiological state data may include one or more evaluations of sensory ability, including measures of audition, vision, olfaction, gustation, vestibular function and pain.

Continuing to refer to FIG. 10, physiological state data may include psychological data. Psychological data may include any data generated using psychological, neuropsychological, and/or cognitive evaluations, as well as diagnostic screening tests, personality tests, personal compatibility tests, or the like; such data may include, without limitation, numerical score data entered by an evaluating professional and/or by a subject performing a self-test such as a computerized questionnaire. Psychological data may include textual, video, or image data describing testing, analysis, and/or conclusions entered by a medical professional such as without limitation a psychologist, psychiatrist, psychotherapist, social worker, a medical doctor, or the like. Psychological data may include data gathered from user interactions with persons, documents, and/or computing devices 1004; for instance, user patterns of purchases, including electronic purchases, communication such as via chat-rooms or the like, any textual, image, video, and/or data produced by the subject, any textual image, video and/or other data depicting and/or describing the subject, or the like. Any psychological data and/or data used to generate psychological data may be analyzed using machine-learning and/or language processing module as described in this disclosure.

Still referring to FIG. 10, physiological state data may include genomic data, including deoxyribonucleic acid (DNA) samples and/or sequences, such as without limitation DNA sequences contained in one or more chromosomes in human cells. Genomic data may include, without limitation, ribonucleic acid (RNA) samples and/or sequences, such as samples and/or sequences of messenger RNA (mRNA) or the like taken from human cells. Genetic data may include telomere lengths. Genomic data may include epigenetic data including data describing one or more states of methylation of genetic material. Physiological state data may include proteomic data, which, as used herein, is data describing all proteins produced and/or modified by an organism, colony of organisms, or system of organisms, and/or a subset thereof. Physiological state data may include data concerning a microbiome of a person, which, as used herein, includes any data describing any microorganism and/or combination of microorganisms living on or within a person, including without limitation biomarkers, genomic data, proteomic data, and/or any other metabolic or biochemical data useful for analysis of the effect of such microorganisms on other physiological state data of a person, as described in further detail below.

With continuing reference to FIG. 10, physiological state data may include one or more user-entered descriptions of a person's physiological state. One or more user-entered descriptions may include, without limitation, user descriptions of symptoms, which may include without limitation current or past physical, psychological, perceptual, and/or neurological symptoms, user descriptions of current or past physical, emotional, and/or psychological problems and/or concerns, user descriptions of past or current treatments, including therapies, nutritional regimens, exercise regimens, pharmaceuticals or the like, or any other user-entered data that a user may provide to a medical professional when seeking treatment and/or evaluation, and/or in response to medical intake papers, questionnaires, questions from medical professionals, or the like. Physiological state data may include any physiological state data, as described above, describing any multicellular organism living in or on a person including any parasitic and/or symbiotic organisms living in or on the persons; non-limiting examples may include mites, nematodes, flatworms, or the like. Examples of physiological state data described in this disclosure are presented for illustrative purposes only and are not meant to be exhaustive.

With continued reference to FIG. 10, physiological data may include, without limitation, any result of any medical test, physiological assessment, cognitive assessment, psychological assessment, or the like. Apparatus 1000 may receive at least a physiological data from one or more other devices after performance; apparatus 1000 may alternatively or additionally perform one or more assessments and/or tests to obtain at least a physiological data, and/or one or more portions thereof, on apparatus 1000. For instance, at least physiological data may include or more entries by a user in a form or similar graphical user interface object; one or more entries may include, without limitation, user responses to questions on a psychological, behavioral, personality, or cognitive test. For instance, at least a server may present to user a set of assessment questions designed or intended to evaluate a current state of mind of the user, a current psychological state of the user, a personality trait of the user, or the like; at least a server may provide user-entered responses to such questions directly as at least a physiological data and/or may perform one or more calculations or other algorithms to derive a score or other result of an assessment as specified by one or more testing protocols, such as automated calculation of a Stanford-Binet and/or Wechsler scale for IQ testing, a personality test scoring such as a Myers-Briggs test protocol, or other assessments that may occur to persons skilled in the art upon reviewing the entirety of this disclosure.

With continued reference to FIG. 10, assessment and/or self-assessment data, and/or automated or other assessment results, obtained from a third-party device; third-party device may include, without limitation, a server or other device (not shown) that performs automated cognitive, psychological, behavioral, personality, or other assessments. Third-party device may include a device operated by an informed advisor. An informed advisor may include any medical professional who may assist and/or participate in the medical treatment of a user. An informed advisor may include a medical doctor, nurse, physician assistant, pharmacist, yoga instructor, nutritionist, spiritual healer, meditation teacher, fitness coach, health coach, life coach, and the like.

With continued reference to FIG. 10, physiological data may include data describing one or more test results, including results of mobility tests, stress tests, dexterity tests, endocrinal tests, genetic tests, and/or electromyographic tests, biopsies, radiological tests, genetic tests, and/or sensory tests. Persons skilled in the art, upon reviewing the entirety of this disclosure, will be aware of various additional examples of at least a physiological sample consistent with this disclosure.

With continued reference to FIG. 10, physiological data may include one or more user body measurements. A "user body measurement" as used in this disclosure, includes a measurable indicator of the severity, absence, and/or presence of a disease state. A "disease state" as used in this disclosure, includes any harmful deviation from the normal structural and/or function state of a human being. A disease state may include any medical condition and may be associated with specific symptoms and signs. A disease state may be classified into different types including infectious diseases, deficiency diseases, hereditary diseases, and/or physiological diseases. For instance and without limitation, internal dysfunction of the immune system may produce a variety of different diseases including immunodeficiency, hypersensitivity, allergies, and/or autoimmune disorders.

With continued reference to FIG. 10, user body measurements may be related to particular dimensions of the human body. A "dimension of the human body" as used in this disclosure, includes one or more functional body systems that are impaired by disease in a human body and/or animal body. Functional body systems may include one or more body systems recognized as attributing to root causes of disease by functional medicine practitioners and experts. A "root cause" as used in this disclosure, includes any chain of causation describing underlying reasons for a particular disease state and/or medical condition instead of focusing solely on symptomatology reversal. Root cause may include chains of causation developed by functional medicine practices that may focus on disease causation and reversal. For instance and without limitation, a medical condition such as diabetes may include a chain of causation that does not include solely impaired sugar metabolism but that also includes impaired hormone systems including insulin resistance, high cortisol, less than optimal thyroid production, and low sex hormones. Diabetes may include further chains of causation that include inflammation, poor diet, delayed food allergies, leaky gut, oxidative stress, damage to cell membranes, and dysbiosis. Dimensions of the human body may include but are not limited to epigenetics, gut-wall, microbiome, nutrients, genetics, and/or metabolism.

With continued reference to FIG. 10, epigenetic, as used herein, includes any user body measurements describing changes to a genome that do not involve corresponding changes in nucleotide sequence. Epigenetic body measurement may include data describing any heritable phenotypic. Phenotype, as used herein, may include any observable trait of a user including morphology, physical form, and structure. Phenotype may include a user's biochemical and physiological properties, behavior, and products of behavior. Behavioral phenotypes may include cognitive, personality, and behavior patterns. This may include effects on cellular and physiological phenotypic traits that may occur due to external or environmental factors. For example, DNA methylation and histone modification may alter phenotypic expression of genes without altering underlying DNA sequence. Epigenetic body measurements may include data describing one or more states of methylation of genetic material.

With continued reference to FIG. 10, gut-wall, as used herein, includes the space surrounding the lumen of the gastrointestinal tract that is composed of four layers including the mucosa, submucosa, muscular layer, and serosa. The mucosa contains the gut epithelium that is composed of goblet cells that function to secrete mucus, which aids in lubricating the passage of food throughout the digestive tract. The goblet cells also aid in protecting the intestinal wall from destruction by digestive enzymes. The mucosa includes villi or folds of the mucosa located in the small intestine that increase the surface area of the intestine. The villi contain a lacteal, which is a vessel connected to the lymph system that aids in removal of lipids and tissue fluids. Villi may contain microvilli that increase the surface area over which absorption can take place. The large intestine lack villi and instead a flat surface containing goblet cells are present.

With continued reference to FIG. 10, gut-wall includes the submucosa, which contains nerves, blood vessels, and elastic fibers containing collagen. Elastic fibers contained within the submucosa aid in stretching the gastrointestinal tract with increased capacity while also maintaining the shape of the intestine. Gut-wall includes muscular layer which contains smooth muscle that aids in peristalsis and the movement of digested material out of and along the gut. Gut-wall includes the serosa which is composed of connective tissue and coated in mucus to prevent friction damage from the intestine rubbing against other tissue. Mesenteries are also found in the serosa and suspend the intestine in the abdominal cavity to stop it from being disturbed when a person is physically active.

With continued reference to FIG. 10, gut-wall body measurement may include data describing one or more test results including results of gut-wall function, gut-wall integrity, gut-wall strength, gut-wall absorption, gut-wall permeability, intestinal absorption, gut-wall barrier function, gut-wall absorption of bacteria, gut-wall malabsorption, gut-wall gastrointestinal imbalances and the like.

With continued reference to FIG. 10, gut-wall body measurement may include any data describing blood test results of creatinine levels, lactulose levels, zonulin levels, and mannitol levels. Gut-wall body measurement may include blood test results of specific gut-wall body measurements including d-lactate, endotoxin lipopolysaccharide (LPS) Gut-wall body measurement may include data breath tests measuring lactulose, hydrogen, methane, lactose, and the like. Gut-wall body measurement may include blood test results describing blood chemistry levels of albumin, bilirubin, complete blood count, electrolytes, minerals, sodium, potassium, calcium, glucose, blood clotting factors, With continued reference to FIG. 10, gut-wall body measurement may include one or more stool test results describing presence or absence of parasites, firmicutes, Bacteroidetes, absorption, inflammation, food sensitivities. Stool test results may describe presence, absence, and/or measurement of acetate, aerobic bacterial cultures, anerobic bacterial cultures, fecal short chain fatty acids, beta-glucuronidase, cholesterol, chymotrypsin, fecal color, *cryptosporidium* EIA, *Entamoeba histolytica*, fecal lactoferrin, *Giardia lamblia* EIA, long chain fatty acids, meat fibers and vegetable fibers, mucus, occult blood, parasite identification, phospholipids, propionate, putrefactive short chain fatty acids, total fecal fat, triglycerides, yeast culture, n-butyrate, pH and the like.

With continued reference to FIG. 10, gut-wall body measurement may include one or more stool test results describing presence, absence, and/or measurement of microorganisms including bacteria, archaea, fungi, protozoa, algae, viruses, parasites, worms, and the like. Stool test results may contain species such as *Bifidobacterium* species, *campylobacter* species, *Clostridium difficile, cryptosporidium* species, *Cyclospora cayetanensis, Cryptosporidium* EIA, *Dientamoeba fragilis, Entamoeba histolytica, Escherichia coli, Entamoeba histolytica, Giardia, H. pylori, Candida albicans, Lactobacillus* species, worms, macroscopic worms, mycology, protozoa, Shiga toxin *E. coli*, and the like.

With continued reference to FIG. 10, gut-wall body measurement may include one or more microscopic ova exam results, microscopic parasite exam results, protozoan polymerase chain reaction test results and the like. Gut-wall body measurement may include enzyme-linked immunosorbent assay (ELISA) test results describing immunoglobulin G (Ig G) food antibody results, immunoglobulin E (Ig E) food antibody results, Ig E mold results, IgG spice and herb results. Gut-wall body measurement may include measurements of calprotectin, eosinophil protein x (EPX), stool weight, pancreatic elastase, total urine volume, blood creatinine levels, blood lactulose levels, blood mannitol levels.

With continued reference to FIG. 10, gut-wall body measurement may include one or more elements of data describing one or more procedures examining gut including for example colonoscopy, endoscopy, large and small molecule challenge and subsequent urinary recovery using large molecules such as lactulose, polyethylene glycol-3350, and small molecules such as mannitol, L-rhamnose, polyethyleneglycol-300. Gut-wall body measurement may include data describing one or more images such as x-ray, MRI, CT scan, ultrasound, standard barium follow-through examination, barium enema, barium with contract, MRI fluoroscopy, positron emission tomography 9PET), diffusion-weighted MRI imaging, and the like.

With continued reference to FIG. 10, microbiome, as used herein, includes ecological community of commensal, symbiotic, and pathogenic microorganisms that reside on or within any of a number of human tissues and biofluids. For example, human tissues and biofluids may include the skin, mammary glands, placenta, seminal fluid, uterus, vagina, ovarian follicles, lung, saliva, oral mucosa, conjunctiva, biliary, and gastrointestinal tracts. Microbiome may include for example, bacteria, archaea, protists, fungi, and viruses. Microbiome may include commensal organisms that exist within a human being without causing harm or disease. Microbiome may include organisms that are not harmful but rather harm the human when they produce toxic metabolites such as trimethylamine. Microbiome may include pathogenic organisms that cause host damage through virulence factors such as producing toxic by-products. Microbiome may include populations of microbes such as bacteria and yeasts that may inhabit the skin and mucosal surfaces in various parts of the body. Bacteria may include for example Firmicutes species, Bacteroidetes species, Proteobacteria species, Verrumicrobia species, Actinobacteria species, Fusobacteria species, Cyanobacteria species and the like. Archaea may include methanogens such as Methanobrevibacter smithies' and Methanosphaera stadtmanae. Fungi may include *Candida* species and *Malassezia* species. Viruses may include bacteriophages. Microbiome species may vary in different locations throughout the body. For example, the genitourinary system may contain a high prevalence of *Lactobacillus* species while the gastrointestinal tract may contain a high prevalence of *Bifidobacterium* species while the lung may contain a high prevalence of *Streptococcus* and *Staphylococcus* species.

With continued reference to FIG. 10, microbiome body measurement may include one or more stool test results describing presence, absence, and/or measurement of microorganisms including bacteria, archaea, fungi, protozoa, algae, viruses, parasites, worms, and the like. Stool test results may contain species such as Ackerman's muciniphila, Anacrotruncus colihominis, bacteriology, *Bacteroides vulgates,' Bacteroides-Prevotella, Barnesiella* species, *Bifidobacterium longarm, Bifidobacterium* species, *Butyrivbrio crossotus, Clostridium* species, *Collinsella acrofaciens,* fecal color, fecal consistency, *Coprococcus cutactus, Desulfovibrio piger, Escherichia coli, Faccalibacterium prausnitzii*, Fecal occult blood, Firmicutes to Bacteroidetes ratio, *Fusobacterium* species, *Lactobacillus* species, Methanobrevibacter *smithii*, yeast minimum inhibitory concentration, bacteria minimum inhibitory concentration, yeast mycology, fungi mycology, *Odoribacter* species, *Oxalobacter formigenes,* parasitology, *Prevotella* species, *Pseudoflavonifractor* species, *Roseburia* species, *Ruminococcus* species, *Veillonella* species and the like.

With continued reference to FIG. 10, microbiome body measurement may include one or more stool tests results that identify all microorganisms living in a user's gut including bacteria, viruses, archaea, yeast, fungi, parasites, and bacteriophages. Microbiome body measurement may include DNA and RNA sequences from live microorganisms that may impact a user's health. Microbiome body measurement may include high resolution of both species and strains of all microorganisms. Microbiome body measurement may include data describing current microbe activity. Microbiome body measurement may include expression of levels of active microbial gene functions. Microbiome body measurement may include descriptions of sources of disease-causing microorganisms, such as viruses found in the gastrointestinal tract such as raspberry bushy swarf virus from consuming contaminated raspberries or Pepino mosaic virus from consuming contaminated tomatoes.

With continued reference to FIG. 10, microbiome body measurement may include one or more blood test results that identify metabolites produced by microorganisms. Metabolites may include for example, indole-3-propionic acid, indole-3-lactic acid, indole-3-acetic acid, tryptophan, serotonin, kynurenine, total indoxyl sulfate, tyrosine, xanthine, 3-methylxanthine, uric acid, and the like.

With continued reference to FIG. 10, microbiome body measurement may include one or more breath test results that identify certain strains of microorganisms that may be present in certain areas of a user's body. This may include for example, lactose intolerance breath tests, methane-based breath tests, hydrogen-based breath tests, fructose-based breath tests, *Helicobacter pylori* breath test, fructose intolerance breath test, bacterial overgrowth syndrome breath tests and the like.

With continued reference to FIG. 10, microbiome body measurement may include one or more urinary analysis results for certain microbial strains present in urine. This may include for example, urinalysis that examines urine specific gravity, urine cytology, urine sodium, urine culture, urinary calcium, urinary hematuria, urinary glucose levels, urinary acidity, urinary protein, urinary nitrites, bilirubin, red blood cell urinalysis, and the like.

With continued reference to FIG. 10, nutrient as used herein, includes any substance required by the human body to function. Nutrients may include carbohydrates, protein, lipids, vitamins, minerals, antioxidants, fatty acids, amino acids, and the like. Nutrients may include for example vitamins such as thiamine, riboflavin, niacin, pantothenic acid, pyridoxine, biotin, folate, cobalamin, Vitamin C, Vitamin A, Vitamin D, Vitamin E, and Vitamin K. Nutrients may include for example minerals such as sodium, chloride, potassium, calcium, phosphorous, magnesium, sulfur, iron, zinc, iodine, selenium, copper, manganese, fluoride, chromium, molybdenum, nickel, aluminum, silicon, vanadium, arsenic, and boron.

With continued reference to FIG. 10, nutrients may include extracellular nutrients that are free floating in blood and exist outside of cells. Extracellular nutrients may be located in serum. Nutrients may include intracellular nutrients which may be absorbed by cells including white blood cells and red blood cells.

With continued reference to FIG. 10, nutrient body measurement may include one or more blood test results that identify extracellular and intracellular levels of nutrients. Nutrient body measurement may include blood test results that identify serum, white blood cell, and red blood cell levels of nutrients. For example, nutrient body measurement may include serum, white blood cell, and red blood cell levels of micronutrients such as Vitamin A, Vitamin B1, Vitamin B2, Vitamin B3, Vitamin B6, Vitamin B12, Vitamin B5, Vitamin C, Vitamin D, Vitamin E, Vitamin K1, Vitamin K2, and folate.

With continued reference to FIG. 10, nutrient body measurement may include one or more blood test results that identify serum, white blood cell and red blood cell levels of nutrients such as calcium, manganese, zinc, copper, chromium, iron, magnesium, copper to zinc ratio, choline, inositol, carnitine, methylmalonic acid (MMA), sodium, potassium, asparagine, glutamine, serine, coenzyme q10, cysteine, alpha lipoic acid, glutathione, selenium, cicosa-pentaenoic acid (EPA), docosahexaenoic acid (DHA), docosapentaenoic acid (DPA), total omega-3, lauric acid, arachidonic acid, oleic acid, total omega 10, and omega 3 index.

With continued reference to FIG. 10, nutrient body measurement may include one or more salivary test results that identify levels of nutrients including any of the nutrients as described herein. Nutrient body measurement may include hair analysis of levels of nutrients including any of the nutrients as described herein.

With continued reference to FIG. 10, genetic as used herein, includes any inherited trait. Inherited traits may include genetic material contained with DNA including for example, nucleotides. Nucleotides include adenine (A), cytosine (C), guanine (G), and thymine (T). Genetic information may be contained within the specific sequence of an individual's nucleotides and sequence throughout a gene or DNA chain. Genetics may include how a particular genetic sequence may contribute to a tendency to develop a certain disease such as cancer or Alzheimer's disease.

With continued reference to FIG. 10, genetic body measurement may include one or more results from one or more blood tests, hair tests, skin tests, urine, amniotic fluid, buccal swabs and/or tissue test to identify a user's particular sequence of nucleotides, genes, chromosomes, and/or proteins. Genetic body measurement may include tests that example genetic changes that may lead to genetic disorders. Genetic body measurement may detect genetic changes such as deletion of genetic material or pieces of chromosomes that may cause Duchenne Muscular Dystrophy. Genetic body measurement may detect genetic changes such as insertion of genetic material into DNA or a gene such as the BRCA1 gene that is associated with an increased risk of breast and ovarian cancer due to insertion of 2 extra nucleotides. Genetic body measurement may include a genetic change such as a genetic substitution from a piece of genetic material that replaces another as seen with sickle cell anemia where one nucleotide is substituted for another. Genetic body measurement may detect a genetic change such as a duplication when extra genetic material is duplicated one or more times within a person's genome such as with Charcot-Marie Tooth disease type 1. Genetic body measurement may include a genetic change such as an amplification when there is more than a normal number of copies of a gene in a cell such as HER2 amplification in cancer cells. Genetic body measurement may include a genetic change such as a chromosomal translocation when pieces of chromosomes break off and reattach to another chromosome such as with the BCR-ABL1 gene sequence that is formed when pieces of chromosome 9 and chromosome 22 break off and switch places. Genetic body measurement may include a genetic change such as an inversion when one chromosome experiences two breaks and the middle piece is flipped or inverted before reattaching. Genetic body measurement may include a repeat such as when regions of DNA contain a sequence of nucleotides that repeat a number of times such as for example in Huntington's disease or Fragile X syndrome. Genetic body measurement may include a genetic change such as a trisomy when there are three chromosomes instead of the usual pair as seen with Down syndrome with a trisomy of chromosome 21, Edwards syndrome with a trisomy at chromosome 18 or Patau syndrome with a trisomy at chromosome 13. Genetic body measurement may include a genetic change such as monosomy such as when there is an absence of a chromosome instead of a pair, such as in Turner syndrome.

With continued reference to FIG. 10, genetic body measurement may include an analysis of COMT gene that is responsible for producing enzymes that metabolize neurotransmitters. Genetic body measurement may include an analysis of DRD2 gene that produces dopamine receptors in the brain. Genetic body measurement may include an analysis of ADRA2B gene that produces receptors for noradrenaline. Genetic body measurement may include an analysis of 5-HTTLPR gene that produces receptors for serotonin. Genetic body measurement may include an analysis of BDNF gene that produces brain derived neurotrophic factor. Genetic body measurement may include an analysis of 9p21 gene that is associated with cardiovascular disease risk. Genetic body measurement may include an analysis of APOE gene that is involved in the transportation of blood lipids such as cholesterol. Genetic body measurement may include an analysis of NOS3 gene that is involved in producing enzymes involved in regulating vasodilation and vasoconstriction of blood vessels.

With continued reference to FIG. 10, genetic body measurement may include ACE gene that is involved in producing enzymes that regulate blood pressure. Genetic body measurement may include SLCO1B1 gene that directs pharmaceutical compounds such as statins into cells. Genetic body measurement may include FUT2 gene that produces enzymes that aid in absorption of Vitamin B12 from digestive tract. Genetic body measurement may include MTHFR gene that is responsible for producing enzymes that aid in metabolism and utilization of Vitamin B9 or folate. Genetic body measurement may include SHMT1 gene that aids in production and utilization of Vitamin B9 or folate. Genetic body measurement may include MTRR gene that produces enzymes that aid in metabolism and utilization of Vitamin B12. Genetic body measurement may include MTR gene that produces enzymes that aid in metabolism and utilization of Vitamin B12. Genetic body measurement may include FTO gene that aids in feelings of satiety or fullness after eating. Genetic body measurement may include MC4R gene that aids in producing hunger cues and hunger triggers. Genetic body measurement may include APOA2 gene that directs body to produce ApoA2 thereby affecting absorption of saturated fats. Genetic body measurement may include UCP1 gene that aids in controlling metabolic rate and thermoregulation of body. Genetic body measurement may include TCF7L2 gene that regulates insulin secretion. Genetic body measurement may include AMY1 gene that aids in digestion of starchy foods. Genetic body measurement may include MCM6 gene that controls production of lactase enzyme that aids in digesting lactose found in dairy products. Genetic body measurement may include BCMOI gene that aids in producing enzymes that aid in metabolism and activation of Vitamin A. Genetic body measurement may include SLC23A1 gene that produces and transport Vitamin C. Genetic body measurement may include CYP2R1 gene that produces enzymes involved in production and activation of Vitamin D. Genetic body measurement may include GC gene that produces and transport Vitamin D. Genetic body measurement may include CYP1A2 gene that aids in metabolism and elimination of caffeine. Genetic body measurement may include CYP17A1 gene that produces enzymes that convert progesterone into androgens such as androstenedione, androstendiol, dehydroepiandrosterone, and testosterone.

With continued reference to FIG. 10, genetic body measurement may include CYP19A1 gene that produces enzymes that convert androgens such as androstenedione and testosterone into estrogens including estradiol and estrone. Genetic body measurement may include SRD5A2 gene that aids in production of enzymes that convert testosterone into dihydrotestosterone. Genetic body measurement may include UFT2B17 gene that produces enzymes that metabolize testosterone and dihydrotestosterone. Genetic body measurement may include CYP1A1 gene that produces enzymes that metabolize estrogens into 2 hydroxy-estrogen. Genetic body measurement may include CYP1B1 gene that produces enzymes that metabolize estrogens into 4 hydroxy-estrogen. Genetic body measurement may include CYP3A4 gene that produces enzymes that metabolize estrogen into 16 hydroxy-estrogen. Genetic body measurement may include COMT gene that produces enzymes that metabolize 2 hydroxy-estrogen and 4 hydroxy-estrogen into methoxy estrogen. Genetic body measurement may include GSTT1 gene that produces enzymes that eliminate toxic by-products generated from metabolism of estrogens. Genetic body measurement may include GSTM1 gene that produces enzymes responsible for eliminating harmful by-products generated from metabolism of estrogens. Genetic body measurement may include GSTP1 gene that produces enzymes that eliminate harmful by-products generated from metabolism of estrogens. Genetic body measurement may include SOD2 gene that produces enzymes that eliminate oxidant by-products generated from metabolism of estrogens.

With continued reference to FIG. 10, metabolic, as used herein, includes any process that converts food and nutrition into energy. Metabolic may include biochemical processes that occur within the body. Metabolic body measurement may include blood tests, hair tests, skin tests, amniotic fluid, buccal swabs and/or tissue test to identify a user's metabolism. Metabolic body measurement may include blood tests that examine glucose levels, electrolytes, fluid balance, kidney function, and liver function. Metabolic body measurement may include blood tests that examine calcium levels, albumin, total protein, chloride levels, sodium levels, potassium levels, carbon dioxide levels, bicarbonate levels, blood urea nitrogen, creatinine, alkaline phosphatase, alanine amino transferase, aspartate amino transferase, bilirubin, and the like.

With continued reference to FIG. 10, metabolic body measurement may include one or more blood, saliva, hair, urine, skin, and/or buccal swabs that examine levels of hormones within the body such as 11-hydroxy-androstercone, 11-hydroxy-etiocholanolone, 11-keto-androsterone, 11-keto-ctiocholanolone, 16 alpha-hydroxyestrone, 2-hydroxyestrone, 4-hydroxyestrone, 4-methoxyestrone, androstanediol, androsterone, creatinine, DHEA, estradiol, estriol, estrone, etiocholanolone, pregnanediol, pregnanestriol, specific gravity, testosterone, tetrahydrocortisol, tetrahydrocrotisone, tetrahydrodeoxycortisol, allo-tetrahydrocortisol.

With continued reference to FIG. 10, metabolic body measurement may include one or more metabolic rate test results such as breath tests that may analyze a user's resting metabolic rate or number of calories that a user's body burns each day rest. Metabolic body measurement may include one or more vital signs including blood pressure, breathing rate, pulse rate, temperature, and the like. Metabolic body measurement may include blood tests such as a lipid panel such as low density lipoprotein (LDL), high density lipoprotein (HDL), triglycerides, total cholesterol, ratios of lipid levels such as total cholesterol to HDL ratio, insulin sensitivity test, fasting glucose test, Hemoglobin AIC test, adipokines such as leptin and adiponectin, neuropeptides such as ghrelin, pro-inflammatory cytokines such as interleukin 10 or tumor necrosis factor alpha, anti-inflammatory cytokines such as interleukin 10, markers of antioxidant status such as oxidized low-density lipoprotein, uric acid, paraoxonase 1. Persons skilled in the art, upon reviewing the entirety of this disclosure, will be aware of various additional examples of physiological state data that may be used consistently with descriptions of systems and methods as provided in this disclosure.

With continued reference to FIG. 10, physiological state data may be obtained from a physically extracted sample. A "physical sample" as used in this example, may include any sample obtained from a human body of a user. A physical sample may be obtained from a bodily fluid and/or tissue analysis such as a blood sample, tissue, sample, buccal swab, mucous sample, stool sample, hair sample, fingernail sample and the like. A physical sample may be obtained from a device in contact with a human body of a user such as a microchip embedded in a user's skin, a sensor in contact with a user's skin, a sensor located on a user's tooth, and the like. Physiological data may be obtained from a physically extracted sample. A physical sample may include a signal from a sensor configured to detect physiological data of a user and record physiological data as a function of the signal. A sensor may include any medical sensor and/or medical device configured to capture sensor data concerning a patient, including any scanning, radiological and/or imaging device such as without limitation x-ray equipment, computer assisted tomography (CAT) scan equipment, positron emission tomography (PET) scan equipment, any form of magnetic resonance imagery (MRI) equipment, ultrasound equipment, optical scanning equipment such as photo-plethysmograph equipment, or the like. A sensor may include any electromagnetic sensor, including without limitation electroencephalographic sensors, magnetoencephalographic sensors, electrocardiogramansors, electromyographic sensors, or the like. A sensor may include a temperature sensor. A sensor may include any sensor that may be included in a mobile device and/or wearable device, including without limitation a motion sensor such as an inertial measurement unit (IMU), one or more accelerometers, one or more gyroscopes, one or more magnetometers, or the like. At least a wearable and/or mobile device sensor may capture step, gait, and/or other mobility data, as well as data describing activity levels and/or physical fitness. At least a wearable and/or mobile device sensor may detect heart rate or the like. A sensor may detect any hematological parameter including blood oxygen level, pulse rate, heart rate, pulse rhythm, blood sugar, and/or blood pressure. A sensor may be configured to detect internal and/or external biomarkers and/or readings. A sensor may be a part of apparatus 1000 or may be a separate device in communication with apparatus 1000. User data may include a profile, such as a psychological profile, generated using previous item selections by the user; profile may include, without limitation, a set of actions and/or navigational actions performed as described in further detail below, which may be combined with biological extraction data and/or other user data for processes as described in further detail below.

Physiological data and/or other data of each user may be stored, without limitation, in a user database. A user database may include any data structure for ordered storage and retrieval of data, which may be implemented as a hardware or software module. A user database may be implemented, without limitation, as a relational database, a key-value retrieval datastore such as a NOSQL database, or any other format or structure for use as a datastore that a person skilled in the art would recognize as suitable upon review of the entirety of this disclosure. A user database may include a plurality of data entries and/or records corresponding to user tests as described above. Data entries in a user database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a user database may reflect categories, cohorts, and/or populations of data consistently with this disclosure. A user database may be located in memory of computing device 104 and/or on another device in and/or in communication with apparatus 1000.

With continued reference to FIG. 10, in some embodiments, apparatus 1000 may analyze user data 1004 (e.g., biological extraction, physiological state data, and the like). In some embodiments, apparatus 1000 may analyze user data 1004 using a machine-learning model including a plurality of algorithms that outputs a normality level datum 1008. For the purposes of this disclosure, a "normality level datum" is a piece of data that indicates the degree to which user data is within a specific range or threshold. In some embodiments, normality level datum 1008 may include numerical or characteristic value. As a non-limiting example, normality level datum 1008 may include 'within the range,' 'slightly off the range,' 'far off the range,' and the like. As another non-limiting example, normality level datum 1008 may include percentages that indicate the closeness of the analysis of user data 1004 to a normality range. In some embodiments, apparatus 1000 may determine normality level datum 1008 of user data 1004 or user digital badge 180 described with respect to FIG. 1 as a function of a normality range. For the purposes of this disclosure, a "normality range" is a value or range of values for examining user data to determine if they fall within normal limit. As a non-limiting example, normality range may include a value or a range of value of blood glucose level, cholesterol level, blood pressure, hemoglobin level, vitamin level, and the like. In some embodiments, user may manually input normality range. In some embodiments, normality range may be retrieved from database.

With continued reference to FIG. 10, in some embodiments, apparatus 1000 may analyze user data 1004 or user digital badge 180 and output normality level datum 1008 using a machine-learning module. In some embodiments, apparatus 1000 may be configured to generate normality training data. In a non-limiting example, normality training data may include correlations between exemplary user data, exemplary user digital badges, exemplary normality range and/or exemplary normality level datum 1008. In some embodiments, normality training data may be stored in database. In some embodiments, normality training data may be received from one or more users, database, external computing devices, and/or previous iterations of processing. As a non-limiting example, normality training data may include instructions from a user, who may be an expert user, a past user in embodiments disclosed herein, or the like, which may be stored in memory and/or stored in database, where the instructions may include labeling of training examples. In some embodiments, normality training data may be updated iteratively using a feedback loop. As a non-limiting example, apparatus 1000 may update normality training data iteratively through a feedback loop as a function of user data 1004, and the like. In some embodiments, apparatus 1000 may be configured to generate normality machine-learning model. In a non-limiting example, generating normality machine-learning model may include training, retraining, or fine-tuning normality machine-learning model using normality training data or updated normality training data. In some embodiments, apparatus 1000 may be configured to determine normality level datum 1008 using normality machine-learning model (i.e. trained or updated normality machine-learning model).

With continued reference to FIG. 10, in some embodiments, user or user data 1004 may be classified to a user cohort using a cohort classifier. Cohort classifier may be consistent with any classifier discussed in this disclosure. Cohort classifier may be trained on cohort training data, wherein the cohort training data may include exemplary user data correlated to exemplary user cohorts. In some embodiments, a user or user data 1004 may be classified to a user cohort and apparatus 1000 may determine normality level datum 1008 based on the user cohort using a machine-learning module and the resulting output may be used to update normality training data. In some embodiments, generating training data and training machine-learning models may be simultaneous.

Still referring to FIG. 10, in some embodiments, apparatus 1000 may generate a nutrient plan 1012 as a function of normality level datum 1008. For the purposes of this disclosure, a "nutrient plan" is a detailed outline or schedule of what a user will eat for meals and snacks over a specific period. In some embodiments, apparatus 1000 may generate a nutrient plan 1012 as a function of a biological demand from user data 1004. For the purposes of this disclosure, a "biological demand" is biological requirements or needs of a user. As a non-limiting example, biological demand may include nutrient demand; such as micronutrients, macronutrients, and the like. In some embodiments, apparatus 1000 may determine biological demand of user or user data 1004 through the use of machine-learning module. In some embodiments, user may manually input biological demand. In some embodiments, biological demand may be retrieved from database. In some embodiments, apparatus 1000 may generate a nutrient plan 1012 as a function of an element availability. For the purposes of this disclosure, an "element availability" is the presence and accessibility of food or ingredients for a nutrient plan 1012. In some embodiments, user may manually input element availability. In some embodiments, element availability may be retrieved from database. In a non-limiting example, apparatus 1000 may generate nutrient plan 1012 with ingredients or food that is easily accessible and available to a user. In some embodiments, apparatus 1000 may generate a nutrient plan 1012 as a function of a nutrient absorption rate of a user. For the purposes of this disclosure, an "nutrient absorption rate" is the speed and efficiency at which nutrients from the food a user consume are absorbed into the user's body. In some embodiments, user may manually input nutrient absorption rate. In some embodiments, nutrient absorption rate may be retrieved from database. In a non-limiting example, apparatus 1000 may generate nutrient plan 1012 with ingredients or food that can be easily absorbed by a user's body. In some embodiments, nutrient plan 1012 may help maintaining user's normality level datum 1008 to be 'within the range.' In some embodiments, nutrient plan 1012 may help brining normality level datum 1008 from 'far off the range' to 'within the range.' In some embodiments, nutrient plan 1012 may consider calories, macronutrients, micronutrients, vitamins, minerals, protein, fat, cholesterol, sugar, carbohydrate, sodium, and the like. As a non-limiting example, nutrient plan 1012 may include a list of food, meal structure, recipe, portion sizes, nutrient distributions, and the like. In some embodiments, user may manually input nutrient plan 1012. In some embodiments, nutrient plan 1012 may be retrieved from database.

With continued reference to FIG. 10, additional disclosure related to nutrient plan 1012 may be found in U.S. patent application Ser. No. 18/661,324, filed on May 10, 2024, and titled "METHODS AND SYSTEMS FOR DETERMINING A COMPATIBLE SUBSTANCE," and U.S. patent application Ser. No. 17/517,801, filed on Nov. 3, 2024, and titled "METHOD OF SYSTEM FOR REVERSING INFLAMMATION IN A USER," the entirety of each of which is incorporated by reference herein in its entirety.

With continued reference to FIG. 10, in some embodiments, apparatus 1000 may generate nutrient plan 1012 using a machine-learning module. In some embodiments, apparatus 1000 may be configured to generate plan training data. In a non-limiting example, plan training data may include correlations between exemplary user data, exemplary normality level datum, exemplary biological demands, exemplary element availabilities, exemplary nutrient absorption rates, and/or exemplary nutrient plan. In some embodiments, plan training data may be stored in database. In some embodiments, plan training data may be received from one or more users, database, external computing devices, and/or previous iterations of processing. As a non-limiting example, plan training data may include instructions from a user, who may be an expert user, a past user in embodiments disclosed herein, or the like, which may be stored in memory and/or stored in database, where the instructions may include labeling of training examples. In some embodiments, plan training data may be updated iteratively using a feedback loop. As a non-limiting example, apparatus 1000 may update plan training data iteratively through a feedback loop as a function of user data 1004, normality level datum 1008, user cohort, normality range, and the like. In some embodiments, apparatus 1000 may be configured to generate plan machine-learning model. In a non-limiting example, generating plan machine-learning model may include training, retraining, or fine-tuning plan machine-learning model using plan training data or updated plan training data. In some embodiments, apparatus 1000 may be configured to determine nutrient plan 1012 using plan machine-learning model (i.e. trained or updated plan machine-learning model).

With continued reference to FIG. 10, in some embodiments, apparatus 1000 may generate an impact datum of nutrient plan 1012 to a user. For the purposes of this disclosure, an "impact datum" is a degree to which a nutrient plan 1012 affects various aspects of a user's health. As a non-limiting example, impact datum may indicate the change of normality level datum 1008 of user by implementing nutrient plan 1012. As another non-limiting example, impact datum may include a percentage value that indicate the improvement of user's health by implementing nutrient plan 1012. In some embodiments, user may manually input impact datum. In some embodiments, impact datum may be retrieved from database.

With continued reference to FIG. 10, in some embodiments, apparatus 1000 may generate impact datum using a machine-learning module. In some embodiments, apparatus 1000 may be configured to generate impact training data. In a non-limiting example, impact training data may include correlations between exemplary user data, exemplary normality level datum, exemplary nutrient plan and/or exemplary impact datums. In some embodiments, impact training data may be stored in database. In some embodiments, impact training data may be received from one or more users, database, external computing devices, and/or previous iterations of processing. As a non-limiting example, impact training data may include instructions from a user, who may be an expert user, a past user in embodiments disclosed herein, or the like, which may be stored in memory and/or stored in database, where the instructions may include labeling of training examples. In some embodiments, impact training data may be updated iteratively using a feedback loop. As a non-limiting example, apparatus 1000 may update impact training data iteratively through a feedback loop as a function of user data 1004, normality level datum 1008, user cohort, normality range, and the like. In some embodiments, apparatus 1000 may be configured to generate impact machine-learning model. In a non-limiting example, generating impact machine-learning model may include training, retraining, or fine-tuning impact machine-learning model using impact training data or updated impact training data. In some embodiments, apparatus 1000 may be configured to determine impact datum using impact machine-learning model (i.e. trained or updated impact machine-learning model).

Still referring to FIG. 10 and FIG. 1, in some embodiments, apparatus 1000 may generate diagnostic output 156 and guided recommendation 164 as a function of normality level datum 1008. The diagnostic output 156 and guided recommendation 164 are described further in detail above. In some embodiments, apparatus 1000 may pair a medical professional with a user as a function of normality level datum 1008. In a non-limiting example, apparatus 1000 may pair a medical professional with a user if normality level datum 1008 includes 'far off the range,' indicating that emergent intervention by medical professional is necessary. In some embodiments, pairing a medical professional with a user includes identifying a medial professional with experience providing guidance as to health effects of alimentary elements of a category including the normality level datum 1008. In some embodiments, pairing a medical professional with a user may include collecting identification information of a user, and transmitting the identification information of the user to the medical professional. In some embodiments, pairing a medical professional with a user may include collecting identification information of a medical professional, and transmitting the identification information of the medial professional to the user. Identification information may include, in non-limiting examples, a name, phone number, email address, account number (such as an account number on a messaging platform), and a social media account handle. In some embodiments, pairing a medical professional with a user may include opening a communication channel between the medial professional and the user, such as by starting a phone call between the two. In some embodiments, pairing a medical professional with a user may include scheduling a meeting including the medial professional and the user. In some embodiments, a medical professional may be paired with more than one user. For example, in some embodiments, two or more users may have similar normality level datums 1008, and a medial professional may be paired with more than one such user. A medical professional may include an artificial intelligence system including any simulation of human intelligence and/or problem-solving capabilities processed by a machine, such as a computer system.

With continued reference to FIG. 10, in some embodiments, apparatus 1000 may be configured to classify user data 1004 to a profile cluster 1016. For the purposes of this disclosure, a "profile cluster" is a category including a plurality of related phenotypes. For example, in some embodiments, a profile cluster may include a grouping of phenotypes with similar nutritional needs. In some embodiments, user data 1004 may be classified to a profile cluster 1016 using a phenotype classifier. Phenotype classifier may be consistent with any classifier disclosed in this disclosure. In some embodiments, phenotype classifier may be generated using a machine-learning module, such as machine-learning module 200 disclosed with respect to FIG. 2. In some embodiments, phenotype classifier may be trained using training data correlating a plurality of user data to a plurality of profile clusters. Phenotype classifier may be configured to accept user data as input and to generate a profile cluster for the user data.

With continued reference to FIG. 10, in some embodiments, apparatus 1000 may be configured to classify user data 1004 to profile cluster 1016 as a function of a profile cluster look-up table. In some embodiments, profile cluster lookup table may relate user data to profile clusters. In some embodiments, profile cluster lookup table may relate ranges of certain types of user data to profile clusters.

Still referring to FIG. 10, apparatus 1000 may assign a user one or more cohort labels as a function of one or more phenotypic clusters. As used in this disclosure, "cohort label" is an identifier assigned to a user based on a phenotypic cluster. As a non-limiting example, cohort label may further classify a user within a phenotype group. In some embodiments, cohort label may be assigned once computing device 104 receives additional data. Additional data may provide more insight into a health status of a user. In some instances, cohort label may be assigned as a function of a biological extraction. As a non-limiting example, cohort label may be "diabetic" when biological extraction data indicates a high blood sugar. apparatus 1000 may reference a cohort label lookup table to assign a cohort label to a user. In some embodiments, cohort label may have a biological extraction threshold. As a non-limiting example, apparatus 1000 may assign a user a "anemic" when a user's iron levels fall below a threshold.

Still referring to FIGS. 1 and 10, in some embodiments, apparatus 1000 may receive cohort data 108. In some embodiments, cohort data 108 and profile cluster 1016 may be consistent. In some embodiments, cohort data 108 and/or profile cluster 1016 may include a nutrition target range. A "nutrition target range," as used in this disclosure, is a value or range of values of quantities of nutrients that is targeted for a user to intake to promote optimal health. As a non-limiting example, nutrition target range may include the value of vitamin, calories, macronutrients, vitamins, minerals, protein, fat, cholesterol, sugar, carbohydrate, sodium, and the like.

Still referring to FIG. 10, in some embodiments, apparatus 1000 may be configured to receive edible data 1020. "Edible data" as used in this disclosure is information relating to consumable items. In some embodiments, edible data 1020 may include a meal identification. A "meal identification," also referred to as meal ID, as used in this disclosure, is a classification of a recipe. In some embodiments, apparatus 1000 may receive edible data 1020 and/or a meal ID from a user. In some embodiments, a meal ID of edible data 1020 may include a title and/or a description related to a meal. For example a meal ID may include a name of a dish, such as "Beef Stroganoff." A description of a meal ID may include one or more general contents of a dish and/or a specific description of the dish. For example, a description may include data that Beef Stroganoff is an originally Russian dish of sautéed pieces of beef served in a sauce of mustard and smetana (sour cream).

Still referring to FIG. 10, apparatus 1000 is configured to receive recipe data containing nutrient data from the user. Recipe data may include a list of nutrients to prepare a meal. For example, and without limitation, edible data 1020 may include nutrients in a beef stroganoff dish, which may include: 1 pound uncooked wide egg noodles, ¼ cup butter, divided, 2½ pounds thinly-sliced steak, fine sea salt and freshly-cracked black pepper, 4.5 small white onions, thinly sliced, 3 pound sliced mushrooms, 2 cloves garlic, minced or pressed, ½ cup dry white wine, 1½ cups beef stock, 1 tablespoon Worcestershire sauce, 3 tablespoons all-purpose flour, ½ cup of sour cream, and chopped fresh parsley.

Still referring to FIG. 10, in some embodiments, apparatus 1000 may extract plurality of nutrients 1024 from edible data 1020. "Nutrients," as used in this disclosure, are elements of a meal. Nutrients 116 may include, but are not limited to, meats, vegetables, sauces, syrups, seafoods, fruits, dairy products, and the like. In some embodiments, apparatus 1000 may utilize a language processing module to extract a plurality of nutrients 1024 from edible data 1020. In some embodiments, apparatus 1000 may utilize optical character recognition to identify and/or extract plurality of nutrients 1024 from edible data 1020. Optical character recognition (OCR) is disclosed further with reference to FIG. 1.

Still referring to FIG. 10, in some embodiments, edible data 1020 may be provided by a user, such as, but not limited to, a chef, line cook, an individual, and the like. Edible data 1020 may be received and/or stored by a graphical user interface or a user database as described further below. Alternatively or additionally, apparatus 1000 may retrieve edible data 1020 from an online repository or other suitable source for retrieving information regarding meal preparation. In non-limiting illustrative examples, edible data 1020 may contain sequentially ordered tasks that may be sequentially ordered based upon a chronological order, tasks ordered by resource optimization, and the like. Edible data 1020 may contain elements, steps, instructions, or the like that refer to preparing one or more meals, by one or more personnel, using one of more stations, appliances, utensils, and the like. In non-limiting illustrative examples, apparatus 1000 may retrieve a plurality of edible data 1020 by retrieving a series of steps corresponding to a meal ID, for instance and without limitation, recipe steps using available nutrients 1024 for cooking a beef stew. In further non-limiting illustrative examples, the steps to a beef stew may be associated with a chronological sequential ordering of personnel tasks, nutrient retrieval, kitchen space use, and may differ based upon time constraints, including and/or avoiding certain nutrients 1024, equipment, and the like.

Still referring to FIG. 10, in some embodiments, apparatus 1000 may be configured to generate a web search. A "web search" as used in this disclosure is a query for information through the Internet. Generating a web search may include generating a web crawler function. A web search may be configured to search for one or more keywords, key phrases, and the like. A keyword may be used by a query to filter potential results from a query. As a non-limiting example, a keyword may include "Gluten." A query may be configured to generate one or more key words and/or phrases as a function of edible data 1020. A query may give a weight to one or more semantic elements of edible data 1020. "Weights," as used herein, may be multipliers or other scalar numbers reflecting a relative importance of a particular attribute or value. A weight may include, but is not limited to, a numerical value corresponding to an importance of an element. In some embodiments, a weighted value may be referred to in terms of a whole number, such as 1, 100, and the like. As a non-limiting example, a weighted value of 0.2 may indicate that the weighted value makes up 20% of the total value. As a non-limiting example, edible data 1020 may include the words "gluten free." A query may give a weight of 0.8 to the word "gluten," and a weight of 0.2 to the word "free." A query may map a plurality of semantic elements of query results having similar elements to the word "gluten" with differing elements than the word "free" due to the lower weight value paired to the word "gluten." In some embodiments, a query may pair one or more weighted values to one or more semantic elements of edible data 1020. Weighted values may be tuned through a machine-learning model, such as any machine learning model as described throughout this disclosure without limitation. In some embodiments, a query may generate weighted values based on prior queries. In some embodiments, a query may be configured to filter out one or more "stop words" that may not convey meaning, such as "of," "a," "an," "the," or the like.

Still referring to FIG. 10, in some embodiments, apparatus 1000 may generate an index classifier. In an embodiment, an index classifier may include a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. An index classifier may include a classifier configured to input semantic elements and output web search indices. A "web search index," as defined in this disclosure is a data structure that stores uniform resource locators (URLs) of web pages together with one or more associated data that may be used to retrieve URLs by querying the web search index; associated data may include keywords identified in pages associated with URLs by programs such as web crawlers and/or "spiders." A web search index may include any data structure for ordered storage and retrieval of data, which may be implemented as a hardware or software module. A web search index may be implemented, without limitation, as a relational database, a key-value retrieval datastore such as a NOSQL database, or any other format or structure for use as a datastore that a person skilled in the art would recognize as suitable upon review of the entirety of this disclosure. Data entries in a web search index may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a web search index may reflect categories, cohorts, and/or populations of data consistently with this disclosure. In an embodiment, a web search query at a search engine may be submitted as a query to a web search index, which may retrieve a list of URLs responsive to the query. In some embodiments, apparatus 1000 may be configured to generate a query based on a freshness and/or age of a query result. A freshness may include an accuracy of a query result. An age may include a metric of how outdated a query result may be. In some embodiments, apparatus 1000 may generate a web crawler configured to search the Internet for edible data 1020, such as, but not limited to, nutrients 1024, preparation steps, category of food, allergen data, and the like. As a non-limiting example, a query may include a web crawler configured to search and/or index information of words and/or phrases having a similarity to edible data 1020.

Still referring to FIG. 10, in some embodiments, edible data 1020 may include nutrient data. "Nutrient data," as used in this disclosure, is information pertaining to the nutritional value of one or more nutrients 1024. In some embodiments, nutrient data may include nutritional values related to nutrients 1024 in a meal. For example, nutritional values may include the value of vitamin, calories, macronutrients, vitamins, minerals, protein, fat, cholesterol, sugar, carbohydrate, sodium, and the like in the meal. For example, in beef stroganoff, the nutritional values may be calories 235, total fat 11 g, saturated fat 10 g, cholesterol 50 mg, sodium 1,044 mg, potassium 336 mg, total carbohydrate 22 g, dietary fiber 1.4 g, sugar 4 g, protein 12 g, vitamin c. In some embodiments, nutritional values may include a daily value of nutrients 1024 in a dish. "Daily value (DV)," as used in this disclosure, is the recommended amount of nutrients 1024 a person should consume and not to exceed each day. The % DV may be how much a nutrient in a single serving of an individual dish or dietary supplement contributes to a daily diet. For example, if the DV for a certain nutrient is 300 micrograms (mcg) and a dish or supplement has 30 mcg in one serving, the % DV for that nutrient in a serving of the product may be 10%. In some embodiments, apparatus 1000 may receive recipe data from a user database. User database may contain recipe data received from a plurality of different users categorized to a common meal ID. For example, user database may contain a recipe data table containing a plurality of different recipes and nutritional values common for a beef stroganoff dish.

Still referring to FIG. 10, in some embodiments, apparatus 1000 may be configured to classify plurality of nutrients 1024 to impact factors 1028. An "impact factor," as used in this disclosure, is a metric of influence one or more nutrients 1024 has on an individual's biological system. A "biological system" as used in this disclosure is a process and/or group of processes that occur in an individual's physiology. Impact factors 1028 may include, without limitation, concentration of nutrients 1024, quantity of nutrients 1024, calories of nutrients 1024, allergens associated with one or more nutrients 1024, carbohydrate and/or other macronutrient quantities, ratios, and the like. In some embodiments, impact factors 1028 may be based on essential macronutrients and micronutrients. "Micronutrients," as used herein, are nutrients that a person needs in small doses. For example, micronutrients may include vitamins and minerals. "Macronutrients," as used herein, are nutrients that a person needs in larger amounts. For example, macronutrients may include water, protein, carbohydrates, and fats. In some embodiments, impact factors 1028 may be based on nutrients 1024 essential for boosting the immune system, helping prevent or delay certain cancers, such as prostate cancer, strengthening teeth and bones, aiding in calcium absorption, maintaining healthy skin, helping the body metabolize proteins and carbs, supporting healthy blood, burning fat, building muscle, maintaining weight, losing water weight, aiding brain and nervous system functioning, aiding in blood clotting, helping to carry oxygen and/or the like. A user may select, through GUI 1032, what impact factors 1028 may be based on. In some embodiments, a user may select a plurality of impact factors 1028. In some embodiments, receive impart factor data in the form of documents, medical papers, research papers, and the like through an impact factors 1028 database. "Impact factor database," as used in this disclosure, is a data structure containing information related to a plurality of impact factors 1028. An impact factor database may be populated by apparatus 1000 utilizing a web crawler. An impact factor database may be populated by expert submission. An "expert," as used herein, is a person who has a comprehensive and authoritative knowledge of or skill in a particular area. For example, a doctor may submit a paper on how fish oil aids in preventing cancer. An expert submission may include a single expert submission and/or a plurality of submissions from an expert; plurality of submissions may be received from a plurality of experts as described in U.S. patent application Ser. No. 16/397,814, filed, Apr. 29, 2019, and titled "METHODS AND SYSTEMS FOR CLASSIFICATION USING EXPERT DATA," of which is incorporated by reference herein in its entirety.

Still referring to FIG. 10, in some embodiments, apparatus 1000 may determine one or more impact factors 1028 for one or more phenotypes. A "phenotype," as used in this disclosure, is a composite observable characteristic or trait of an individual. A phenotype may include a user's biochemical and physiological properties, behavior, and products of behavior. Behavioral phenotypes may include cognitive, personality, and behavior patterns. This may include effects on cellular and physiological phenotypic traits that may occur due to external or environmental factors. For example, DNA methylation and histone modification may alter phenotypic expression of genes without altering underlying DNA sequence. Phenotype may include a congenital disorder, anomaly, and the like, such as hearing defects, trisomy 18 (Edward's syndrome), trisomy 21 (down syndrome), trisomy 13 (Patau syndrome), cleft palate, spina bifida, phenylketonuria, glutamate carboxypeptidase II mutation, pyloric stenosis, congenital hip dislocation, anencephaly, hypoplasia, Meckel's diverticulum, and the like. Phenotype may include a genotype-environment interaction (GxE). Phenotype may include any diagnosis (current disorder) and/or prognosis (predicted difficulty, future diagnosis, outcome, and the like) associated with a congenital factor. Phenotype may include identifiers associated with disorders, conditions, symptoms, and the like, which may correspond with categorization. Phenotype may include a predictive classification, where a subject may be considered reasonably healthy at birth, does not harbor congenital factor(s) indicative of obvious current congenital disorder but may include data that indicates a phenotype with which they may be most closely categorized to, and/or an imminent categorization. A phenotype may be stored and/or retrieved from a user database.

Still referring to FIG. 10, in some embodiments, apparatus 1000 may classify plurality of nutrients 1024 to impact factors 1028 utilizing a nutrient classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A nutrient classifier may be configured to output at least a datum that labels or otherwise identifies a set of data that are clustered together, found to be close under a distance metric as described below, or the like. In some embodiments, a nutrient classifier may receive meal ID and recipe data as an input and output a plurality of matched nutrient data elements to an importance factor. For example, a nutrient classifier may match nutrients 1024 in a dish that contain a nutritional value that are essential for boosting the immune system. In some embodiments, a nutrient classifier may receive meal ID and recipe data as an input and output a plurality of matched nutrient data elements to a plurality of impact factors. For example, a nutrient classifier may match nutrients 1024 in a dish that contain a nutritional value that are essential for boosting the immune system, building muscle, maintaining healthy skin, and the like. Training data for a nutrient classifier may include data from impact factor data. For example, classification based on muscle building may include training data containing documents and expert submission exemplifying nutrients 1024 that may correlate to muscle building. In some embodiments, training data may include, a plurality of recipe data received from a plurality of user from user database.

Still referring to FIG. 10, in some embodiments, apparatus 1000 may receive edible data 1020 and/or a meal ID from a user database. A "user database," as used in this disclosure is a data structure containing information uploaded by a user. User database may contain information from a plurality of different users categorized to a common meal ID. For example, user database may contain a meal ID table containing a plurality of different titles common for a beef stroganoff dish and a plurality of different meal descriptions associated to the dish. User database and all other databases in this disclosure may be implemented, without limitation, as a relational user database, a key-value retrieval user database such as a NOSQL user database, or any other format or structure for use as a user database that a person skilled in the art would recognize as suitable upon review of the entirety of this disclosure. User database may alternatively or additionally be implemented using a distributed data storage protocol and/or data structure, such as a distributed hash table or the like. User database may include a plurality of data entries and/or records as described above. Data entries in a user database may be flagged with or linked to one or more additional elements of information, which may be reflected in data entry cells and/or in linked tables such as tables related by one or more indices in a relational user database. Persons skilled in the art, upon reviewing the entirety of this disclosure, will be aware of various ways in which data entries in a user database may store, retrieve, organize, and/or reflect data and/or records as used herein, as well as categories and/or populations of data consistently with this disclosure. A user database may include one or more elements of edible data 1020 and/or user data. In some embodiments, a user database may be populated through user input and/or one or more web searches.

Still referring to FIG. 10, in some embodiments, a nutrient classifier may be further configured to generate a nutrient score 1036. A "nutrient score" as used in this disclosure is a value given to a nutrient. A nutrient classifier may score plurality of nutrients 1024. In some embodiments, nutrient classifier may score plurality of nutrients 1024 across a plurality of phenotypes to determine an impact factor of impact factors 1028. In some embodiments, nutrient classifier may score plurality of nutrients 1024 across a plurality of phenotypes to determine an impact factor of impact factors 1028 based on how nutrients 1024 matches a nutrient target range of each phenotypes (e.g., cohort data 108, profile cluster 1016, cohort label, and the like). In some instances, nutrient classifier may be trained using nutrient classifier training data. In some embodiments, nutrient classifier training data may include historical nutrient data correlated to categories of nutrients. In some embodiments, nutrient classifier training data may contain categories of nutrients correlated to scores for those categories of nutrients. In some embodiments, a lookup table correlating categories of nutrients to nutrient score 1036 may be used to determine a nutrient score 1036 once nutrient classifier determines a category of nutrient. In some embodiments, a nutrient classifier may be configured to score a plurality of nutrients 1024. Nutrient score 1036 may be based off, without limitation, relative impact of one or more nutrients on one or more phenotypes. For instance, and without limitation, a score of 0 out of 10 may be assigned to a filet mignon for a phenotype of vegan. In some embodiments, a score may be based off a nutrition target range. In some embodiments, nutrient score 1036 may be generated by using an objective function as described in further detail below. It should be noted, the nutrient score 1036 may be generated using an objective function that is optimized using impact factors as constraints. In some instances, objective function may be optimized using profile clusters as constraints.

Still referring to FIG. 10, apparatus 1000 may be configured to receive and/or determine a nutrition target range of one or more users, profile clusters 1016, and the like. Apparatus 1000 may utilize a nutrient target machine learning model to determine a nutrient target range of one or more individuals. A nutrient target machine learning model may be trained with training data correlating user data to nutrition target ranges. In some instances, training data may correlate a biological extraction and/or phenotypes to target ranges. In some instances, training data may correlate a user profile to target ranges. Training data may be received through user input, external computing devices, and/or previous iterations of processing. In some instances, training data may be retrieved from a database storing user data correlated to target ranges. As a non-limiting example, training data may be stored in a training data lookup table (LUT). As used in this disclosure, a "lookup table" is an array of data that maps input values to output values. A lookup table may be used to replace a runtime computation with an array indexing operation. In another non limiting example, a training data look up table may be able to relate user data to target ranges. In some embodiments, a nutrient classifier and/or apparatus 1000 may utilize a nutrient target machine learning model. A nutrient target machine learning model may be configured to receive user data and/or edible data 1020 and output one or more nutrient target ranges of one or more individuals and/or groups of individuals.

Still referring to FIG. 10, apparatus 1000 may utilize a nutrient score machine learning model to determine a nutrient score 1036 of at least a nutrient. A nutrient score machine learning model may be trained with training data correlating phenotype data to nutrient scores. Training data may be received through user input, external computing devices, and/or previous iterations of processing. In some instances, training data may be retrieved from a database storing user data correlated to target ranges. As a non-limiting example, training data may be stored in a training data lookup table (LUT).

Still referring to FIG. 10, computing device or apparatus 1000 may be configured to generate a nutrition supplement as a function of the nutrition target range. A "nutrition supplement," as used in this disclosure, is a modification of a recipe. Nutritional supplements may include, without limitation, different sets of nutrients 1024, such as spices, meats, seasonings, vitamin powders, and the like. In some embodiments, a nutrient classifier may be configured to receive training data correlating recipe data and/or user data to one or more nutritional supplements. Training data may be received through user, external computing devices, and/or previous iterations of processing. A nutrient classifier may input edible data 1020 and/or user data and output one or more nutritional supplements suggested by computing device that offer nutritional values aligned to nutrition range target.

Still referring to FIG. 10, in some embodiments, apparatus 1000 may be configured to generate a nutrient score 1036 of a recipe or recipe data as a function of a plurality of user request datums 1040. For the purposes of this disclosure, a "user request datum" is a data element that is generated when a user makes a request or shows an interest related to a specific recipe. In a non-limiting example, user request datum 1040 may reflect the user's preference or inclination related to recipe, nutrient, and the like. For example, and without limitation, user request datum 1040 may be generated and stored in database when a user demands or uses a specific recipe. In some embodiments, user request datums 1040 may be retrieved from a database. In some embodiments, apparatus 1000 may retrieve user request datums 1040 from the database. In some embodiments, user may manually input user request datums 1040 into apparatus 1000.

Still referring to FIG. 10, in some embodiments, apparatus 1000 may be configured to transmit a recipe and/or nutrient supplement that has a nutrient score 1036 and a plurality of user request datums 1040 higher than a transmission threshold to graphical user interface (GUI) 1032. For the purposes of this disclosure, a "transmission threshold" is a predefined criterion or set of criteria that a feature of a recipe must meet in order to be transmitted to the next stage of processing or to another system. As a non-limiting example, transmission threshold may include a quantity of user request datum 1040 related to a specific recipe or a value of nutrient score 1036 that can be a threshold for a recipe to be transmitted to GUI 1032. In a non-limiting example, nutrient score 1036 and/or user request datums 1040 higher than a transmission threshold may indicate that a recipe will be able to be sold on a third party's platform. For example, and without limitation, recipe that has nutrient score 1036 or a number of user request datums 1040 related to the recipe lower than transmission threshold may indicate that the recipe would be rejected and not be sold on a third party's platform. In some embodiments, apparatus 1000 may generate nutrient supplement for a recipe that has nutrient score 1036 or a number of user request datums 1040 related to the recipe lower than transmission threshold. In some embodiments, a third party may manually determine which recipe and/or nutrient supplement can be transmitted to GUI 1032. As a non-limiting example, third party may manually determine that potato chip of recipe or recipe data should not be transmitted to GUI 1032. For the purposes of this disclosure, a "third party" is an entity or individual that is involved in recipe but is not a user. As a non-limiting example, third party may include a health planning platform, service provider, and the like. In a non-limiting example, a recipe being transmitted to GUI 1032 may indicate that the recipe can be sold on a third party's platform to users.

Still referring to FIG. 10, in some embodiments, apparatus 1000 may be configured to generate nutrient chain. A "nutrient chain" as used in this disclosure is a set of edible items. Edible items may include, without limitation, seasonings, spices, vitamin powders, meats, seafood, fruits, vegetables, dairy products, and the like. In some embodiments, apparatus 1000 may compare impact factors 1028 with plurality of nutrients 1024 to generate nutrient chain. In some embodiments, apparatus 1000 may be configured to compare any data as described throughout this disclosure using an objective function. For instance, apparatus 1000 may generate an objective function. An "objective function" as used in this disclosure is a process of minimizing or maximizing one or more values based on a set of constraints. In some embodiments, an objective function of apparatus 1000 may include an optimization criterion. An optimization criterion may include any description of a desired value or range of values for one or more impact factors; desired value or range of values may include a maximal or minimal value, a range between maximal or minimal values, or an instruction to maximize or minimize an impact factor. As a non-limiting example, an optimization criterion may specify that an impact factor should be within a 1% difference of an optimization criterion. An optimization criterion may alternatively request that an impact factor be greater than a certain value. An optimization criterion may specify one or more tolerances for differences in macronutrients of one or more nutrients 1024 in a recipe. An optimization criterion may specify one or more desired impact factor criteria for a nutrient chain. In an embodiment, an optimization criterion may assign weights to different impact factors or values associated with impact factors. One or more weights may be expressions of value to a user of a particular outcome, impact factor value, or other facet of a nutrient chain. Optimization criteria may be combined in weighted or unweighted combinations into a function reflecting an overall outcome desired by a user; function may be a nutrient chain function to be minimized and/or maximized. A function may be defined by reference to impact factor criteria constraints and/or weighted aggregation thereof as provided by apparatus 1000; for instance, an impact factor function combining optimization criteria may seek to minimize or maximize a function of nutrient chain generation.

Still referring to FIG. 10, generation of an objective function may include generation of a function to score and weight factors to achieve a process score for each feasible pairing. In some embodiments, pairings may be scored in a matrix for optimization, where columns represent nutrients 1024 and rows represent impact factors potentially paired therewith; each cell of such a matrix may represent a score of a pairing of the corresponding nutrient to the corresponding impact factor. In some embodiments, assigning a predicted process that optimizes the objective function includes performing a greedy algorithm process. A "greedy algorithm" is defined as an algorithm that selects locally optimal choices, which may or may not generate a globally optimal solution. For instance, apparatus 1000 may select pairings so that scores associated therewith are the best score for each impact factor and/or for each nutrient. In such an example, optimization may determine the combination of nutrients 1024 such that each impact factor pairing includes the highest score possible.

Still referring to FIG. 10, an objective function may be formulated as a linear objective function. Apparatus 1000 may solve an objective function using a linear program such as without limitation a mixed-integer program. A "linear program," as used in this disclosure, is a program that optimizes a linear objective function, given at least a constraint. For instance, and without limitation, objective function may seek to maximize a total score $\Sigma_{r \in R} \Sigma_{s \in S} c_{rs} x_{rs}$, where R is a set of all nutrients 1024 $r$, S is a set of all impact factors $s$, $c_{rs}$ is a score of a pairing of a given nutrient with a given impact factor, and $x_{rs}$ is 1 if an nutrient r is paired with an impact factor s, and 0 otherwise. Continuing the example, constraints may specify that each nutrient is assigned to only one impact factor, and each impact factor is assigned only one nutrient. Impact factors may include nutrients 1024 as described above. Sets of nutrients 1024 may be optimized for a maximum score combination of all generated nutrients 1024. In various embodiments, apparatus 1000 may determine a combination of nutrients 1024 that maximizes a total score subject to a constraint that all nutrients 1024 are paired to exactly one impact factor. Not all impact factors may receive a nutrient pairing since each impact factor may only produce one nutrient pairing. In some embodiments, an objective function may be formulated as a mixed integer optimization function. A "mixed integer optimization" as used in this disclosure is a program in which some or all of the variables are restricted to be integers. A mathematical solver may be implemented to solve for the set of feasible pairings that maximizes the sum of scores across all pairings; mathematical solver may be implemented on apparatus 1000, another device, and/or may be implemented on third-party solver.

With continued reference to FIG. 10, optimizing an objective function may include minimizing a loss function, where a "loss function" is an expression an output of which an optimization algorithm minimizes to generate an optimal result. As a non-limiting example, apparatus 1000 may assign variables relating to a set of parameters, which may correspond to score nutrients 1024 as described above, calculate an output of mathematical expression using the variables, and select a pairing that produces an output having the lowest size, according to a given definition of "size," of the set of outputs representing each of a plurality of nutrients 1024 and/or impact factors; size may, for instance, included absolute value, numerical size, or the like. Selection of different loss functions may result in identification of different potential pairings as generating minimal outputs. Objectives represented in an objective function and/or loss function may include minimization of impact factors. Objectives may include minimization of preparation time of a recipe. Objectives may include minimization of costs of a recipe. Objectives may include maximization of compatibility across a wide range of individuals.

Still referring to FIG. 10, in some embodiments, apparatus 1000 may receive a meal ID through a graphical user interface (GUI) 1032. A "graphical user interface" as used in this disclosure is an interface including a set of one or more pictorial and/or graphical icons corresponding to one or more computer actions. GUI 1032 may be configured to receive user input, as described above. GUI 1032 may include one or more event handlers. In some embodiments, GUI 1032 may be configured to display outputs. In some instances, GUI 1032 may display a score of nutrient 1024. In some embodiments, apparatus 1000 may generate a report as a function of diagnostic output 156, guided recommendation 164, normality level datum 1008, nutrient plan 1012 and/or paired medical professional. The diagnostic output 156 and guided recommendation 164 are further described above. In some embodiments, apparatus 1000 may be configured to transmit the report, normality level datum 1008, nutrient plan 1012 and/or paired medical professional to GUI 1032 to display it to a user. GUI 1032 disclosed herein is further described below.

With continued reference to FIG. 10, an "event handler" as used in this disclosure is a callback routine that operates asynchronously once an event takes place. Event handlers may include, without limitation, one or more programs to perform one or more actions based on user input, such as generating pop-up windows, submitting forms, changing background colors of a webpage, and the like. Event handlers may be programmed for specific user input, such as, but not limited to, mouse clicks, mouse hovering, touchscreen input, keystrokes, and the like. For instance and without limitation, an event handler may be programmed to generate a pop-up window if a user double clicks on a specific icon. User input may include manipulation of computer icons, such as, but not limited to, clicking, selecting, dragging and dropping, scrolling, and the like. In some embodiments, user input may include an entry of characters and/or symbols in a user input field. A "user input field" as used in this disclosure is a portion of a graphical user interface configured to receive data from an individual. A user input field may include, but is not limited to, text boxes, search fields, filtering fields, and the like. In some embodiments, user input may include touch input. Touch input may include, but is not limited to, single taps, double taps, triple taps, long presses, swiping gestures, and the like. One of ordinary skill in the art will appreciate the various ways a user may interact with GUI 1032. In some embodiments, GUI 1032 may be consistent with graphical user interfaces as described in U.S. patent application Ser. No. 17/062,740, filed Oct. 5, 2020, and titled "METHODS AND SYSTEMS FOR ARRANGING AND DISPLAYING GUIDED RECOMMENDATIONS VIA A USER INTERFACE BASED ON BIOLOGICAL EXTRACTION," of which is incorporated by reference herein in its entirety.

Continuing in reference to FIG. 10, apparatus 1000 may retrieve a plurality of nutrient chain, wherein retrieving a nutrient chain may include retrieving, for each meal of the plurality of meals, a nutrient chain identifying a plurality of sequentially ordered tasks for preparation of the meal. A nutrient chain may be provided by a user, such as a restaurant, cook, or the like, and nutrient chains may be stored and/or retrieved by apparatus 1000 from a meal database, for instance from a nutrient chain database. Alternatively or additionally, apparatus 1000 may retrieve nutrient chain from an online repository or other suitable source for retrieving information regarding meal preparation. In non-limiting illustrative examples, a nutrient chain may contain sequentially ordered tasks that may be sequentially ordered based upon a chronological order, tasks ordered by resource optimization, task ordered by customer priority, and the like. A nutrient chain may contain elements, steps, instructions, or the like that refer to preparing one or more meals, by one or more personnel, using one of more stations, appliances, utensils, and the like. Apparatus 1000 may store and/or retrieve nutrient chain, or an element of an existing nutrient chain to form a new nutrient chain, from a meal database, online repository, blog, culinary website, or any other suitable source, as described above. In non-limiting illustrative examples, apparatus 1000 may retrieve a plurality of nutrient chain by retrieving a series of steps corresponding to an identification of a meal of edible data 1020, for instance and without limitation, recipe steps using available nutrients 1024 for cooking a beef stew. In further non-limiting illustrative examples, the steps to a beef stew may be associated with a chronological sequential ordering of personnel tasks, nutrient retrieval, kitchen space use, and may differ based upon time constraints, including and/or avoiding certain nutrients 1024, equipment, and the like.

Continuing in reference to FIG. 10, apparatus 1000 may retrieve a plurality of nutrient chain, wherein retrieving may include identifying, for each nutrient chain, a resource list identifying a plurality of resources, wherein each resource is associated with a task of the plurality of sequentially ordered tasks. A "resource list," as described in this disclosure refers to a tabulation, list, or the like, of nutrient identities, amounts, and expirations; kitchen stations, equipment, appliances, utensils, dishware, personnel, operating hours, tables, customers; delivery couriers including restaurant employees and secondary couriers via application services, 'gig' economy services, and the like; delivery vehicles, including cars, trucks, bikes, and the like, and any other suitable resource relating the preparation of a meal, delivery of a meal, and/or meal orders. Apparatus 1000 may determine a resource and tabulate, list, group, or otherwise categorize a plurality of resources by retrieving a resource from a database, as described above. Alternatively or additionally, a resource of a resource list may be stored and/or retrieved from a database by a machine-learning process, such as a first machine-learning model, as a resource may correspond to a plurality of meals, nutrients 1024, nutrient chains, or the like.

Still referring to FIG. 10, in some embodiments, apparatus 1000 may retrieve and/or generate a plurality of nutrient chain. Nutrient chain may differ at branching points that correspond to different pathways, series of elements, steps, or the like in preparing a meal. In non-limiting illustrations a branch point may represent places where deviations in tasks in a nutrient chain may differ for instance, omitting or including a step to eliminate or add a new nutrient, for instance removing onions from the beef stew upon customer request, or customizing meal by adding chives. In further non-limiting illustrative examples, a branch point may represent a place in a nutrient chain where concurrently performed steps are added, subtracted, combined, or split into new nutrient chain. For instance and without limitation, a branch point may include a beginning preparation of a beef stock for a meal, a first kitchen personnel may include next any series of vegetables, beginning with any of the four, before moving to a next task in the nutrient chain. In such an example, several nutrient chain modifications may be introduced at the branch point, for instance and without limitation, a second kitchen personnel may be added to assist in the nutrient preparation steps to decrease time of meal preparation, or a fifth nutrient may be added upon request to customize a meal further, resource permitting. Nutrient chain may be listed in a sequentially ordered manner and mapped to the anticipated timescale for preparing a meal; timescale may be altered by applying different resource lists to different steps in nutrient chain and/or modifying nutrient chain by adding/subtracting branch points, removing/adding tasks, and the like. For instance and without limitation, a plurality of nutrient chain may be mapped to a 12-hr time scale for preparing a beef stew, wherein a negative time value represents "time out" from a meal being finished, and a positive time value represents "time post preparation," including for example delivery time, customer retrieval time, and the like. Nutrient chain may be optimized, combined, and or otherwise modified as described in further detail below to decrease average time of preparation.

Referring still to FIG. 10, apparatus 1000 may generate a plurality of candidate nutrient chain combinations, wherein each nutrient chain combination may include a first nutrient chain of the plurality of nutrient chains and a second nutrient chain of the plurality of nutrient chains, and a first task of the first nutrient chain and a second task of the second nutrient chain are concurrently performed using a resource associated with each of the first task and the second task. A first task of a first nutrient chain and a second task of a second nutrient chain may be placed in a sequentially ordered sequence and/or performed concurrently relative to each other depending on constraints on task ordering and/or combination. For instance, a first task of a first nutrient chain may be to prepare a first meal at a station and a second task of a second nutrient chain may be to prepare a second meal, wherein the first meal introduces an allergen to be excluded from the second meal; this would introduce a constraint that would limit the sequential ordering in this manner. In such an example, the sequential order of the two different nutrient chains would need to be changed based on avoiding said allergen. In further non-limiting illustrative examples, a first task of a first nutrient chain may be to prepare 1 cup of a first nutrient and a second task of a second nutrient chain may be to prepare 1 cup of that same nutrient, a first task of a first nutrient chain and a second task of a second nutrient chain may be combined concurrently to improve efficiency, wherein a single person may prepare 2 cups at once. Determining if any constraint exists may include determining if a constraint would limit a first task of a first nutrient chain being ordered followed by a second task in a second nutrient chain in either a sequential and/or concurrent ordering. If either nutrient chain ordering is determined to be allowed based upon constraints, then ordering of a plurality of nutrient chains may be added to a feasible list for further feasibility quantifier analysis, as described in further detail below. In non-limiting illustrative examples, a plurality of nutrient chain may be concurrently listed, for instance combined into a plurality of candidate nutrient chain combinations determined by sequentially listing certain tasks and concurrently performing other tasks within a potential combination of nutrient chains, wherein concurrently performed tasks overlap at least for a moment in time, personnel, station, equipment, or overlap in any resource, as described above. In further non-limiting illustrative examples, concurrently performed tasks of two nutrient chains may involve, for instance and without limitation, a combination of resource at once such as preheating an oven of a first nutrient chain, washing utensils to remove allergens of a second nutrient chain, and chopping vegetables of a third nutrient chain. In such a non-limiting example, a first nutrient chain may correspond to preparing two distinct meals, such as a second meal and third meal, each of which may require heating in an oven at the same temperature, or at an average temperature suitable for both meals while using a single oven, wherein the average temperature is an optimized temperature calculated by a machine-learning model and/or objective function to batch cooking steps together, as described in further detail below; a second nutrient chain may correspond to removing allergens from a first meal that can be done while preparing a second meal and a third meal, but must be completed prior to finishing the preheating stage; a third nutrient chain may correspond to chopping vegetables that may correspond to an nutrient preparation task that overlaps with a plurality of meals.

Continuing in reference to FIG. 10, nutrient chain and candidate nutrient chain combinations may include signifiers, numerical values, alphanumerical codes, and the like that contain elements of data regarding identifiers related to certain combinations of nutrient chains elements, resource amounts, time amounts, constraints, and/or any other identifiable parameters that may be used in determining feasibility of an nutrient chain, or plurality of nutrient chain combinations, as described in further detail below. A machine-learning model may, for instance, retrieve nutrient chain from a meal database and determine feasibility of said nutrient chain by identification by a signifier, as described above.

Continuing in reference to FIG. 10, apparatus 1000 may identify a plurality of constraints as a function of identifications of meals, which may include at least a resource constraint and at least a timing constraint. A "constraint," as used herein refers to a barrier, limitation, consideration, or any other constraint pertaining to resource utilization during optimizing the combination of a plurality of nutrient chains that may arise during meal preparation and/or delivery as a function of performing a plurality of nutrient chains combinations, wherein the constraint may alter the time and/or resources available to preparing a meal or performing a task, may alter the concurrent and/or sequential ordering of tasks in a plurality of nutrient chains, and/or may alter the feasibility of combining a plurality of nutrient chains. Constraints may be identified by an optimization process during optimization of nutrient chain combinations, as described in further detail below. A constraint may, for instance and without limitation, only appear during a particular optimized listing of a plurality of nutrient chain elements, wherein a second listing of the same elements in a different ordering may not show the same constraint. In non-limiting illustrative examples, a constraint may be a resource constraint, wherein dedicating an individual to a series of tasks for preparing a meal would then place a constraint on preparing a second meal with said individual, or performing a second combination of nutrient chains; likewise a constraint may be a time constraint wherein the maximal time allotted for selecting nutrient chains for an individual or set of individuals working in tandem in preparing a meal may be dictated by when a customer places an order, whether a customer is dine-in or take-out, delivery method for the meal, and/or type of meal and nutrients 1024 used. Constraints may refer to customer preferences, for instance and without limitation, such as the presence of allergies, food intolerances, hypersensitivities, or other dietary constraints, philosophical, religious, and/or moral considerations to nutrients 1024 and/or meal preparation, and the like; constraints may refer to seasonality of nutrients 1024, nutrient amounts, nutrient substitutions, and/or other material and immaterial constraints to nutrient availability and use. Such information may be stored and/or retrieved by apparatus 1000 from a database, for instance, via orders input by a restaurant wait staff, logged by a web-based application, mobile application, or other meal ordering service, application, device, of the like. Meal orders may be provided in a non-electronic format and nutrient chain retrieved after a user prompts apparatus 1000 for nutrient chain associated with an order, which may contain constraint information. Constraint information may be stored and/or retrieved alongside nutrient chain information by use of an alphanumeric code, numerical value, or any other method of signifying the presence, amount, and/or nature of a constraint related to a task, nutrient chain, and/or combinations of nutrient chain.

Continuing in reference to FIG. 10, apparatus 1000 may be configured to generate plurality of candidate nutrient chain combinations by receiving feasibility training data. Feasibility training data may include a plurality of entries correlating task combinations with feasibility quantifiers. A "feasibility quantifier," as used in this disclosure is a score, metric, function, vector, matrix, numerical value, or the like, which describes a qualitative and/or quantitative mathematical proportion, propensity, or any relationship correlating the likelihood, possibility, and/or probability of completing a task, given a set of constraints and the a task's relationship in time to and ordering to other tasks, within a particular timeframe, wherein a timeframe may be determined by an identification of a meal, meal preparation time, expected delivery time, resource list, nutrient chain, and the like. Apparatus 1000 may identify feasible combinations based on various constraints, wherein apparatus 1000 may find and/or set values for those constraints or add a new constraint in the form of a "feasibility quantifier." In non-limiting illustrative examples, a feasibility quantifier may include scores relating the probability of feasibility for completing a series of tasks, wherein each task has an associated probability in relating preparation of a beef stew related to preparing the beef stew for a customer order within, for instance, a 15-minute time frame, 30-minute time frame, 1-hour time frame, etc. In further non-limiting illustrative examples, nutrient chain steps that would require more than a 15-minute time frame would garner scores indicating lower levels of feasibility, such as for instance placing beef in a marinade, chopping vegetables, and cooking a beef stock, and thus may result in candidate nutrient chain steps that would sequentially order meal preparation of such steps for a suitable amount of time prior to the 15-minute time frame. Additionally, in non-limiting illustrative examples, nutrient chain steps that could be completed within the 15-minute time frame of ordering may include combining the nutrients 1024, and plating the meal, which would garner higher feasibility scores resulting in nutrient chain elements that may be combined in such a way that allows an individual to complete the entire nutrient chain combination to fulfill orders within 15 minutes of the customer placing the order. Feasibility quantifiers may be stored and/or retrieved from a database. Alternatively or additionally, determining the feasibility of an nutrient chain may include resource constraint information, as described in further detail below, wherein the feasibility of an individual completing a first candidate nutrient chain combination depends upon if that same individual is dedicated to a second candidate nutrient chain combination, and if the suitable kitchenware, utensils, appliances, workstations, and the like, are in use and/or if preparation of the next meal may result in an biological and/or philosophical conflict for a customer, for instance an allergy to peanuts, a lactose-free meal after cooking with milk, Kosher preparation, or a vegan meal. Feasibility quantifiers may incorporate information, for instance, if there would be enough time to prepare a second meal after a first meal, if a second meal would demand decontamination of a common space to avoid antigen cross-contamination. In such a non-limiting illustrative example, a feasibility quantifier may rank a candidate nutrient chain combination in such a way that gave a more favorable score to preparing a second meal first, followed by a first meal, as described in further detail below.

With continued reference to FIG. 10, apparatus 1000 may be configured to generate a recipe machine-learning model. A "recipe machine-learning model," as used in this disclosure, is a mathematical representation of a relationship between inputs and outputs, as generated using any machine-learning process and/or machine-learning algorithm including without limitation any process as described herein, and stored in memory; an input is submitted to a machine-learning model once created, which generates an output based on the relationship that was derived. Generating recipe machine-learning model may include calculating one or more supervised machine-learning algorithms including active learning, classification, regression, analytical learning, artificial neural network, backpropagation, boosting, Bayesian statistics, case-based learning, genetic programming, Kernel estimators, naïve Bayes classifiers, maximum entropy classifier, conditional random field, K-nearest neighbor algorithm, support vector machine, random forest, ordinal classification, data pre-processing, statistical relational learning, and the like. Generating recipe machine-learning model may include calculating one or more unsupervised machine-learning algorithms, including a clustering algorithm such as hierarchical clustering, k-means clustering, mixture models, density based spatial clustering of algorithms with noise (DBSCAN), ordering points to identify the clustering structure (OPTICS), anomaly detection such as local outlier factor, neural networks such as autoencoders, deep belief nets, Hebbian learning, generative adversarial networks, self-organizing map, and the like. Generating recipe machine-learning model may include calculating a semi-supervised machine-learning algorithm such as reinforcement learning, self-learning, feature learning, sparse dictionary learning, anomaly detection, robot learning, association rules and the like. Recipe machine-learning model is trained by apparatus 1000 using training data, including any of the training data as described herein. Training data may be obtained from records of previous iterations of generating recipe machine-learning model, user inputs and/or questionnaire responses, expert inputs, and the like. Recipe machine-learning model may be implemented as any machine-learning process, including for instance, and without limitation, as described in U.S. Nonprovisional application Ser. No. 16/375,303, filed on Apr. 4, 2019, and entitled "SYSTEMS AND METHODS FOR GENERATING ALIMENTARY INSTRUCTION SETS BASED ON VIBRANT CONSTITUTIONAL GUIDANCE," the entirety of which is incorporated herein by reference. Recipe machine-learning model is trained using training data to select recommended refreshments favored by a user selection. In an embodiment, user selection contained within a selection database may be utilized as training data to customize and train recipe machine-learning model individually for each user. For instance and without limitation, user selection that indicate a user prefers to cat foods that contain protein choices that contain either chicken, tofu or salmon and the user dislikes protein choices that contain beef or pork may be utilized as training data to generate recommended refreshments such as chicken picada, tofu and green bean stir fry, and miso glazed salmon, and to not generate recommended refreshments such as a ground beef stir fry or a pork burger. In another embodiment, recipe machine-learning model may output a plurality of recommended refreshments as a function of the health condition of the user. For instance and without limitation, a user may have a gluten allergy. In this example, recipe machine-learning model may output recommended refreshment suitable for the user where the recommended refreshment are gluten-free.

Figure 11:
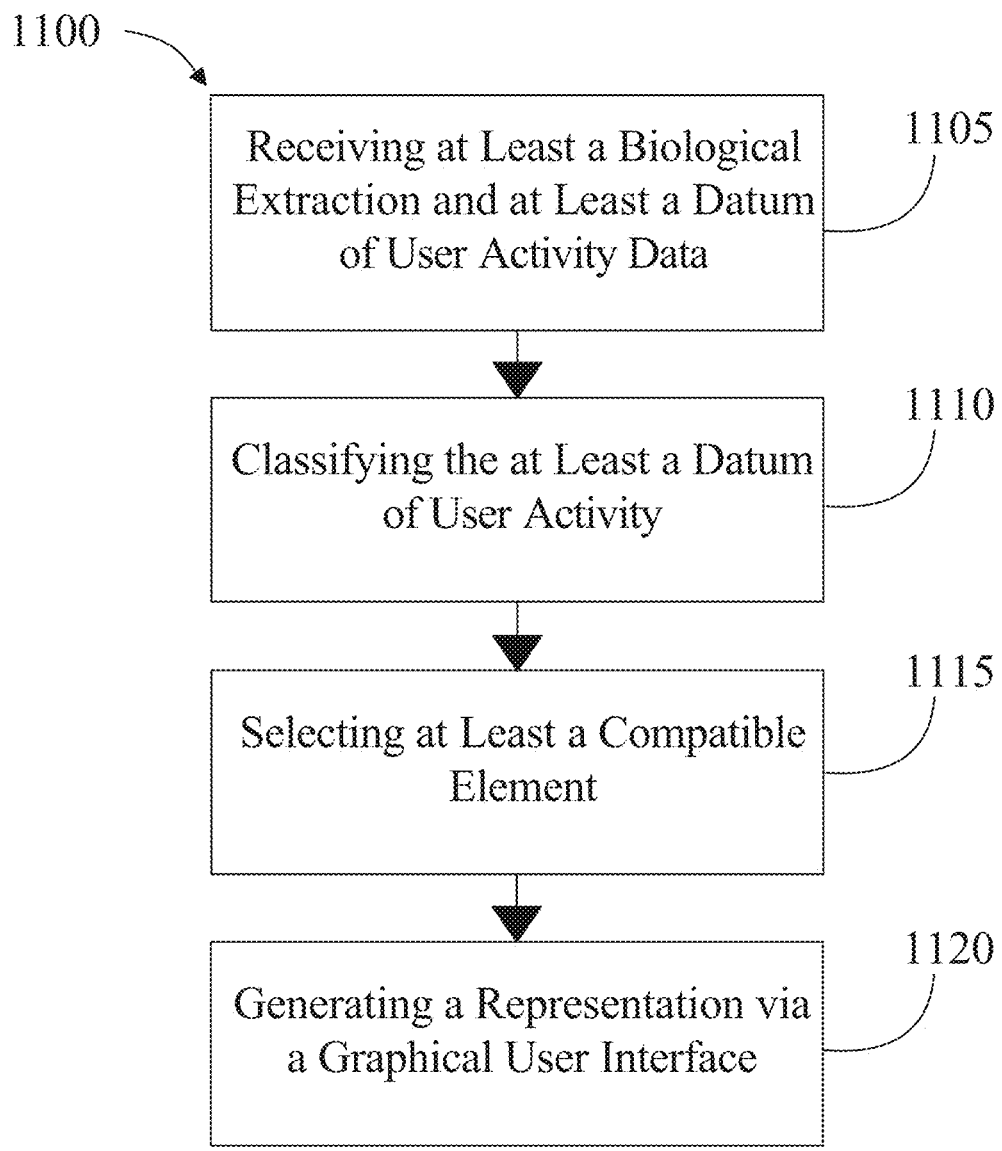
FIG. 11 illustrates a flow diagram of an exemplary workflow of a method for arranging and displaying guided recommendations using a graphical user interface based on biological extraction.

Referring not to FIG. 11, an exemplary embodiment of a method 1100 for arranging and displaying guided recommendations using a graphical user interface based on biological extraction is illustrated. At step 1105, computing device 104 is configured for receiving, from a wearable device located at a user, at least a user biological extraction data 124 and at least a datum of user activity data 128. User activity data 128 may include data collected via user input through a graphical user interface. Receiving, from a wearable device located at a user, at least a user biological extraction data 124 and at least a datum of user activity data 128 may include generating, using the wearable device data, a first training set including a plurality of first data entries including at least an element of wearable device data correlated to at least an element of biological extraction. Receiving at least a user biological extraction data 124 may include training a label machine-learning model 136 using training data 132, wherein training data 132 includes a plurality of data entries, each data entry of the plurality of data entries including at least an element of user biological extraction data 124 correlated to a user function, and generating, using the label machine-learning model 136, a compatibility label 140; this may be implemented, without limitation, as described above in reference to FIGS. 1-10.

Continuing in reference to FIG. 11, at step 1110, computing device 104 is configured for classifying the at least a datum of user activity as a function of at least a datum of a user fingerprint 144. Classifying the at least a datum of user activity may include using a classification machine-learning process 148 to generate a classifier 152 which describes a subset of diagnostic outputs 156, wherein the diagnostic output 156 is a subset of user activity data 128 as a function of past user data contained in the user fingerprint 144; this may be implemented, without limitation, as described above in reference to FIGS. 1-10.

Continuing in reference to FIG. 11, at step 1115, computing device 104 is configured for selecting at least a compatible element 160 as a function of the training data 132 and the user fingerprint 144, wherein the compatible element 160 comprises a guided recommendation. Selecting a compatible element 160 may include using an element machine-learning process 168 to select the compatible element 160 as a function of the classifier 152. Selecting a compatible element 160 using the element machine-learning process 168 may include generating the guided recommendation. Selecting the compatible element 160 may include using the element machine-learning process 168 to filter the guided recommendation as a function the user fingerprint 144. Selecting the compatible element 160 as a function of filtering the guided recommendation may include ranking, using a ranking machine learning process 160, guided recommendations as a function of a compatibility index 172; this may be implemented, without limitation, as described above in reference to FIGS. 1-10.

Continuing in reference to FIG. 11, at step 1120, computing device 104 is configured for generating a representation using a graphical user interface of the compatible element 160. Generating a representation using a graphical user interface of the compatible label 144 may include updating the graphical user interface display as a function of the compatibility index 172; this may be implemented, without limitation, as described above in reference to FIGS. 1-10.

Figure 12:
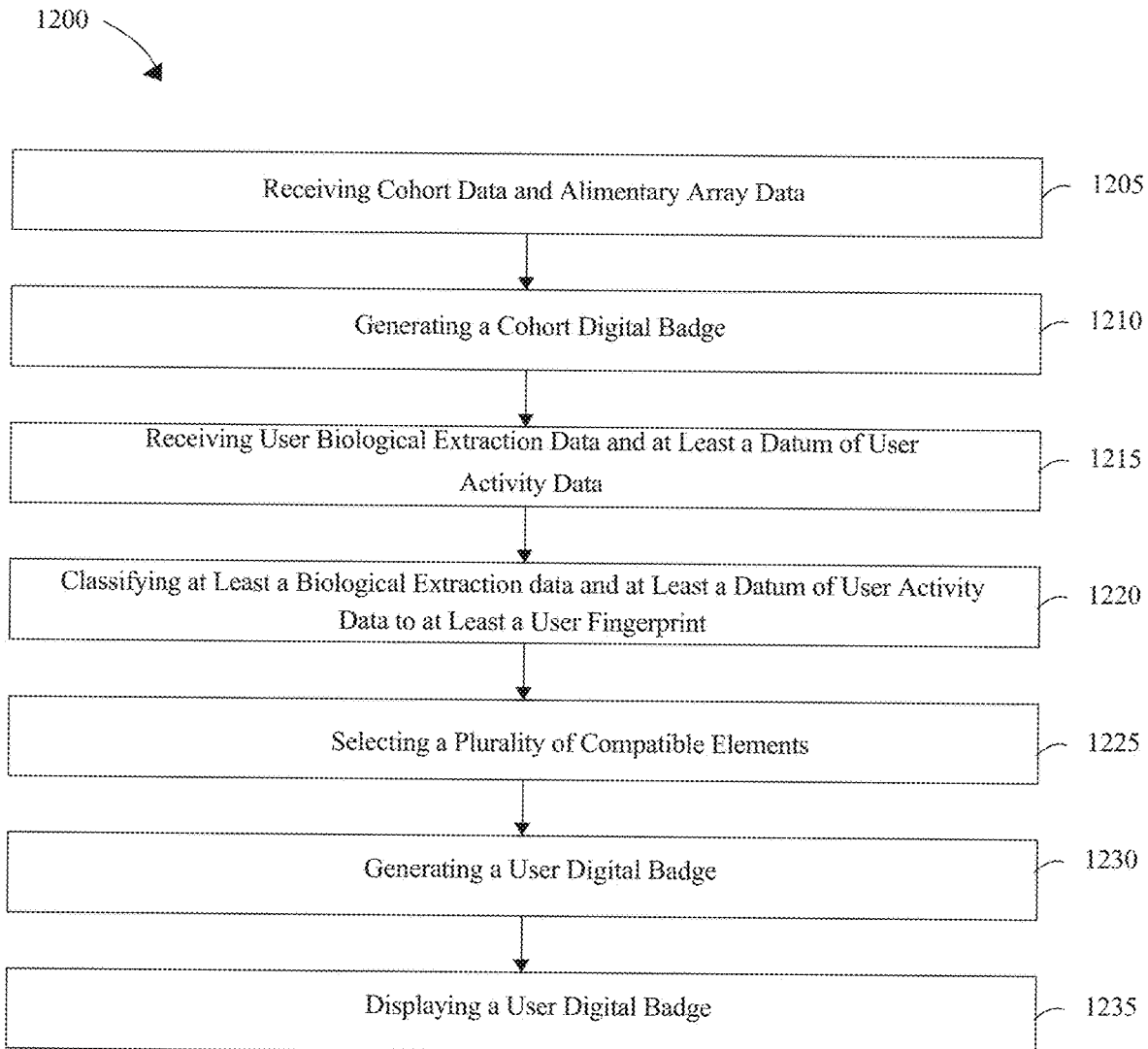
FIG. 12 illustrates a flow diagram illustrating an exemplary method for displaying a customized badge.

Referring now to FIG. 12, a flow diagram of an exemplary method 1200 for displaying a customized badge is illustrated. Method 1200 contains a step 1205 of receiving, using a computing device, cohort data and alimentary array data. This may be implemented, without limitation, as described above in reference to FIGS. 1-11.

With continued reference to FIG. 12, method 1200 contains a step 1210 of generating, using a computing device, a cohort digital badge for at least an alimentary element of alimentary array data as a function of cohort data. This may be implemented, without limitation, as described above in reference to FIGS. 1-11.

With continued reference to FIG. 12, method 1200 contains a step 1215 of receiving, using a computing device, user biological extraction data and at least a datum of user activity data. This may be implemented, without limitation, as described above in reference to FIGS. 1-11.

With continued reference to FIG. 12, method 1200 contains a step 1220 of classifying, using a computing device, user biological extraction data and at least a datum of user activity data to at least a user fingerprint. In some embodiments, method 1200 may further include generating, using the computing device, a normality level datum as a function of user data and the user digital badge and generating, using the computing device, a nutrient plan as a function of the normality level datum. These may be implemented, without limitation, as described above in reference to FIGS. 1-11.

With continued reference to FIG. 12, method 1200 contains a step 1225 of selecting, using a computing device, a plurality of compatible elements as a function of at least a user fingerprint. This may be implemented, without limitation, as described above in reference to FIGS. 1-11.

With continued reference to FIG. 12, method 1200 contains a step 1230 of generating, using a computing device, a user digital badge as a function of a cohort digital badge and a plurality of compatible elements. This may be implemented, without limitation, as described above in reference to FIGS. 1-11.

With continued reference to FIG. 12, method 1200 contains a step 1235 of displaying, using a computing device, a user digital badge using a graphical user interface. In some embodiments, method 1200 may further include generating, using the computing device, a family digital badge of the user digital badge as a function of user data. In some embodiments, generating the user digital badge comprises ordering the plurality of compatible elements as a function of a compatibility index and generating the user digital badge as a function of the ordered compatible elements. In some embodiments, method 1200 may further include determining, using the computing device, an engagement hazard as a function of the ordered compatible elements, wherein the engagement hazard may include a nutritional risk. In some embodiments, method 1200 may further include generating, using the computing device, an element modification suggestion as a function of the ordered compatible elements. In some embodiments, method 1200 may further include generating, using the computing device, an engagement return as a function of a user feedback related to the plurality of compatible elements. In some embodiments, method 1200 may further include ordering, using the computing device, the plurality of compatible elements as a function of the user feedback, wherein the user feedback may include a flavor feedback. In some embodiments, displaying the user digital badge may further include generating a digital menu as a function of the alimentary array data and displaying the user digital badge on the digital menu using the graphical user interface. In some embodiments, displaying the user digital badge may further include scanning a physical menu, identifying an element list on the physical menu corresponding to the alimentary element, generating a combined display of the physical menu and the user digital badge, wherein the combined display displays the user digital badge at the element list and displaying the combined display using the graphical user interface. These may be implemented, without limitation, as described above in reference to FIGS. 1-11.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 13:
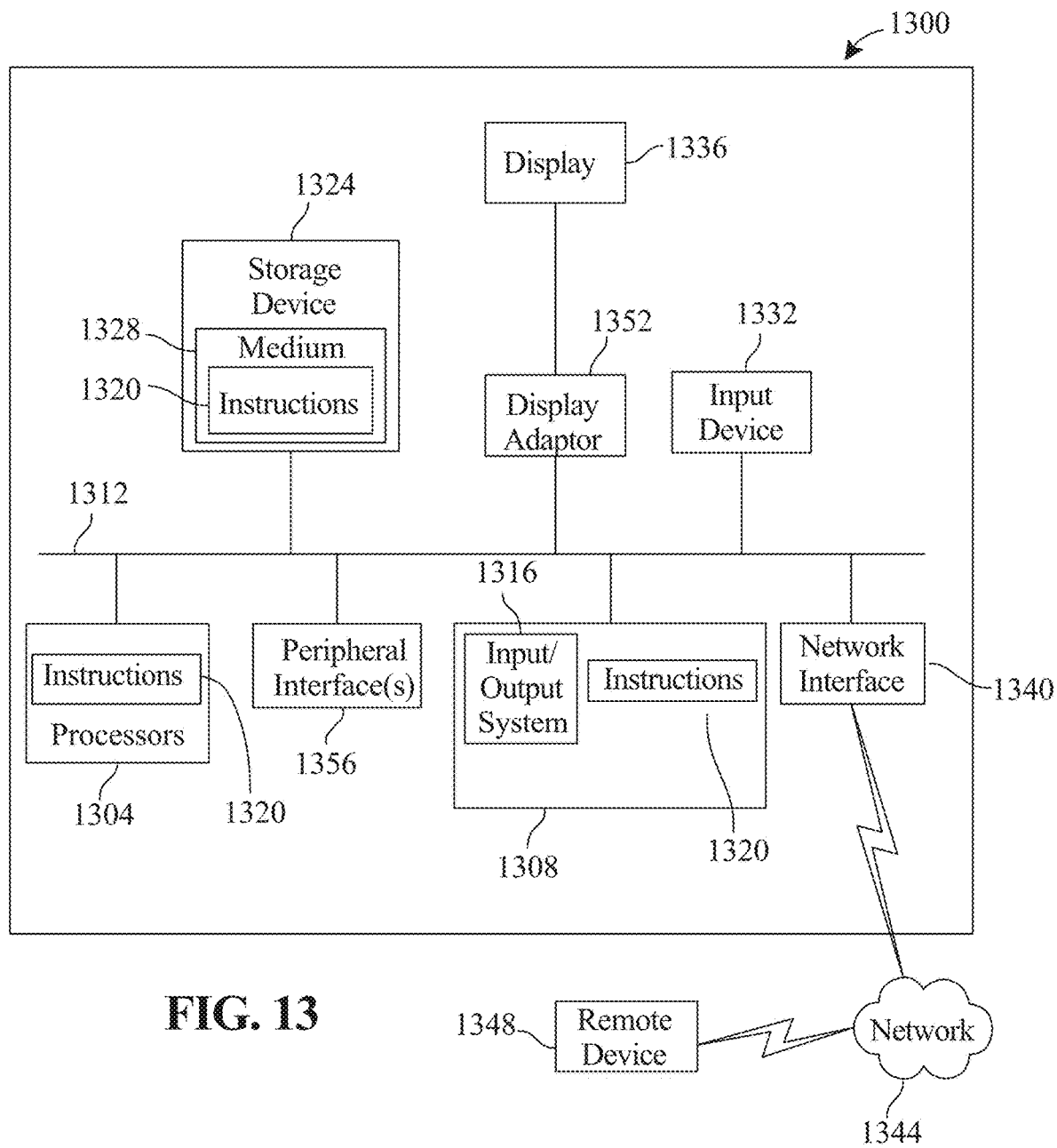
FIG. 13 illustrates a block diagram of a computing system that can be used to implement any one or more of the methodologies disclosed herein and any one or more portions thereof. The drawings are not necessarily to scale and may be illustrated by phantom lines, diagrammatic representations, and fragmentary views. In certain instances, details that are not necessary for an understanding of the embodiments or that render other details difficult to perceive may have been omitted.

FIG. 13 shows a diagrammatic representation of one embodiment of a computing device in the exemplary form of a computer system 1300 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1300 includes a processor 1304 and a memory 1308 that communicate with each other, and with other components, via a bus 1312. Bus 1312 may include any of several types of bus structures including, but not limited to, a memory bus, a memory controller, a peripheral bus, a local bus, and any combinations thereof, using any of a variety of bus architectures.

Processor 1304 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1304 may be organized according to Von Neumann and/or Harvard architecture as a non-limiting example. Processor 1304 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 1308 may include various components (e.g., machine-readable media) including, but not limited to, a random-access memory component, a read only component, and any combinations thereof. In one example, a basic input/output system 1316 (BIOS), including basic routines that help to transfer information between elements within computer system 1300, such as during start-up, may be stored in memory 1308. Memory 1308 may also include (e.g., stored on one or more machine-readable media) instructions (e.g., software) 1320 embodying any one or more of the aspects and/or methodologies of the present disclosure. In another example, memory 1308 may further include any number of program modules including, but not limited to, an operating system, one or more application programs, other program modules, program data, and any combinations thereof.

Computer system 1300 may also include a storage device 1324. Examples of a storage device (e.g., storage device 1324) include, but are not limited to, a hard disk drive, a magnetic disk drive, an optical disc drive in combination with an optical medium, a solid-state memory device, and any combinations thereof. Storage device 1324 may be connected to bus 1312 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1324 (or one or more components thereof) may be removably interfaced with computer system 1300 (e.g., via an external port connector (not shown)). Particularly, storage device 1324 and an associated machine-readable medium 1328 may provide nonvolatile and/or volatile storage of machine-readable instructions, data structures, program modules, and/or other data for computer system 1300. In one example, software 1320 may reside, completely or partially, within machine-readable medium 1328. In another example, software 1320 may reside, completely or partially, within processor 1304.

Computer system 1300 may also include an input device 1332. In one example, a user of computer system 1300 may enter commands and/or other information into computer system 1300 via input device 1332. Examples of an input device 1332 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1332 may be interfaced to bus 1312 via any of a variety of interfaces (not shown) including, but not limited to, a serial interface, a parallel interface, a game port, a USB interface, a FIREWIRE interface, a direct interface to bus 1312, and any combinations thereof. Input device 1332 may include a touch screen interface that may be a part of or separate from display 1336, discussed further below. Input device 1332 may be utilized as a user selection device for selecting one or more graphical representations in a graphical interface as described above.

A user may also input commands and/or other information to computer system 1300 via storage device 1324 (e.g., a removable disk drive, a flash drive, etc.) and/or network interface device 1340. A network interface device, such as network interface device 1340, may be utilized for connecting computer system 1300 to one or more of a variety of networks, such as network 1344, and one or more remote devices 1348 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1344, may employ a wired and/or a wireless mode of communication. In general, any network topology may be used. Information (e.g., data, software 1320, etc.) may be communicated to and/or from computer system 1300 via network interface device 1340.

Computer system 1300 may further include a video display adapter 1352 for communicating a displayable image to a display device, such as display device 1336. Examples of a display device include, but are not limited to, a liquid crystal display (LCD), a cathode ray tube (CRT), a plasma display, a light emitting diode (LED) display, and any combinations thereof. Display adapter 1352 and display device 1336 may be utilized in combination with processor 1304 to provide graphical representations of aspects of the present disclosure. In addition to a display device, computer system 1300 may include one or more other peripheral output devices including, but not limited to, an audio speaker, a printer, and any combinations thereof. Such peripheral output devices may be connected to bus 1312 via a peripheral interface 1356. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for displaying a customized badge, the system comprising:
   a computing device, wherein the computing device is configured to:
      receive cohort data and alimentary array data;

generate a cohort digital badge for at least an alimentary element of the alimentary array data as a function of the cohort data;
receive user biological extraction data and at least a datum of user activity data;
classify the user biological extraction data and the at least a datum of user activity data to at least a user fingerprint;
select a plurality of compatible elements as a function of the at least a user fingerprint;
generate a user digital badge as a function of the cohort digital badge and the plurality of compatible elements; and
display the user digital badge using a graphical user interface.

2. The system of claim 1, wherein the computing device is further configured to:
generate a normality level datum as a function of user data and the user digital badge; and
generate a nutrient plan as a function of the normality level datum.

3. The system of claim 1, wherein generating the user digital badge comprises:
ordering the plurality of compatible elements as a function of a compatibility index; and
generating the user digital badge as a function of the ordered compatible elements.

4. The system of claim 3, wherein the computing device is further configured to determine an engagement hazard as a function of the ordered compatible elements, wherein the engagement hazard comprises a nutritional risk.

5. The system of claim 3, wherein the computing device is further configured to generate an element modification suggestion as a function of the ordered compatible elements.

6. The system of claim 1, wherein the computing device is further configured to generate an engagement return as a function of a user feedback related to the plurality of compatible elements.

7. The system of claim 6, wherein the computing device is further configured to order the plurality of compatible elements as a function of the user feedback, wherein the user feedback comprises a flavor feedback.

8. The system of claim 1, wherein the computing device is further configured to generate a family digital badge of the user digital badge as a function of user data.

9. The system of claim 1, wherein displaying the user digital badge further comprises:
generating a digital menu as a function of the alimentary array data; and
displaying the user digital badge on the digital menu using the graphical user interface.

10. The system of claim 1, wherein displaying the user digital badge further comprises:
scanning a physical menu;
identifying an element list on the physical menu corresponding to the alimentary element;
generating a combined display of the physical menu and the user digital badge, wherein the combined display displays the user digital badge at the element list; and
displaying the combined display using the graphical user interface.

11. A method for displaying a customized badge, the method comprising:
receiving, using a computing device, cohort data and alimentary array data;
generating, using the computing device, a cohort digital badge for at least an alimentary element of the alimentary array data as a function of the cohort data;
receiving, using the computing device, user biological extraction data and at least a datum of user activity data;
classifying, using the computing device, the user biological extraction data and the at least a datum of user activity data to at least a user fingerprint;
selecting, using the computing device, a plurality of compatible elements as a function of the at least a user fingerprint;
generating, using the computing device, a user digital badge as a function of the cohort digital badge and the plurality of compatible elements; and
displaying, using the computing device, the user digital badge using a graphical user interface.

12. The method of claim 11, further comprising:
generating, using the computing device, a normality level datum as a function of user data and the user digital badge; and
generating, using the computing device, a nutrient plan as a function of the normality level datum.

13. The method of claim 11, wherein generating the user digital badge comprises:
ordering the plurality of compatible elements as a function of a compatibility index; and
generating the user digital badge as a function of the ordered compatible elements.

14. The method of claim 13, further comprising:
determining, using the computing device, an engagement hazard as a function of the ordered compatible elements, wherein the engagement hazard comprises a nutritional risk.

15. The method of claim 13, further comprising:
generating, using the computing device, an element modification suggestion as a function of the ordered compatible elements.

16. The method of claim 11, further comprising:
generating, using the computing device, an engagement return as a function of a user feedback related to the plurality of compatible elements.

17. The method of claim 16, further comprising:
ordering, using the computing device, the plurality of compatible elements as a function of the user feedback, wherein the user feedback comprises a flavor feedback.

18. The method of claim 11, further comprising:
generating, using the computing device, a family digital badge of the user digital badge as a function of user data.

19. The method of claim 11, wherein displaying the user digital badge further comprises:
generating a digital menu as a function of the alimentary array data; and
displaying the user digital badge on the digital menu using the graphical user interface.

20. The method of claim 11, wherein displaying the user digital badge further comprises:
scanning a physical menu;
identifying an element list on the physical menu corresponding to the alimentary element;
generating a combined display of the physical menu and the user digital badge, wherein the combined display displays the user digital badge at the element list; and displaying the combined display using the graphical user interface.

\* \* \* \* \*